US012786828B2

(12) United States Patent
Krishnan et al.

(10) Patent No.: US 12,786,828 B2
(45) Date of Patent: Nov. 3, 2026

(54) ENHANCEMENTS FOR LTM

(71) Applicant: QUALCOMM Incorporated, San Diego, CA (US)

(72) Inventors: Shankar Krishnan, San Diego, CA (US); Rajeev Kumar, San Diego, CA (US); Punyaslok Purkayastha, San Diego, CA (US); Naeem Akl, Bridgewater, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 18/495,701

(22) Filed: Oct. 26, 2023

(65) Prior Publication Data

US 2025/0142430 A1 May 1, 2025

(51) Int. Cl.
*H04W 36/08* (2009.01)
*H04W 36/36* (2009.01)

(52) U.S. Cl.
CPC ......... *H04W 36/08* (2013.01); *H04W 36/362* (2023.05)

(58) Field of Classification Search
CPC ............... H04W 36/08; H04W 36/362; H04W 36/00838
See application file for complete search history.

(56) References Cited

U.S. PATENT DOCUMENTS

| | | | | |
|---|---|---|---|---|
| 2019/0082363 | A1* | 3/2019 | Park | H04W 24/10 |
| 2024/0187954 | A1 | 6/2024 | Zhou et al. | |
| 2024/0284284 | A1 | 8/2024 | Jin et al. | |
| 2024/0292290 | A1 | 8/2024 | Koskinen et al. | |
| 2024/0340981 | A1 | 10/2024 | Karimidehkordi et al. | |
| 2025/0031105 | A1* | 1/2025 | Leng | H04W 36/0058 |
| 2025/0031122 | A1 | 1/2025 | Wu et al. | |
| 2025/0142437 | A1 | 5/2025 | Krishnan et al. | |
| 2026/0040179 | A1 | 2/2026 | Abraham et al. | |

FOREIGN PATENT DOCUMENTS

| | | | | |
|---|---|---|---|---|
| WO | WO-2024228579 A1 * | 11/2024 | | H04W 36/00833 |
| WO | WO-2025028222 A1 * | 2/2025 | | H04W 36/08 |

* cited by examiner

*Primary Examiner* — Ayanah S George
(74) *Attorney, Agent, or Firm* — Procopio, Cory, Hargreaves & Savitch LLP/QUALCOMM Incorporated

(57) ABSTRACT

Apparatus, methods, and computer program products for wireless communication are provided. An example method may include receiving, from a network entity, an LTM configuration. The example method may further include receiving, from the network entity, an LTM cell switch command associated with the LTM configuration. The example method may further include transmitting, to the network entity, a RLF report based on a failure of an LTM cell switch based on the LTM cell switch command or an RLF after the LTM cell switch based on the LTM cell switch command, the RLF report including information associated with the LTM configuration or the LTM cell switch command.

28 Claims, 25 Drawing Sheets

ENHANCEMENTS FOR LTM

TECHNICAL FIELD

The present disclosure relates generally to communication systems, and more particularly, to wireless communication systems including lower-layer triggered mobility (LTM).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on information stored in the at least one memory, the at least one processor, individually or in any combination, is configured to receive, from a network entity, a lower-layer triggered mobility (LTM) configuration. Based at least in part on information stored in the at least one memory, the at least one processor, individually or in any combination, is configured to receive, from the network entity, an LTM cell switch command associated with the LTM configuration. Based at least in part on information stored in the at least one memory, the at least one processor, individually or in any combination, is configured to transmit, to the network entity, a radio link failure (RLF) report based on a failure of an LTM cell switch based on the LTM cell switch command or an RLF after the LTM cell switch based on the LTM cell switch command, the RLF report including information associated with the LTM configuration or the LTM cell switch command.

In another aspect of the disclosure, a method, a computer-readable medium, and an apparatus at a UE are provided. The apparatus may include at least one memory and at least one processor coupled to the at least one memory. Based at least in part on information stored in the at least one memory, the at least one processor, individually or in any combination, is configured to receive, from a network entity, a conditional LTM configuration indicating a set of conditions for performing an LTM cell switch without an LTM cell switch command. Based at least in part on information stored in the at least one memory, the at least one processor, individually or in any combination, is configured to perform the LTM cell switch based on at least one condition of the set of conditions is met. Based at least in part on information stored in the at least one memory, the at least one processor, individually or in any combination, is configured to transmit, to the network entity, a notification regarding the LTM cell switch and information regarding at least one of: the at least one condition, a first satisfied condition in the at least one condition, or a time between each condition of the at least one condition.

In another aspect of the disclosure, a method, a computer-readable medium, and an apparatus at a network entity are provided. The apparatus may include at least one memory and at least one processor coupled to the at least one memory. Based at least in part on information stored in the at least one memory, the at least one processor, individually or in any combination, is configured to transmit, for a UE, an LTM configuration. Based at least in part on information stored in the at least one memory, the at least one processor, individually or in any combination, is configured to transmit, for the UE, an LTM cell switch command associated with the LTM configuration. Based at least in part on information stored in the at least one memory, the at least one processor, individually or in any combination, is configured to receive a RLF report based on a failure of an LTM cell switch based on the LTM cell switch command or an RLF after the LTM cell switch based on the LTM cell switch command, the RLF report including information associated with the LTM configuration or the LTM cell switch command.

In another aspect of the disclosure, a method, a computer-readable medium, and an apparatus at a network entity are provided. The apparatus may include at least one memory and at least one processor coupled to the at least one memory. Based at least in part on information stored in the at least one memory, the at least one processor, individually or in any combination, is configured to transmit, for a UE, a conditional LTM configuration indicating a set of conditions for performing an LTM cell switch without an LTM cell switch command. Based at least in part on information stored in the at least one memory, the at least one processor, individually or in any combination, is configured to receive, a notification regarding the LTM cell switch and information regarding at least one of: at least one condition of the set of conditions being met, a first satisfied condition in the at least one condition, or a time between each condition of the at least one condition.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
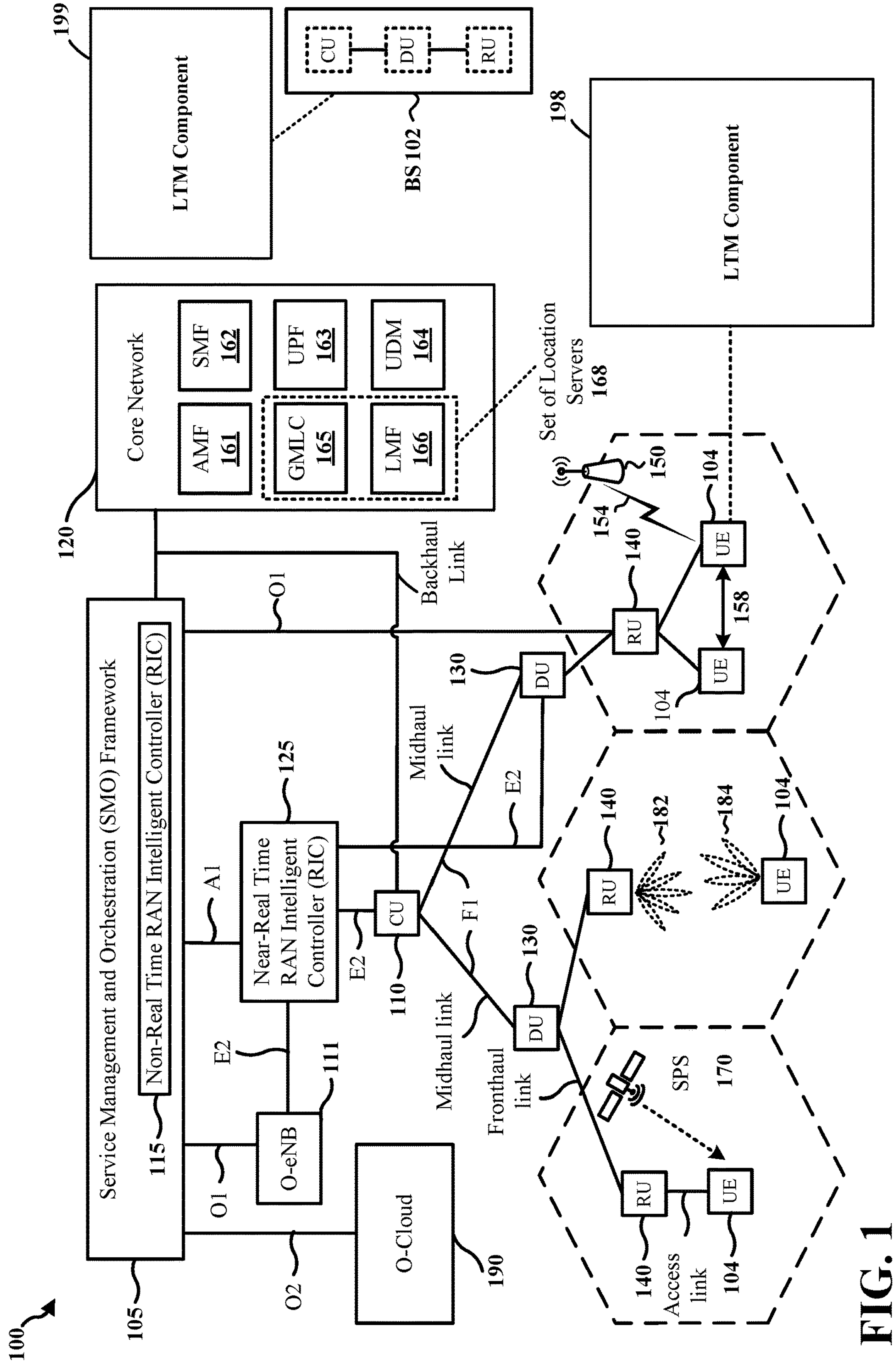
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Aspects provided herein may provide various enhancement to LTM. A first enhancement may be related to handling co-existence between LTM and conditional handover (CHO), conditional primary secondary cell (PSCell) addition (CPA), or conditional PSCell Change (CPC) A second enhancement may be related to providing additional secondary cell group (SCG) failure information when LTM failure for PSCell occurs. A third enhancement may be related to enhancing reporting of conditions for conditional LTM which may contribute to mobility robustness optimization (MRO). A fourth enhancement may be related to enhancing an successful handover report (SHR) or a successful primary secondary cell change report (SPR) regarding CHO, CPA, or CPC execution related to LTM or recording SHR or SPR when there is a near LTM failure during primary cell (PCell) or PSCell change. A fifth enhancement may be related to measuring interruption time during LTM and RACH-less handover (or PSCell change). A sixth enhancement may be related to distinguishing RACH-based and RACH-less LTM failures so that the network may have more information regarding the failures. A seventh enhancement may be related to indicating information regarding target beam or reconnected beam for the network for a beam failure during handover or LTM. The enhancements provided by aspects herein may enable more efficient operation of the LTM because the network or the UE may have more information for resolving potential failures and may better handle co-existence of LTM and CHO, CPA, or CPC.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network entity, a network entity, a mobility element of a network, a radio access network (RAN) node, a core network entity, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network entity, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an LTM component 198. In some aspects, the LTM component 198 may be configured to receive, from a network entity, an LTM configuration. In some aspects, the LTM component 198 may be configured to receive, from the network entity, an LTM cell switch command associated with the LTM configuration. In some aspects, the LTM component 198 may be configured to transmit, to the network entity, a RLF report based on a failure of an LTM cell switch based on the LTM cell switch command or an RLF after the LTM cell switch based on the LTM cell switch command, the RLF report including information associated with the LTM configuration or the LTM cell switch command. In some aspects, the LTM component 198 may be configured to receive, from a network entity, a conditional LTM configuration indicating a set of conditions for performing an LTM cell switch without an LTM cell switch command. In some aspects, the LTM component 198 may be configured to perform the LTM cell switch based on at least one condition of the set of conditions is met. In some aspects, the LTM component 198 may be configured to transmit, to the network entity, a notification regarding the LTM cell switch and information regarding at least one of: the at least one condition, a first satisfied condition in the at least one condition, or a time between each condition of the at least one condition.

In certain aspects, the base station 102 may include an LTM component 199. In some aspects, the LTM component 199 may be configured to transmit, for a UE, an LTM configuration. In some aspects, the LTM component 199 may be configured to transmit, for the UE, an LTM cell switch command associated with the LTM configuration. In some aspects, the LTM component 199 may be configured to receive a RLF report based on a failure of an LTM cell switch based on the LTM cell switch command or an RLF after the LTM cell switch based on the LTM cell switch command, the RLF report including information associated with the LTM configuration or the LTM cell switch command. In some aspects, the LTM component 199 may be configured to transmit, for a UE, a conditional LTM configuration indicating a set of conditions for performing an LTM cell switch without an LTM cell switch command. In some aspects, the LTM component 199 may be configured to receive, a notification regarding the LTM cell switch and information regarding at least one of: at least one condition of the set of conditions being met, a first satisfied condition in the at least one condition, or a time between each condition of the at least one condition.

Although the following description may be focused on 5G NR, the concepts described herein may be applicable to other similar areas, such as LTE, LTE-A, CDMA, GSM, and other wireless technologies.

As described herein, a node (which may be referred to as a node, a network entity, a network node, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station or network node. As another example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network node may be a base station, and the third network entity may be a base station. In yet other aspects of this example, the first, second, and third network node may be different relative to these examples. Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2B:
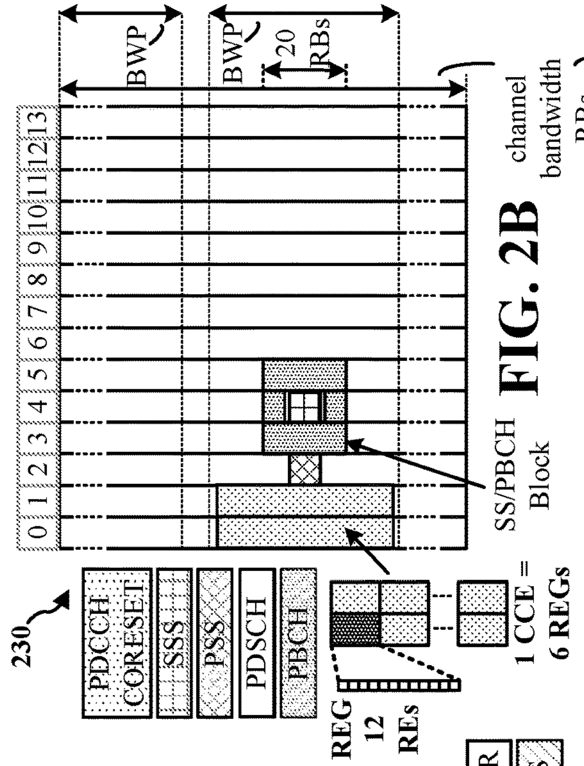
FIG. 2B is a diagram illustrating an example of downlink (DL) channels within a subframe, in accordance with various aspects of the present disclosure.
Figure 2A:
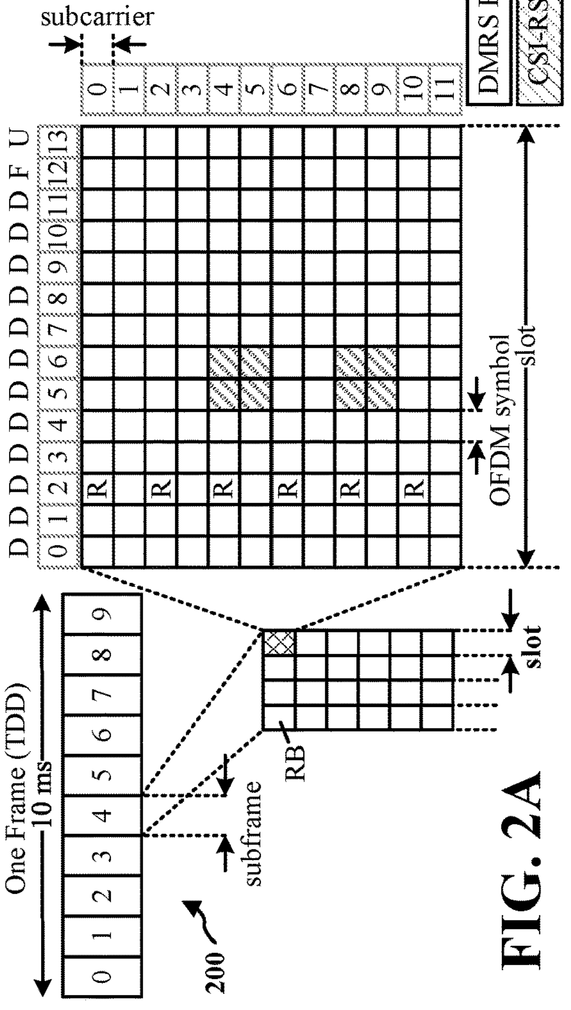
FIG. 2A is a diagram illustrating an example of a first frame, in accordance with various aspects of the present disclosure.
Figure 2D:
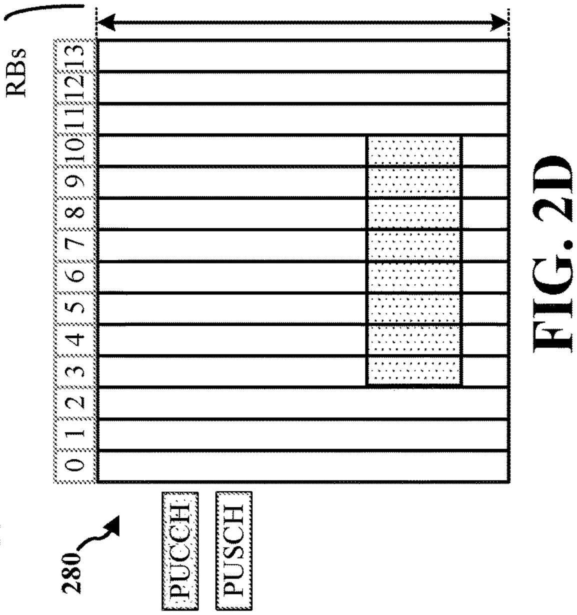
FIG. 2D is a diagram illustrating an example of uplink (UL) channels within a subframe, in accordance with various aspects of the present disclosure.
Figure 2C:
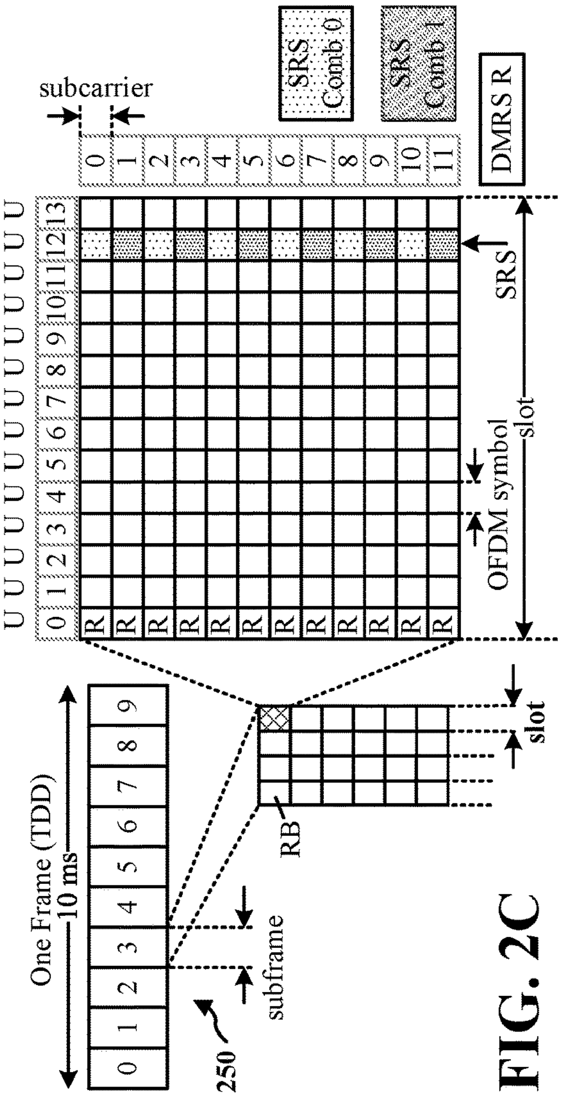
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control 1 information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 1-continued

| Numerology, SCS, and CP | | |
|---|---|---|
| $\mu$ | SCS $\Delta f = 2^{\mu} \cdot 15$[kHz] | Cyclic prefix |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
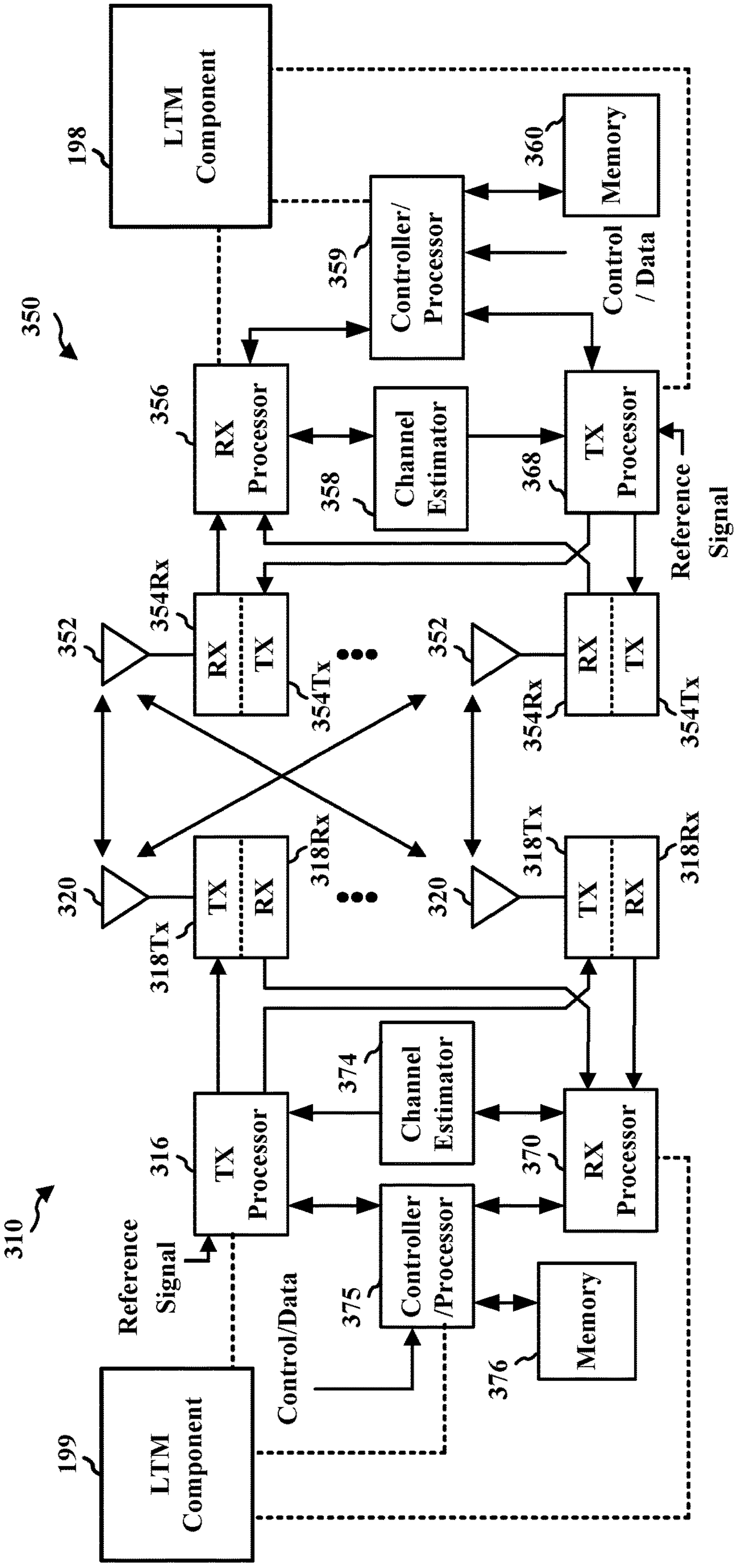
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with LTM component 198 of FIG. 1.

At least one of the TX processor 316, the RX processor 370, and the controller/processor 375 may be configured to perform aspects in connection with LTM component 199 of FIG. 1.

A network may be in communication with a UE based on one or more beams (spatial filters). For example, a network entity of the network may transmit a beamformed signal to a UE in one or more directions that correspond with one or more beams, e.g., one or more transmit beams. The UE may use a receive beam at the UE to receive the beamformed signal. Similarly, a UE may transmit a beamformed signal using one or more transmit beams, and the network entity may receive the beamformed signal using a receive beam. The network entity and the UE may perform beam training to determine the best receive and transmit directions for the network entity and the UE.

In response to different conditions, beams (e.g., a transmit and/or receive beam) may be switched. For example, a network entity may transmit an indication of a transmission configuration indication (TCI) state change to a UE so that the UE may switch to a new beam based on the indicated TCI state. The TCI state change may cause the UE to find the best UE receive beam (e.g., update the UE receive beam)

corresponding to the TCI state from the network entity, and switch to such a receive beam. Switching beams may improve the connection between the UE and the network entity by ensuring that the transmitter and receiver use the same configured set of beams for communication. A TCI state may include quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The network entity may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

As another example, a spatial relation change, such as a spatial relation update, may trigger the UE to switch beams. Beamforming may be applied to uplink channels, such as but not limited to PUCCH. Beamforming may be based on configuring one or more spatial relations between the uplink and downlink signals. Spatial relation may indicate that a UE may transmit the uplink signal using the same beam as it used for receiving the corresponding downlink signal.

As another example, a network entity may change a pathloss reference signal configuration that the UE uses to determine power control for uplink transmissions, such as SRS, PUCCH, and/or PUSCH. In response to the change in the pathloss reference signal, the UE 402 may switch to a new beam.

Figure 4A:
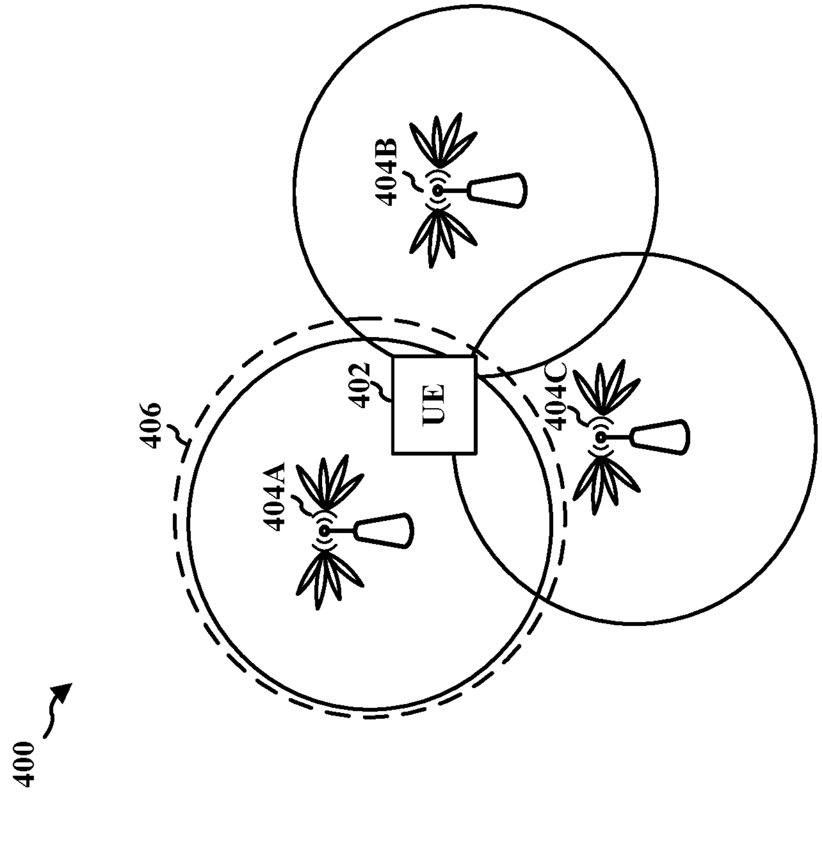
FIG. 4A is a diagram illustrating example beam management, in accordance with various aspects of the present disclosure.

Different procedures for managing and controlling beam may be collectively referred to as "beam management." The process of selecting a beam to switch to for data channels or control channels may be referred to as "beam selection." In some wireless communication systems, beam selection for data channels or control channels may be limited to beams within a same physical cell identifier (ID) (PCI). A PCI may be associated with a TRP. FIG. 4A is a diagram 400 illustrating example beam management. As illustrated in FIG. 4A, for a UE 402, beam selection 406 may be limited to beams within the PCI 404A and beams associated with the PCI 404B and the PCI 404C may not be used. As an example, each of the PCI 404A, the PCI 404B, and the PCI 404C may be associated with a different TRP.

By way of example, a UE may encounter different types of mobility-cell-level mobility and beam-level mobility (which may be beam-based mobility). For cell-level mobility, a UE may experience an inter-network node handover from a current cell serving the UE to a new cell that will serve the UE. For example, as a UE moves away from the current cell and toward the new cell, the new cell may provide improved service for the UE. In some wireless communication systems, for beam-level mobility, as previously explained, switching of beams may occur within a same network node. For example, as the UE moves or changes position, a different transmit and/or receive beam may enable the UE to transmit and receive communication more effectively with the network.

Figure 4B:
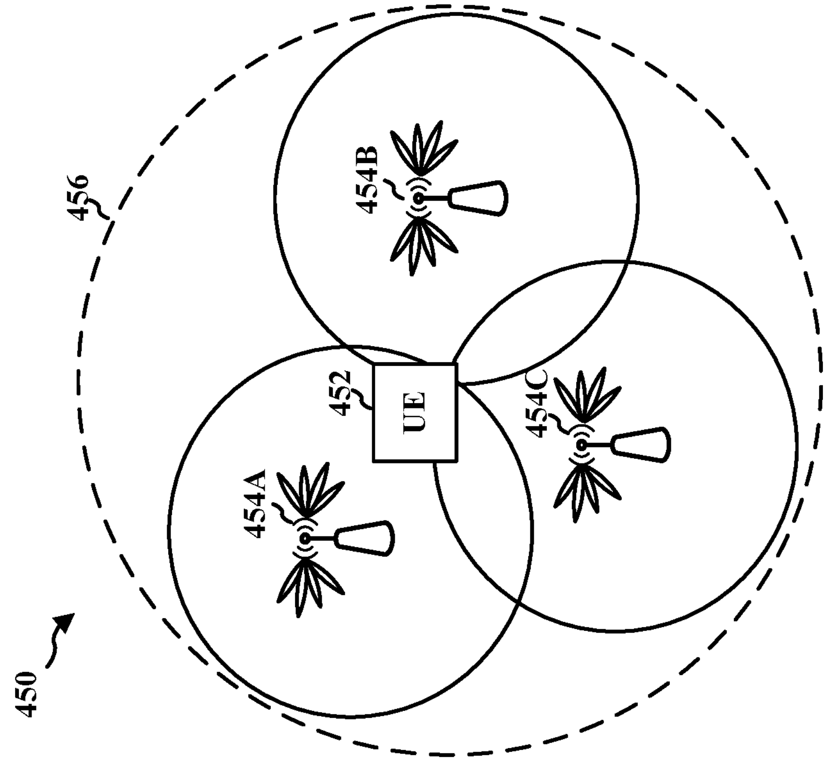
FIG. 4B is a diagram illustrating example inter-cell beam management, in accordance with various aspects of the present disclosure.

In some wireless communication systems, inter-cell beam management may be based on beam-based mobility where the indicated beam may be from a TRP with different PCI with regard to the serving cell. Benefits of inter-cell beam management based on beam-based mobility may include more robustness against blocking, more opportunities for higher rank for subscriber data management (SDM) across different cells, and in general more efficient communication between a UE and the network. FIG. 4B is a diagram 450 illustrating example inter-cell beam management. As illustrated in FIG. 4B, for a UE 452, beam selection 456 may be based on beams within the PCI 454A and beams associated with the PCI 454B and the PCI 454C. As an example, each of the PCI 454A, the PCI 454B, and the PCI 454C may be associated with a different TRP.

As an example, inter-cell beam management based on beam-based mobility may be facilitated by L1 and/or L2 signaling such as UE-dedicated channels/RSs which may be associated with a switch to a TRP with different PCI according to downlink control information (DCI) or medium access control (MAC) control element (MAC-CE) based unified TCI update. As used herein, such mobility may be referred to as L1/L2 triggered mobility or lower layer triggered mobility. In some wireless communication systems PCell change using L1/L2 signaling is not supported. A UE may be in the coverage of the serving cell when communicating with TRP with different PCI (no support for a serving cell change).

In some aspects, the network may configure a set of cells for LTM. The set of cells for LTM may be referred to as LTM configured cell set. The LTM configured cell set may include an LTM activated cell set (which may also be referred to as a L1/L2 activated mobility cell set) and an LTM deactivated cell set (which may also be referred to as a deactivated LTM cell set). The LTM activated cell set may be a group of cells in the LTM configured cell set that are activated and may be readily used for data and control transfer. The LTM deactivated cell set (which may be an LTM candidate cell set) may be a group of cells in the configured set that are configured for the UE yet deactivated and may be activated by L1/L2 signaling. Once activated, a deactivated cell may be used for data and control transfer.

For mobility management of the activated cell set, L1/L2 signaling may be used to activate/deactivate cells in the LTM configured cell set and to select beams within the activated cells (of the activated cell set). As the UE moves, cells from the LTM configured cell set may be deactivated and activated by L1/L2 signaling based on signal quality (e.g., based on measurements), loading, or the like. Example measurements may include cell coverage measurements represented by Radio Signal Received Power (RSRP), and quality represented by Radio Signal Received Quality (RSRQ), or other measurements that the UE performs on signals from the network entity. In some aspects, the measurements may be L1 measurements such as one or more of an RSRP, an RSRQ, a received signal strength indicator (RSSI), or a signal to noise and interference ratio (SINR) measurement of various signals, such as a SSB, a PSS, an SSS, a broadcast channel (BCH), a DM-RS, CSI-RS, or the like.

Figure 5:
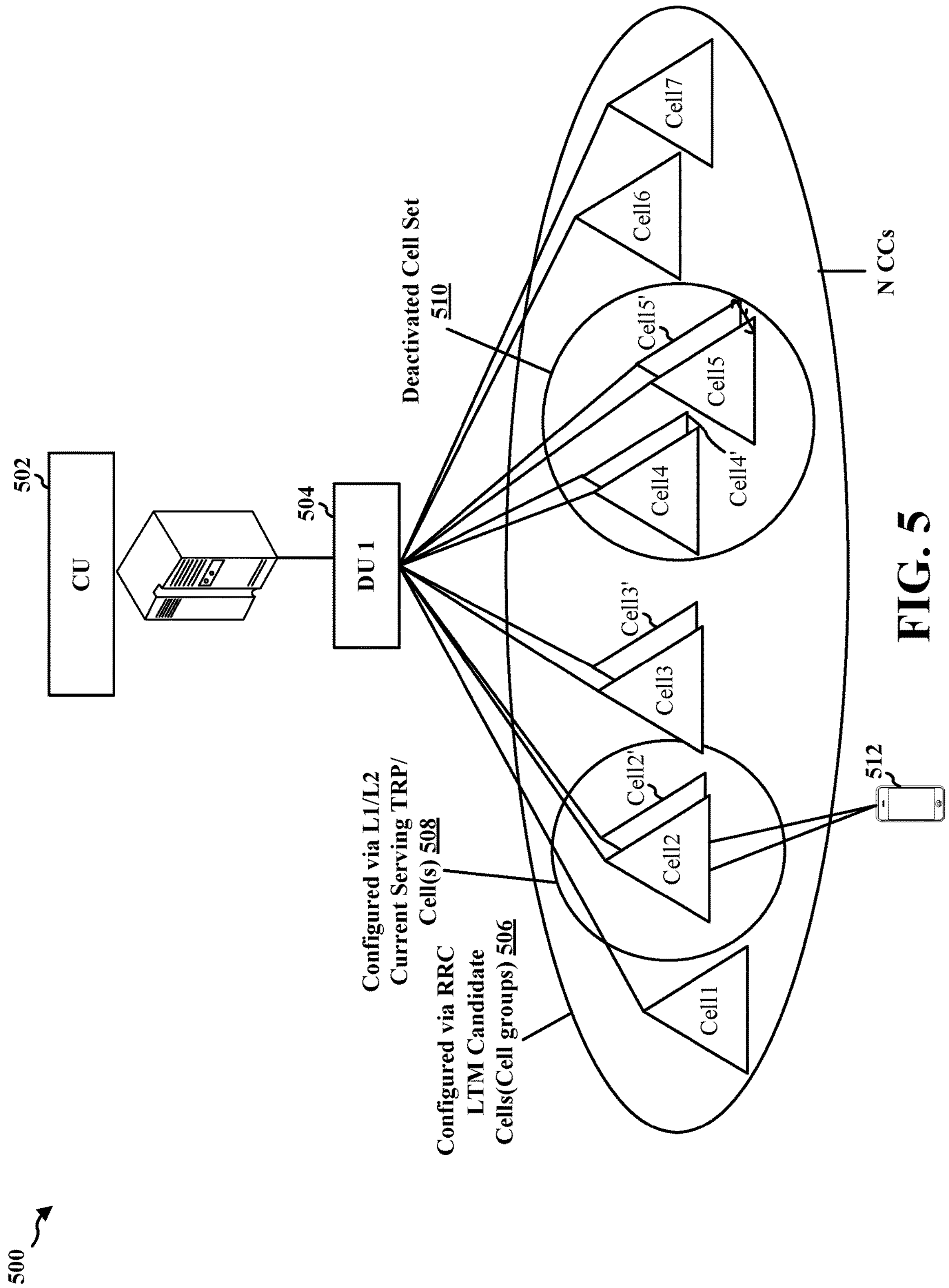
FIG. 5 is a diagram illustrating example cell configuration, in accordance with various aspects of the present disclosure.

In some aspects, all cells in the LTM configured cell set may belong to a same DU and the cells may be on a same or different carrier frequencies. Cells in the LTM configured cell set may cover a mobility area. FIG. 5 is a diagram 500 illustrating example cell configuration. As illustrated in FIG. 5, a CU 502 (which may correspond to a component of a network entity such as a gNB) may be associated with a first DU 504 (and other DUs). An LTM configured cell set 506 may be associated with the first DU 504 and may include an LTM activated cell set 508 and an LTM deactivated cell set 510. The LTM configured cell set 506 may also include one or more cells not in the current LTM activated cell set 508 or the current LTM deactivated cell set 510. For example, at a given time, the LTM activated cell set 508 may include a first subset of the LTM configured cell set, and the LTM deactivated cell set 510 may include a second, non-overlapping subset of the LTM configured cell set. There may remain one or more cells that are in the LTM configured cell set that are not in the first set subset (e.g., activated) or the second subset (e.g., deactivated). A UE 512 may use the cells in the LTM activated cell set 508 for data channel and control channel communications.

A UE may be provided with a subset of LTM deactivated cells (candidate cell set) that the UE may autonomously choose to add to the LTM activated cell set. For example, the UE may add cells in the subset of LTM deactivated cells to the LTM activated cell set based on measurements (e.g., measured channel quality), loading, or the like. In some aspects, each of the RUs could have multi-component carrier (CC) (N CCs) support (where each CC is a cell). In some aspects, activation or deactivation may be performed for groups of carriers (cells). For PCell management, L1/L2 signaling may be used to set the PCell out of the configured options within the activated cell set. In some aspects, L3 mobility may be used for PCell change (L3 handover) when a new PCell is not from the activated cell set for LTM. As an example, RRC signaling may be used to update the set of cells for LTM at L3 handover. Example aspects may enable L1/L2 based inter-cell mobility that may co-exist with CA. Example aspects may provide configuration, cell activation or deactivation, and associated with signaling to enable LTM with CA to facilitate more efficient and robust mobility management. In some aspects, LTM configured cells may be associated with a PCell configuration without being the PCell. The PCell configuration may be activated and one of the LTM activated cells (e.g., in an LTM activated cell set) may be activated based on L1/L2 signaling to become a PCell. In some aspects, LTM deactivated cells (e.g., in an LTM deactivated cell set) may support L1 measurements to facilitate sufficient beam management, timing synchronization, power control, or the like. For LTM deactivated cells, measurement reporting may be done on an activated cell. In LTM, a special cell (SpCell) (which may be a PCell or a PSCell) change may be done via L2 signaling (e.g., MAC-CE) and enabled by other L1/L2 signaling. The LTM may be configured via RRC and the LTM configuration may be provided to a UE upfront (e.g., before LTM starts). LTM may be network controlled and the source cell of the network may provide or control: (1) L1 measurements and reporting configuration, (2) decision to switch cell(s), (3) enhancements before cell switch such as pre-synchronization, timing advance (TA) handling, target cell beam management, or the like).

Aspects provided herein may provide various enhancements to LTM. A first enhancement may be related to handling co-existence between LTM and conditional handover (CHO), conditional primary secondary cell (PSCell) addition (CPA), or conditional PSCell Change (CPC) A second enhancement may be related to providing additional secondary cell group (SCG) failure information when LTM failure for PSCell occurs. A third enhancement may be related to enhancing reporting of conditions for conditional LTM which may contribute to mobility robustness optimization (MRO). A fourth enhancement may be related to enhancing an successful handover report (SHR) or a successful primary secondary cell change report (SPR) regarding CHO, CPA, or CPC execution related to LTM or recording SHR or SPR when there is a near LTM failure during primary cell (PCell) or PSCell change. A fifth enhancement may be related to measuring interruption time during LTM and RACH-less handover (or PSCell change). A sixth enhancement may be related to distinguishing RACH-based and RACH-less LTM failures so that the network may have more information regarding the failures. A seventh enhancement may be related to indicating information regarding target beam or reconnected beam for the network for a beam failure during handover or LTM. The enhancements provided by aspects herein may enable more efficient operation of the LTM because the network or the UE may have more information for resolving potential failures and may better handle co-existence of LTM and CHO, CPA, or CPC.

Figure 6:
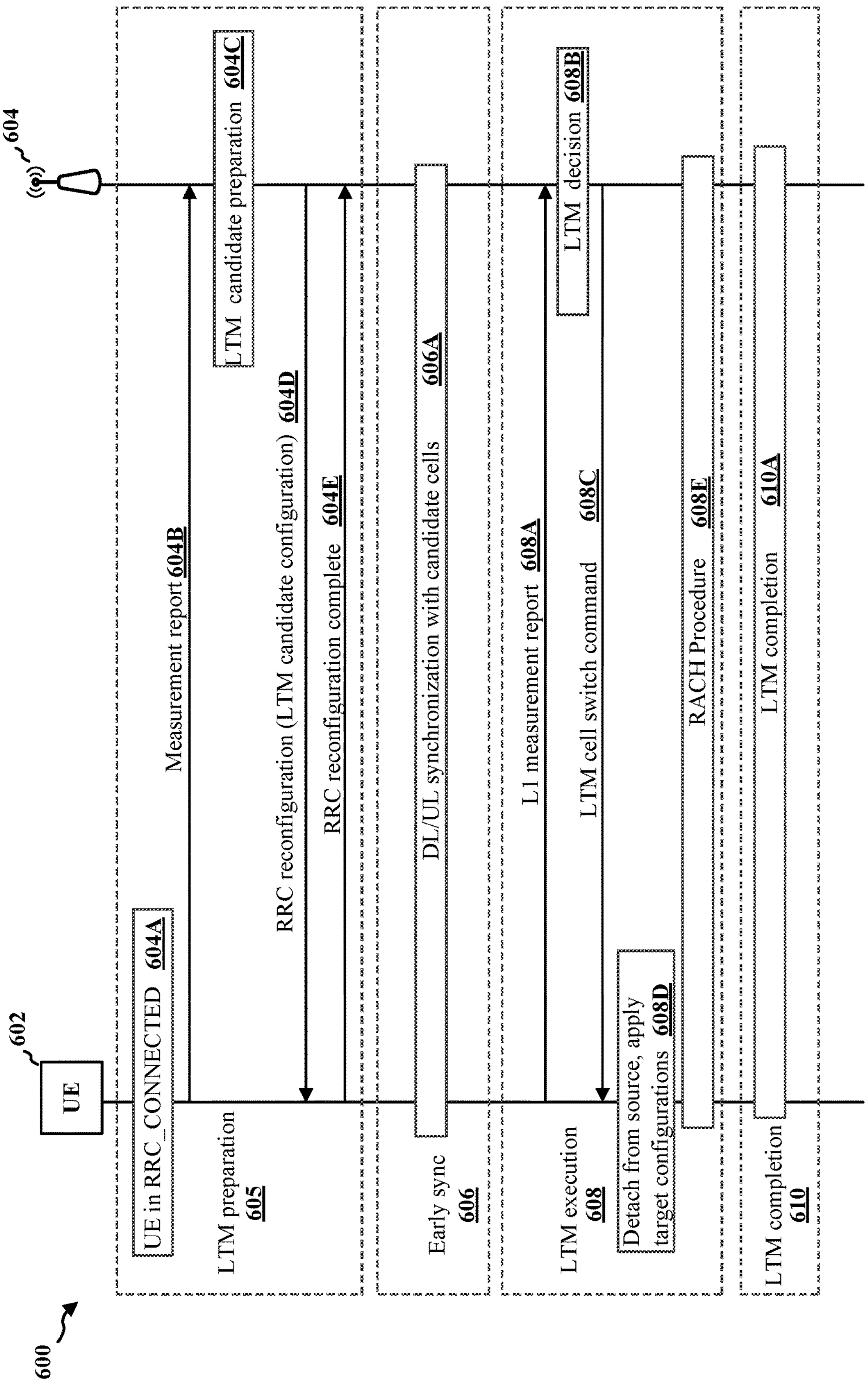
FIG. 6 is a diagram illustrating example communications between a network entity and a UE for lower-layer triggered mobility (LTM), in accordance with various aspects of the present disclosure.

FIG. 6 is a diagram 600 illustrating example communications between a network entity 604 and a UE 602 for lower-layer triggered mobility (LTM) or L1/L2 triggered mobility, in accordance with various aspects of the present disclosure. As illustrated in FIG. 6, at 605, the UE 602 and the network entity 604 may prepare for LTM. At 604A, the UE 602 may be in an RRC connected mode, and the UE 602 may transmit a measurement report 604B to the network entity 604. The measurement report 604B may include L1/L2 measurements. Based on the measurement report 604B, the network entity 604 may perform an LTM candidate preparation at 604C and identify one or more LTM candidate cells. The network entity 604 may transmit an RRC configuration 604D for LTM to the UE 602. The RRC configuration 604D may include an LTM candidate configuration (e.g., identifying LTM candidate cells) and measurement and reporting configuration (e.g., related to transmitting L1 measurement report for LTM). Upon receiving the RRC configuration 604D, the UE 602 may indicate to the network entity 604 that RRC reconfiguration is complete (e.g., by transmitting an indication 604E).

Once LTM is prepared (e.g., configured), at 606, the UE 602 and the network entity 604 may perform early synchronization. For example, the UE 602 may perform downlink or uplink synchronization with the LTM candidate cells at 606A. In some aspects, based on the measurement and reporting configuration included in the RRC configuration 604D or another configuration, the UE 602 and the network entity 604 may perform LTM execution 608. In some aspects, based on the measurement and reporting configuration included in the RRC configuration 604D or another configuration, the UE 602 may transmit L1 measurement report 608A to the network entity 604. In some aspects, based on the L1 measurement report 608A from the UE 602, the network entity 604 may perform an LTM decision at 608B to determine whether to trigger LTM for the UE 602. If the network entity 604 determines to trigger LTM for the UE 602 at 608B, the network entity 604 may transmit an LTM cell switch command 608C to the UE 602. The term "LTM cell switch command" may refer to a command (e.g., via MAC-CE) from a network to a UE to trigger the LTM. Upon receiving the LTM cell switch command 608C, the UE 602 may detach from a current source cell and apply configurations for a target cell (e.g., which may be one of a candidate LTM cell included in the LTM candidate configuration) at 608D and perform a RACH procedure 608E with the target cell (e.g., if TA is not available). After performing the RACH procedure 608E, at 610, the LTM may be completed and the UE 602 and the network entity 604 may exchange communication for LTM completion at 610A (e.g., the UE 602 may indicate LTM completion to the network entity 604). The process to detach from a current source cell, apply configurations for a target LTM candidate cell, and connect to the LTM candidate cell may be referred to as "LTM cell switch."

Figure 7:
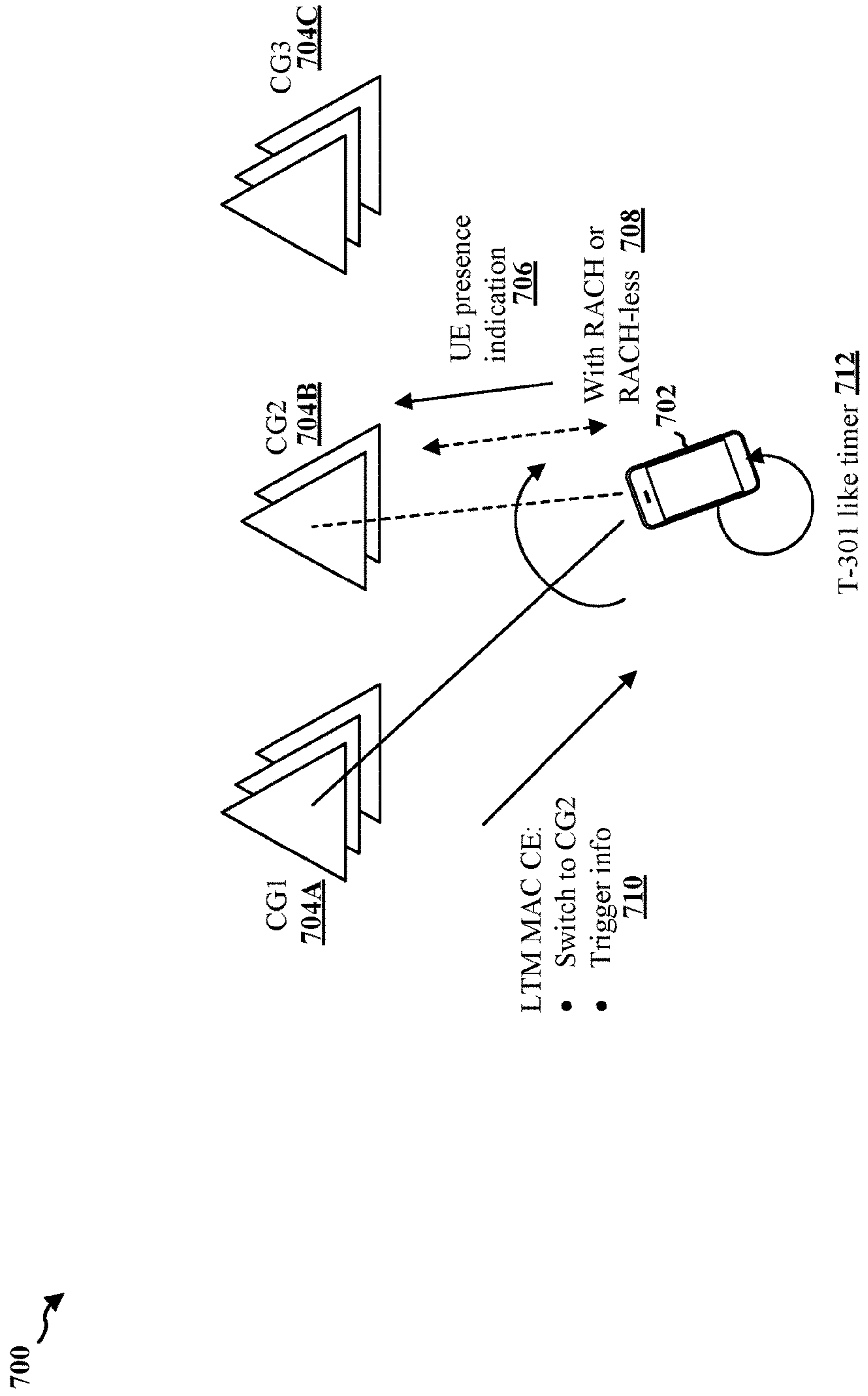
FIG. 7 is a diagram illustrating example dynamic cell switch for LTM, in accordance with various aspects of the present disclosure.

FIG. 7 is a diagram 700 illustrating an example dynamic cell switch for LTM, in accordance with various aspects of the present disclosure. For a UE 702 connected to a first cell group 704A among cell groups including the first cell group 704A, a second cell group 704B, and a third cell group 704C associated with a same network, the network may transmit an LTM MAC-CE 710 to the UE for triggering LTM. The MAC-CE may carry LTM related information for each LTM candidate cell. Both RACH based (contention free random access or contention based random access) and RACH-less procedure 708 for LTM may be supported. For example, if the UE 702 would not acquire TA during the LTM cell switch, RACH-less procedure may be used. If the UE 702 would acquire TA during the LTM cell switch, RACH based LTM procedure may be used. LTM cell switch may be supervised by a timer 712 and UE arrival in the target cell (e.g., complete connection to the target cell) may be indicated in a UE presence indication 706.

Figure 8A:
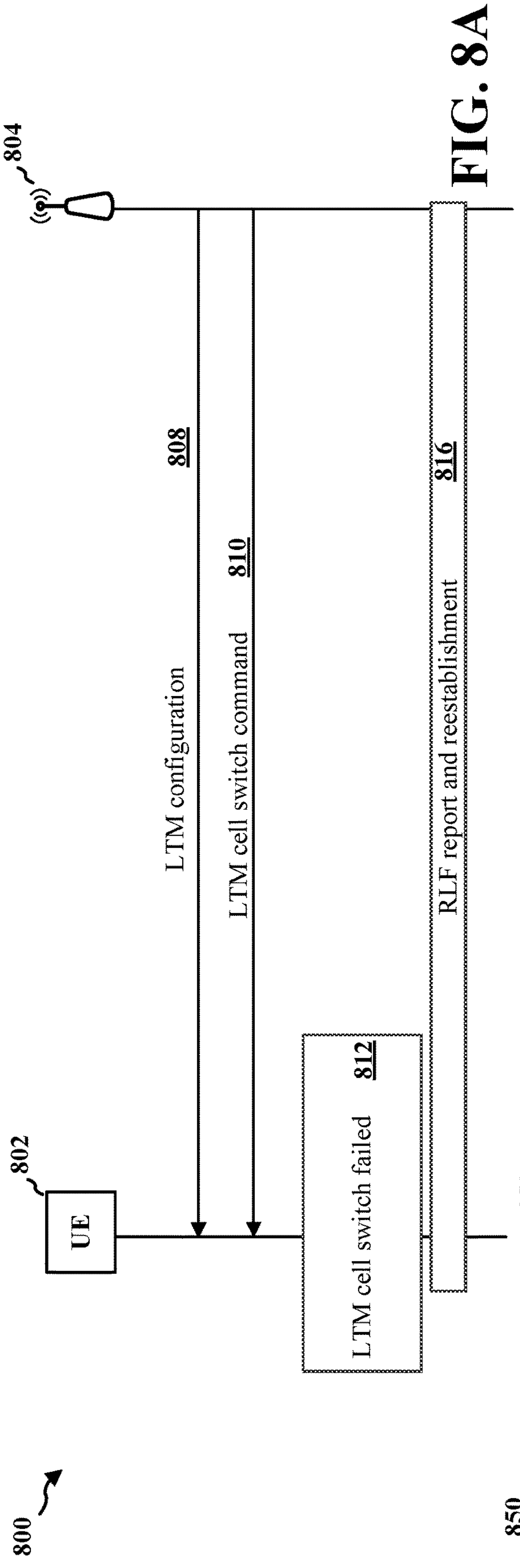
FIG. 8A is a diagram illustrating example communications between a network entity and a UE when LTM failure occurs due to an LTM cell switch failed, in accordance with various aspects of the present disclosure.

LTM may fail under different scenarios. FIG. 8A is a diagram 800 illustrating example communications between a network entity 804 and a UE 802 when an LTM failure occurs due to an LTM cell switch failure, in accordance with various aspects of the present disclosure. As illustrated in FIG. 8A, the UE 802 may receive an LTM configuration 808 in a transmission from the network entity 804. The LTM configuration 808 may be included in an RRC configuration (e.g., RRC message(s)) that may include the LTM candidate configuration (e.g., identifying LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving an L1 measurement, or when a different condition for triggering the LTM occurs, the network entity 804 may determine to trigger the LTM for the UE 802. The network transmits an LTM cell switch command 810 to the UE 802. The LTM cell switch command 810 may be included in a MAC-CE that may include trigger information for the LTM and may carry LTM related information for the UE 802 to perform cell switch. In some aspects, the LTM configuration 808 may indicate a set of LTM candidate cell configurations and the LTM cell switch command 810 may select one LTM candidate cell configuration among the configured set of LTM candidate cell configurations. In some aspects, the LTM cell switch may fail at 812. In such aspects, the UE 802 may transmit a radio link failure (RLF) report at 816. In some aspects, at 816, the UE 802 may also perform re-establishment of the connection. In some aspects, the RLF report at 816 may include information regarding the last LTM cell switch command 810, such as, the configuration ID, beam ID, TCI state ID, CFRA resources sent in the last LTM cell switch command 810, or the like. In some aspects, the RLF report at 816 may include information regarding the last LTM configuration, such as a reference configuration, one or more candidate configurations, or an L1 measurement configuration ID. Such information may be provided to the network entity 804 to assist in MRO. The information in the RLF at 816 may be stored by the UE 802 for a long period of time (e.g., up to two days) before transmission and such information may be already deleted by the network entity 804, even if these information were known to the network entity 804.

Figure 8B:
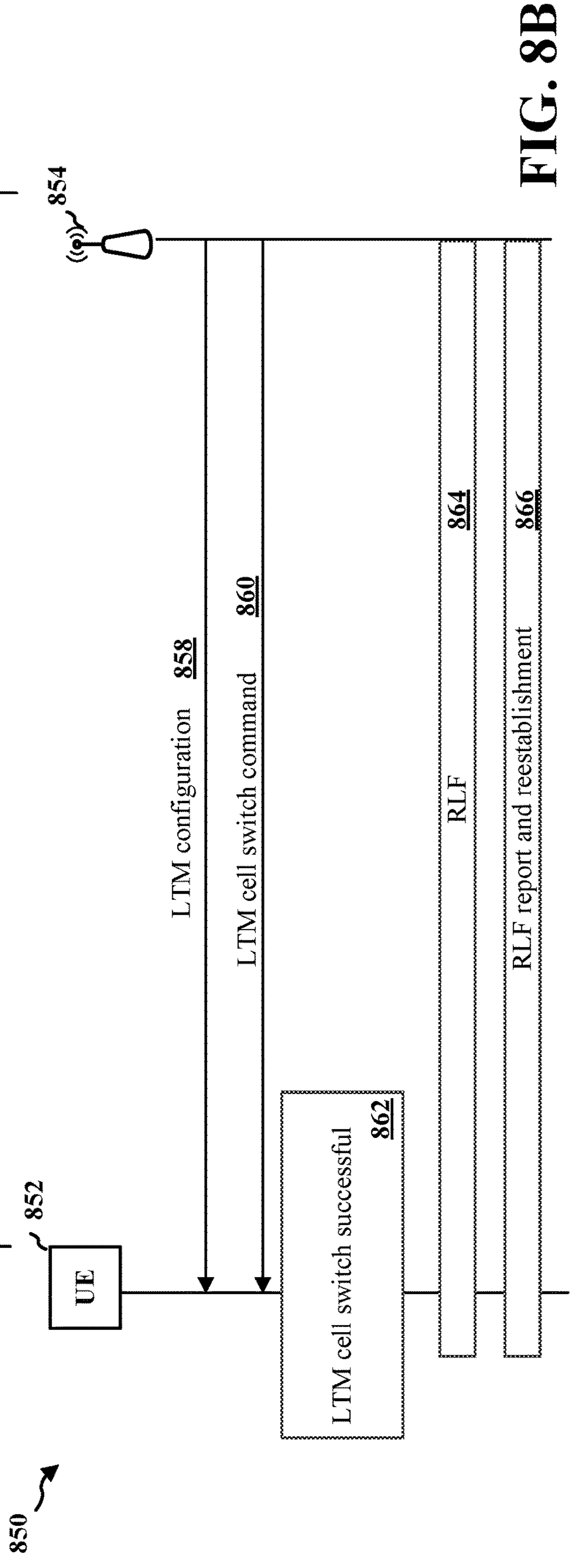
FIG. 8B is a diagram illustrating example communications between a network entity and a UE when LTM failure occurs due to a radio link failure (RLF) occurred, in accordance with various aspects of the present disclosure.

FIG. 8B is a diagram 850 illustrating example communications between a network entity 854 and a UE 852 when LTM failure occurs due to a radio link failure (RLF) occurred, in accordance with various aspects of the present disclosure.

As illustrated in FIG. 8B, the UE 852 may receive an LTM configuration 858 from the network entity 854. The LTM configuration 858 may be an RRC configuration that may include LTM candidate configuration (e.g., identifying LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving a L1 measurement or a different condition occurring for triggering the LTM, the network entity 854 may determine to trigger LTM for the UE 852 and transmit an LTM cell switch command 860 to the UE 852. The LTM cell switch command 860 may be a MAC-CE that may include trigger information for the LTM and may carry LTM related information for the UE 852 to perform cell switch. In some aspects, the LTM configuration 858 may configure a set of LTM candidate cell configurations and the LTM cell switch command 860 may select one LTM candidate cell configuration among the configured set of LTM candidate cell configurations. In some aspects, the LTM cell switch may succeed at 862. However, there may be a radio link failure 864 shortly after the LTM cell switch at 862. In such aspects, the UE 852 may transmit a radio link failure (RLF) report at 866. In some aspects, at 866, the UE 852 may also perform re-establishment of the connection. In some aspects, the RLF report at 866 may include information regarding the last LTM cell switch command 860, such as, the configuration ID, beam ID, TCI state ID, CFRA resources sent in the last LTM cell switch command 860, or the like. In some aspects, the RLF report at 866 may include information regarding the last LTM configuration, such as a reference configuration, one or more candidate configurations, or a L1 measurement configuration ID. Such information may be provided to the network entity 854 to assist in MRO. The information in the RLF at 866 may be stored by the UE 852 for a long period of time (e.g., up to two days) before transmission and such information may be already deleted by the network entity 854 even if these information were known to the network entity 854.

When the UE undergoes reestablishment either due to LTM cell switch failure (e.g., as described in connection with FIG. 8A) or upon encountering an RLF shortly (e.g., in less time than a configured threshold) after a successful LTM (e.g., as described in connection with FIG. 8B), the UE may indicate to the network entity that the reestablishment is due to LTM failure. For example, the UE may include an indication of a reestablishment cause, such as in the form of an information element (IE) reestablishmentCause=LTM Failure in a RRC reestablishment request that the UE transmits to the network entity to trigger the reestablishment. In some aspects, the UE may include an indication of a reestablishment cause (e.g., indicating LTM failure) in a transmission of the RLF report.

A network may transmit a configuration to a UE for both CHO and LTM. When there is an LTM cell switch failure or an RLF shortly (e.g., in less time than a configured threshold) after a successful LTM, if recovery is configured by the network, the UE may (1) perform CHO recovery if the selected cell after RLF is a CHO candidate cell, (2) perform LTM recovery if the selected cell after RLF is an LTM candidate cell, or (3) determine to perform CHO recovery or LTM recovery if the selected cell after RLF is both a CHO candidate cell and an LTM candidate cell. If no recovery is configured by the network, the UE may perform a cell selection and perform reestablishment on the selected cell.

Figure 9A:
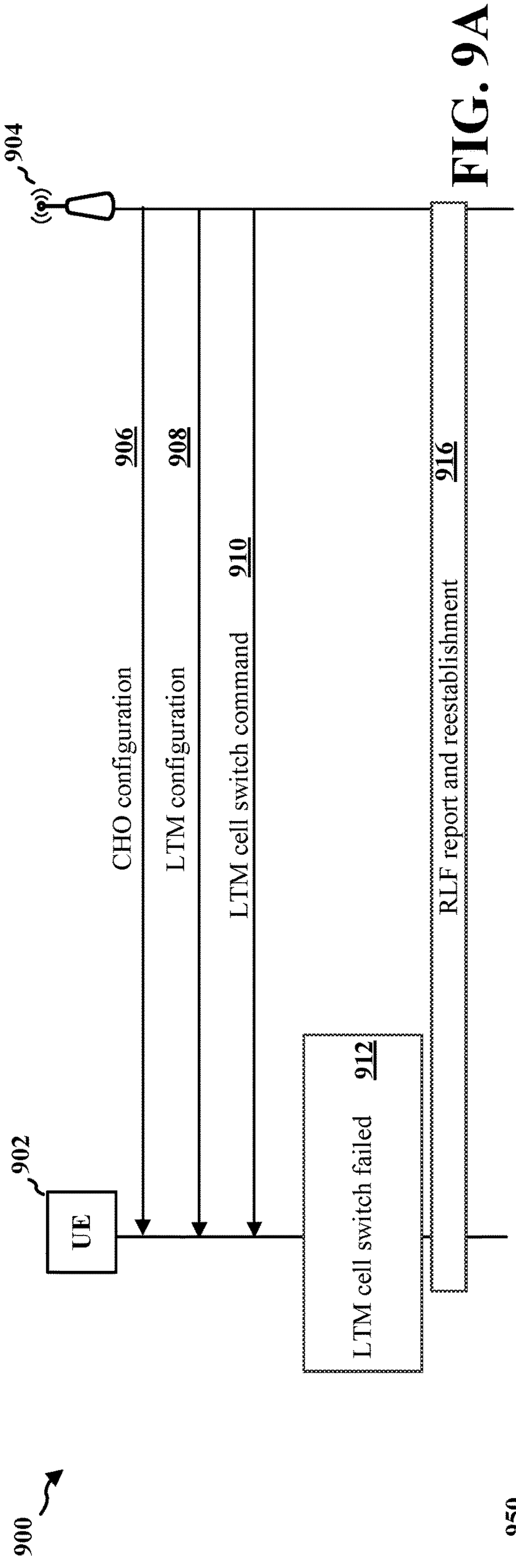
FIG. 9A is a diagram illustrating example communications between a network entity and a UE configured with conditional handover (CHO) when LTM failure occurs due to an LTM cell switch failed, in accordance with various aspects of the present disclosure.

FIG. 9A is a diagram 900 illustrating example communications between a network entity 904 and a UE 902 configured with CHO when the LTM failure occurs due to an LTM cell switch failure, in accordance with various aspects of the present disclosure.

As illustrated in FIG. 9A, the UE 902 may receive a CHO configuration 906 in a transmission from the network entity 904. The CHO configuration 906 may include multiple candidate target PSCells associated with each candidate target PCell. The CHO configuration 906 may be included in a radio resource control message and may indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a master cell group and a SCG for each combination of a candidate target PCell and candidate target PSCell, or a combination thereof. The CHO configuration 906 may further include a measurement configuration from a source node or a target node. As illustrated in FIG. 9A, the UE 902 may receive an LTM configuration 908 in a transmission from the network entity 904. The LTM configuration 908 may be an RRC configuration that may include LTM candidate configuration (e.g., identifying LTM candidate cells and including information related to the LTM candidate cells) and measurement and reporting configuration (e.g., related to transmitting the L1 measurement report for LTM such as the type of L1 metrics to include in the report, statistics information to be included in the L1 measurement report (e.g., means, median, average over a period of time, or the like), or measurement related conditions such as different thresholds with respect to different metrics for triggering the transmission of the L1 measurement report). In some aspects, upon receiving a L1 measurement or a different condition occurring for triggering the LTM, the network entity 904 may determine to trigger LTM for the UE 902 and transmit an LTM cell switch command 910 to the UE 902. The LTM cell switch command 910 may be included in a MAC-CE that may include trigger information for the LTM and may carry LTM related information for the UE 902 to perform the cell switch. In some aspects, the LTM configuration 908 may configure a set of LTM candidate cell configurations, and the LTM cell switch command 910 may select one LTM candidate cell configuration among the configured set of LTM candidate cell configurations. In some aspects, the LTM cell switch may fail, as shown at 912. In such aspects, the UE 902 may transmit a radio link failure (RLF) report at 916. In some aspects, at 916, the UE 902 may also perform re-establishment of the connection. In some aspects, the RLF report at 916 may include information regarding the last LTM cell switch command 910, such as, the configuration ID, beam ID, TCI state ID, CFRA resources sent in the last LTM cell switch command 910, or the like. In some aspects, the RLF report at 916 may include information regarding the last LTM configuration, such as a reference configuration, one or more candidate configurations, or a L1 measurement configuration ID. Such information may be provided to the network entity 904 to assist in MRO. The information in the RLF at 916 may be stored by the UE 902 for a long period of time (e.g., up to two days) before transmission and such information may be already deleted by the network entity 904 even if these information were known to the network entity 904.

Figure 9B:
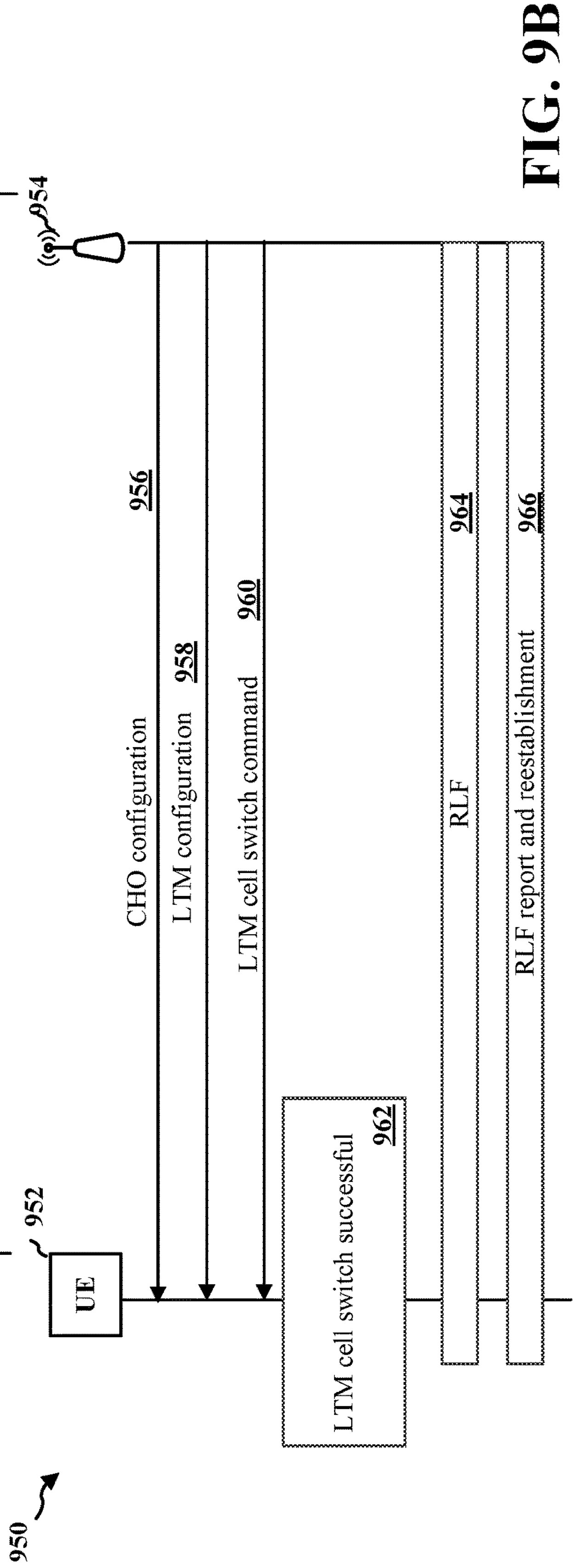
FIG. 9B is a diagram illustrating example communications between a network entity and a UE configured with CHO when LTM failure occurs due to a RLF occurred, in accordance with various aspects of the present disclosure.

FIG. 9B is a diagram 950 illustrating example communications between a network entity 954 and a UE 952 configured with CHO, the communications involving LTM failure that occurs due to a RLF, in accordance with various aspects of the present disclosure.

As illustrated in FIG. 9B, the UE 952 may receive the CHO configuration 956 in a transmission from the network entity 954. The CHO configuration 956 may include multiple candidate target PSCells associated with each candidate target PCell. The CHO configuration 956 may be included in a radio resource control (RRC) message and may indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a master cell group and a SCG for each combination of a candidate target PCell and candidate target PSCell, or a combination thereof. The CHO configuration 956 may further include a measurement configuration from a source node or a target node. The UE 952 may receive LTM configuration 958 from the network entity 954. The LTM configuration 958 may be an RRC configuration that may include LTM candidate configuration (e.g., identifying the LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving an L1 measurement or a different condition occurring for triggering the LTM, the network entity 954 may determine to trigger LTM for the UE 952 and transmit an LTM cell switch command 960 to the UE 952. The LTM cell switch command 960 may be included in a MAC-CE that may include trigger information for the LTM and may carry LTM related information for the UE 952 to perform cell switch. In some aspects, the LTM configuration 958 may configure a set of LTM candidate cell configurations and the LTM cell switch command 960 may select one LTM candidate cell configuration among the configured set of LTM candidate cell configurations. In some aspects, the LTM cell switch may succeed at 962. However, there may be a radio link failure 964 shortly after the LTM cell switch at 962. In such aspects, the UE 952 may transmit a radio link failure (RLF) report at 966. In some aspects, at 966, the UE 952 may also perform re-establishment of the connection. In some aspects, the RLF report at 966 may include information regarding the last LTM cell switch command 960, such as, the configuration ID, beam ID, TCI state ID, CFRA resources sent in the last LTM cell switch command 960, or the like. In some aspects, the RLF report at 966 may include information regarding the last LTM configuration, such as a reference configuration, one or more candidate configurations, or an L1 measurement configuration ID. Such information may be provided to the network entity 954 to assist in MRO. The information in the RLF at 966 may be stored by the UE 952 for a long period of time (e.g., up to two days) before transmission and such information may be already deleted by the network entity 954 even if these information were known to the network entity 954.

In some aspects, if there is there is an LTM cell switch failure or an RLF shortly (e.g., within a configured time threshold) after a successful LTM, and recovery is not configured for the UE, the UE may collect an RLF report and include information in the report including one or more indications and timing information. The one or more indications and the timing information may be used by the network to know whether there were CHO and LTM configured at the same time and to ensure CHO-LTM joint optimizations can be performed (e.g., by accordingly preparing candidates for LTM and CHO, deciding whether or not to configure CHO recovery for LTM failures, or the like). In some aspects, the one or more indications may include an indication indicating if the UE was configured with CHO when there is an LTM failure, an indication indicating if the UE was configured with LTM (e.g., had received an LTM configuration) when a CHO failure occurred, or an indication indicating if the UE was configured with CHO or LTM when an RLF occurred. The timing information may be used by the network entity to optimize LTM and CHO configurations. The timing information may include: (1) time between LTM cell switch command (e.g., time of reception or transmission) and LTM failure (or RLF) (e.g., to detect too-early LTM) or (2) a time between LTM configuration (e.g., time of reception or transmission) and LTM cell switch command and a time between the configuration (CHO configuration or LTM configuration) and corresponding failure (CHO failure or LTM failure). In some aspects, the timing information may include a time between the LTM configuration and the LTM failure if LTM failure happens before CHO execution or a time between CHO execution and CHO failure if CHO execution failure happens before LTM. In some aspects, the timing information may include a time between CHO configuration and LTM configuration (e.g., to enable the network entity to know whether CHO configuration and LTM configuration were configured simultaneously or separately).

Figure 10:
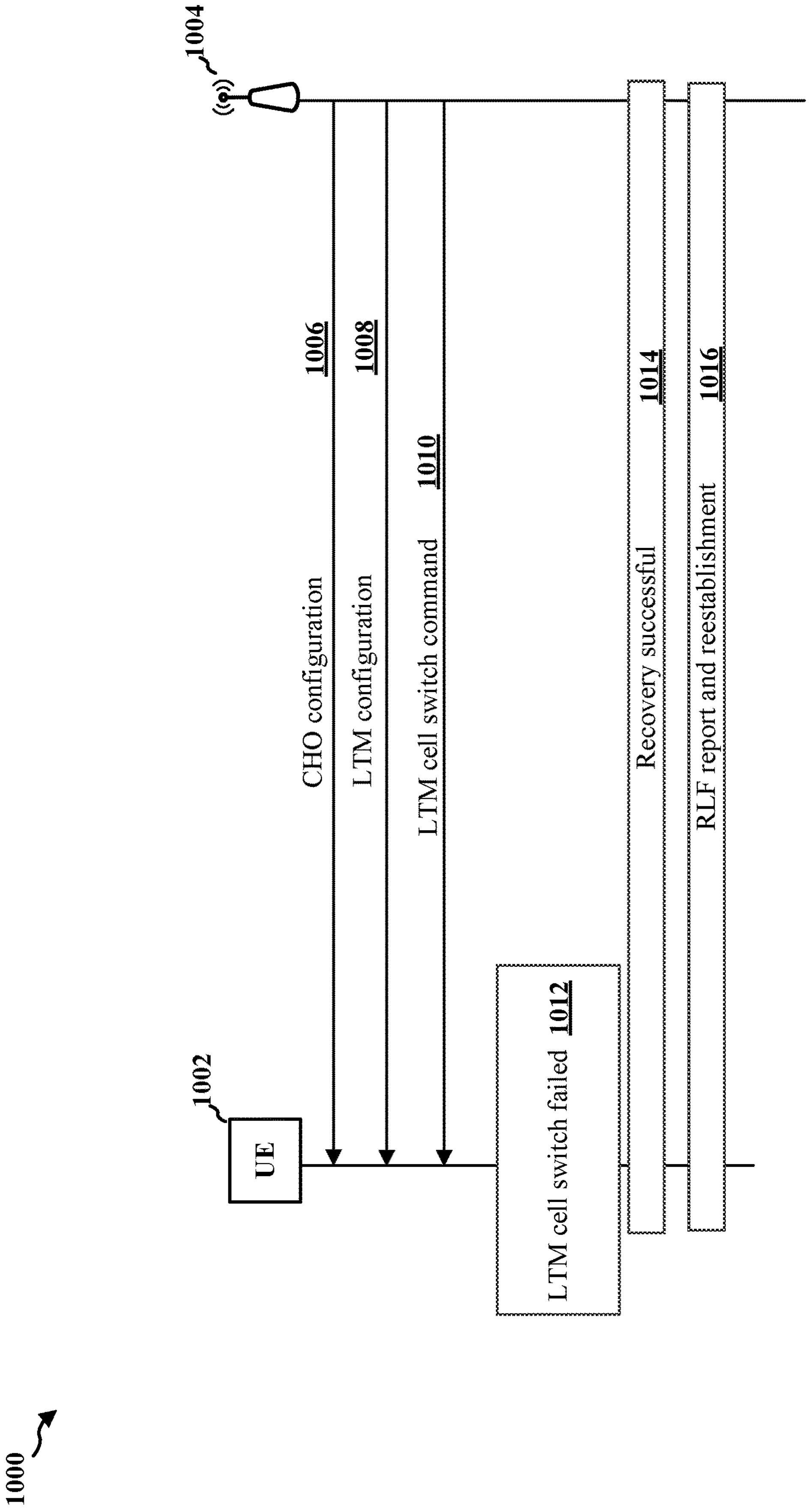
FIG. 10 is a diagram illustrating example communications between a network entity and a UE configured with CHO when LTM failure occurs and a recovery is successful, in accordance with various aspects of the present disclosure.

FIG. 10 is a diagram 1000 illustrating example communications between a network entity 1004 and a UE 1002 configured with CHO. Aspects of the communication are based on the occurrence of an LTM failure and a successful recovery, in accordance with various aspects of the present disclosure. As illustrated in FIG. 10, the UE 1002 may receive CHO configuration 1006 from the network entity 1004. The CHO configuration 1006 may include multiple candidate target PSCells associated with each candidate target PCell. The CHO configuration 1006 may be included in a radio resource control message and may indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a master cell group and a SCG for each combination of a candidate target PCell and candidate target PSCell, or a combination thereof. The CHO configuration 1006 may further include a measurement configuration from a source node or a target node. As illustrated in FIG. 10, the UE 1002 may receive an LTM configuration 1008 in a transmission from the network entity 1004. The LTM configuration 1008 may be an RRC configuration that may include the LTM candidate configuration (e.g., identifying LTM candidate cells and including information related to the LTM candidate cells) and measurement and reporting configuration (e.g., related to transmitting L1 measurement report for the LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving an L1 measurement, or a different condition occurring for triggering the LTM, the network entity 1004 may determine to trigger the LTM for the UE 1002 and transmit an LTM cell switch command 1010 to the UE 1002. The LTM cell switch command 1010 may be a MAC-CE that may include trigger information for the LTM and may carry LTM related information for the UE 1002 to perform cell switch. In some aspects, the LTM configuration 1008 may configure a set of LTM candidate cell configurations and the LTM cell switch command 1010 may select one LTM candidate cell configuration among the configured set of LTM candidate cell configurations. In some aspects, the LTM cell switch may fail, as shown at 1012. In some aspects, at 1014, a recovery may be successful, and the RLF report and reestablishment (e.g., at 1016) may not be performed.

Figure 11:
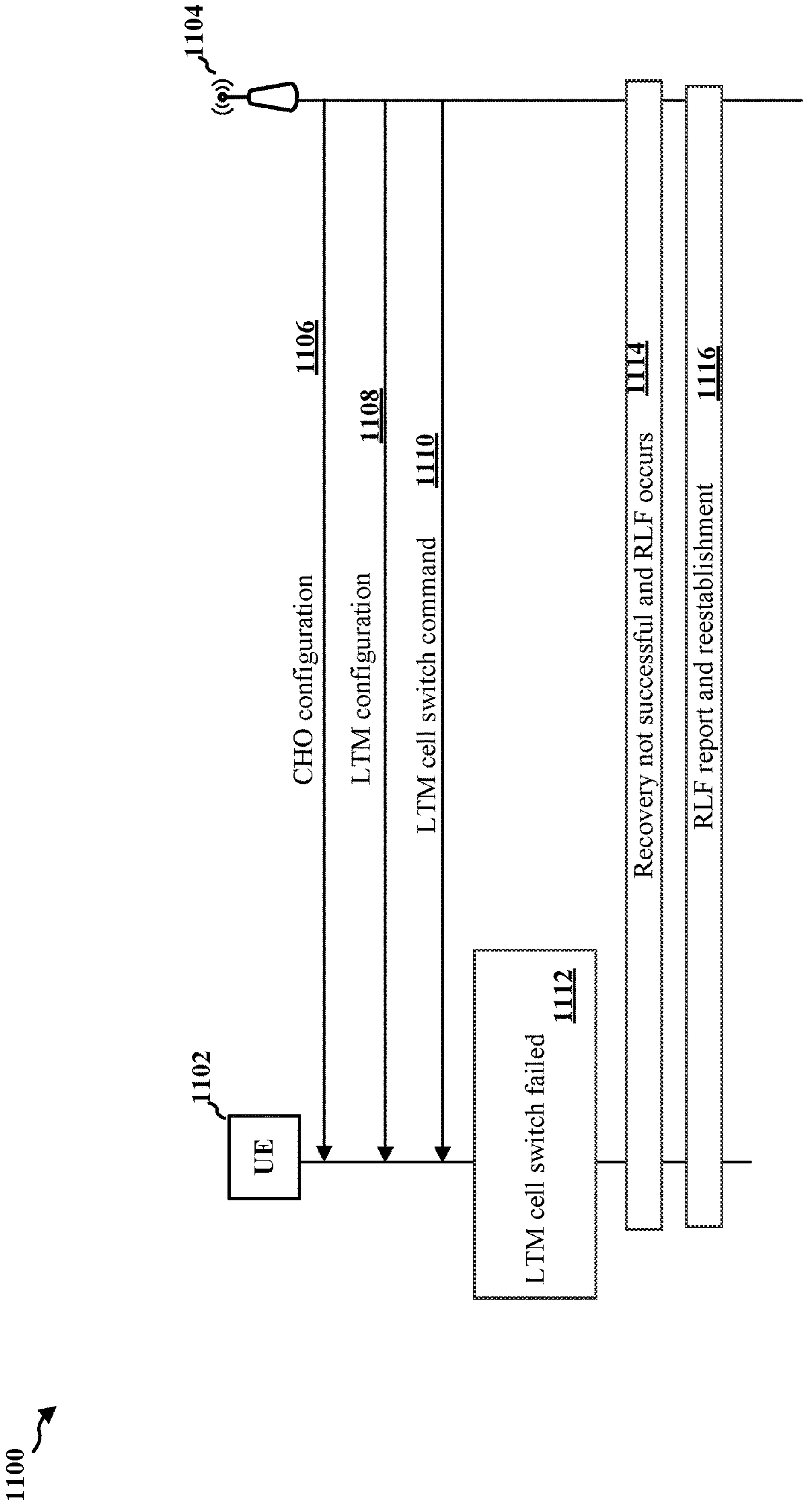
FIG. 11 is a diagram illustrating example communications between a network entity and a UE configured with CHO when LTM failure occurs and a recovery failed, in accordance with various aspects of the present disclosure.

FIG. 11 is a diagram 1100 illustrating example communications between a network entity 1104 and a UE 1102 configured with CHO. Aspects of the communication are based on an occurrence of an LTM failure and a recovery failure, in accordance with various aspects of the present disclosure. As illustrated in FIG. 11, the UE 1102 may receive a CHO configuration 1106 in a transmission from the network entity 1104. The CHO configuration 1106 may include multiple candidate target PSCells associated with each candidate target PCell. The CHO configuration 1106 may be included in an RRC message and may indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a master cell group and a SCG for each combination of a candidate target PCell and candidate target PSCell, or a combination thereof. The CHO configuration 1106 may further include a measurement configuration from a source node or a target node. As illustrated in FIG. 11, the UE 1102 may receive an LTM configuration 1108 in a transmission from the network entity 1104. The LTM configuration 1108 may be an RRC configuration that may include the LTM candidate configuration (e.g., identifying LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving an L1 measurement, or a different condition occurring for triggering the LTM, the network entity 1104 may determine to trigger the LTM for the UE 1102 and may transmit an LTM cell switch command 1110 to the UE 1102. The LTM cell switch command 1110 may be indicated in a MAC-CE that may include trigger information for the LTM and may carry LTM related information for the UE 1102 to perform cell switch. In some aspects, the LTM configuration 1108 may configure a set of LTM candidate cell configurations and the LTM cell switch command 1110 may select one LTM candidate cell configuration among the configured set of LTM candidate cell configurations. In some aspects, the LTM cell switch may fail at 1112. In some aspects, at 1114, a recovery may fail and RLF report and reestablishment (e.g., at 1116) may be performed.

In some aspects, an RLF report may include: (1) a cell group identifier (CGI) of the cell where the UE attempted recovery after an LTM cell switch failure, (2) a type of recovery (CHO recovery or LTM recovery) in case the selected cell after RLF is both a CHO candidate cell and LTM candidate cell, (3) a time between LTM cell switch failure and successful recovery, (4) a time between the two failures, in case the recovery also failed (e.g., as described in connection with FIG. 11).

In some aspects, a UE may be configured by the network with CHO/CPA/CPC evaluation conditions, and the UE may receive an LTM cell switch command before the CHO/CPA/CPC execution. In some aspects, a UE may stop evaluating CHO/CPC/CPA execution conditions or stop performing CHO/CPC/CPA execution if an LTM cell switch command is received. In some aspects, the LTM may be stopped if the CHO/CPA/CPC execution would happen and the UE may indicate to network entity that the LTM cell switch failed (stopped) because the CHO/CPA/CPC would be executed.

Figure 12:
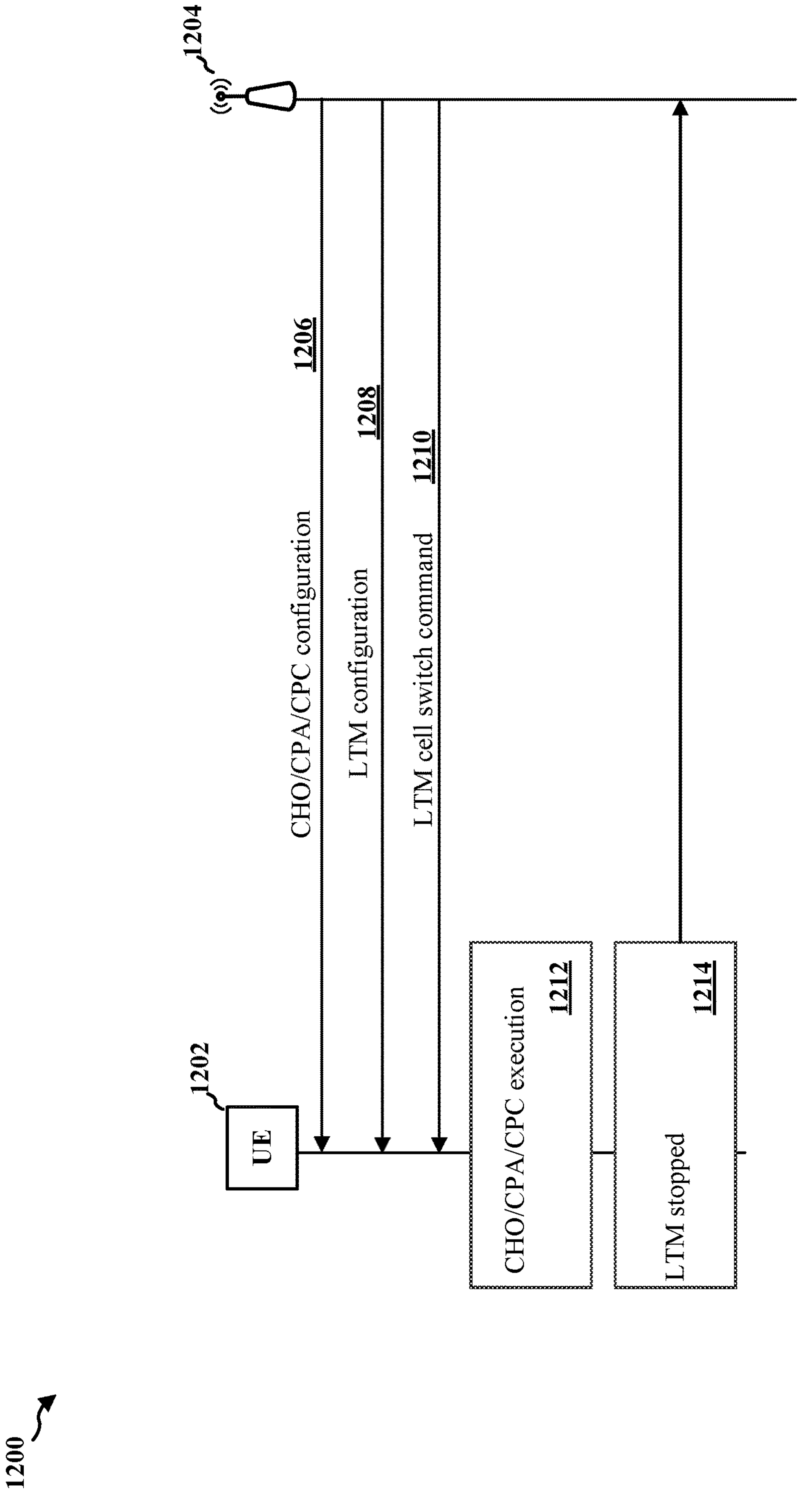
FIG. 12 is a diagram illustrating example communications between a network entity and a UE configured with CHO, conditional primary secondary cell (PSCell) addition (CPA), or conditional PSCell Change (CPC) and where LTM is stopped due to the configured CHO, CPA, or CPC, in accordance with various aspects of the present disclosure.

FIG. 12 is a diagram 1200 illustrating example communications between a network entity 1204 and a UE 1202 configured with CHO, CPA, or CPC. Aspects of the communication are based on an LTM that is stopped due to the configured CHO, CPA, or CPC, in accordance with various aspects of the present disclosure. As illustrated in FIG. 12, the UE 1202 may receive CHO/CPA/CPC configuration 1206 from the network entity 1204. The CHO/CPA/CPC configuration 1206 may include multiple candidate target PSCells associated with each candidate target PCell. The CHO/CPA/CPC configuration 1206 may be included in a radio resource control message and may indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a master cell group and an SCG for each combination of a candidate target PCell and candidate target PSCell, or a combination thereof. The CHO/CPA/CPC configuration 1206 may further include a measurement configuration from a source node or a target node. In some aspects, the CHO/CPA/CPC configuration 1206 may include conditions for executing CHO/CPA/CPC (e.g., by transmitting a message to the network entity 1204) such as conditions based on radio link measurements or other conditions. As illustrated in FIG. 12, the UE 1202 may receive LTM configuration 1208 from the network entity 1204. The LTM configuration 1208 may be an RRC configuration that may include LTM candidate configuration (e.g., identifying LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving a L1 measurement or a different condition occurring for triggering the LTM, the network entity 1204 may determine to trigger LTM for the UE 1202 and transmit an LTM cell switch command 1210 to the UE 1202. The LTM cell switch command 1210 may be included in a MAC-CE that may include trigger information for the LTM and may carry LTM related information for the UE 1202 to perform cell switch. In some aspects, the LTM configuration 1208 may configure a set of LTM candidate cell configurations and the LTM cell switch command 1210 may select one LTM candidate cell configuration among the configured set of LTM candidate cell configurations. In some aspects, based on one or more conditions for CHO/CPA/CPC being satisfied, the UE 1202 may perform CHO/CPA/CPC at 1212 (e.g., by attempting to connect to a CHO/CPA/CPC target cell) and stop the LTM at 1214 (e.g., by refrain from attempting to connect to a target LTM cell).

In some aspects, an indication indicating too early PSCell change, too late PSCell change and PSCell change to wrong cell may include LTM scenarios (e.g., indicating whether the PSCell change is related to LTM or not). In some aspects, if the LTM command for PSCell fails or if there is an SCG failure shortly after a successful LTM for PSCell, UE may record SCG failure information (e.g., in IE SCGFailureInformation) with: (1) an indication (e.g., via a flag) that the previous SCG failure was due to an LTM command for PSCell (e.g., to distinguish from SCG failures due to L3 PSCell change or addition), (2) an SCG failure cause based on LTM supervision timer for PSCell expiry, or (3) include a time between the LTM command for PSCell and the SCG failure.

Figure 13:
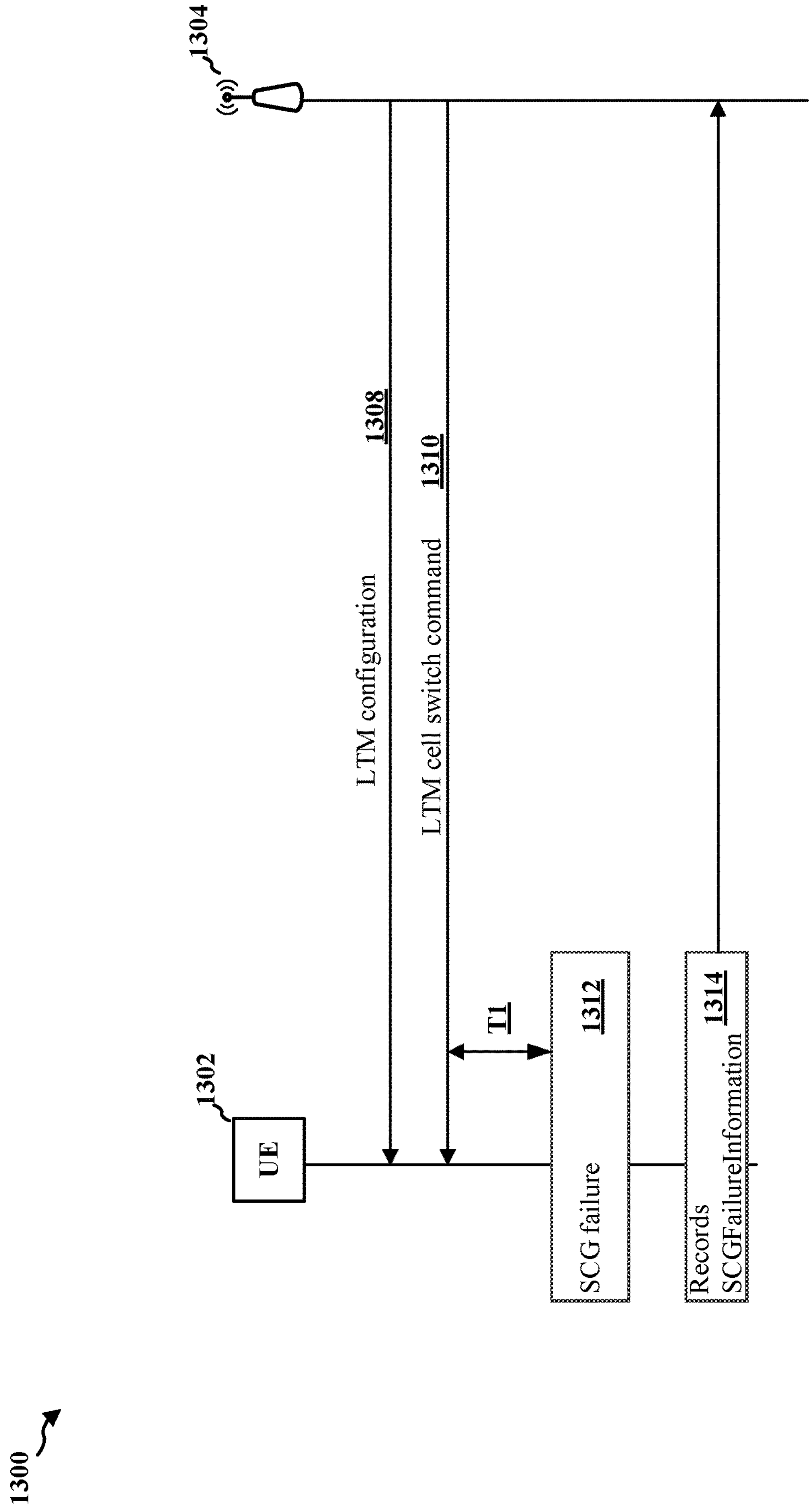
FIG. 13 is a diagram illustrating example communications between a network entity and a UE where a secondary cell group (SCG) failure associated with an LTM switch command occurs.

FIG. 13 is a diagram 1300 illustrating example communications between a network entity 1304 and a UE 1302 where a secondary cell group (SCG) failure associated with an LTM switch command occurs. As illustrated in FIG. 13, the UE 1302 may receive an LTM configuration 1308 in a transmission from the network entity 1304. The LTM configuration 1308 may be included in an RRC configuration that may include the LTM candidate configuration (e.g., identifying LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving a L1 measurement or a different condition occurring for triggering the LTM, the network entity 1304 may determine to trigger the LTM for the UE 1302 and transmit an LTM cell switch command 1310 to the UE 1302. The LTM cell switch command 1310 may be included in a MAC-CE that may include trigger information for the LTM and may carry LTM related information for the UE 1302 to perform cell switch. In some aspects, the LTM configuration 1308 may configure a set of LTM candidate cell configurations and the LTM cell switch command 1310 may select one LTM candidate cell configuration among the configured set of LTM candidate cell configurations. In some aspects, if there is an SCG failure at 1312, the UE 1302 may record the SCG failure information at 1314 which may include (1) an indication (e.g., via a flag) that the previous SCG failure was due to an LTM command for PSCell (e.g., to distinguish from SCG failures due to L3 PSCell change or addition), (2) an SCG failure cause based on LTM supervision timer for PSCell expiry, or (3) include a time (e.g., T1) between the LTM cell switch command 1310 for PSCell and the SCG failure 1312.

In some aspects, in case the LTM cell switch for PSCell fails or if there is an SCG failure shortly (e.g., within a threshold time period) after a successful LTM, the SCG failure information (e.g., in the IE SCG failure information) may further include one or more indications and timing information. In some aspects, the one or more indications may include an indication indicating if the UE was configured for CPA/CPC (e.g., had received a CPE or CPC configuration) when the LTM failure for PSCell occurs, an indication indicating if the UE was configured with LTM for PSCell when there is a CPA/CPC failure, or an indication indicating if the UE was configured with CHO and/or LTM for PSCell, when there is SCG failure. In some aspects, the timing information may include: (1) a time between LTM cell switch command for PSCell and LTM failure (or SCG failure) or (2) a time between the LTM configuration for PSCell and LTM cell switch command for PSCell and a time between the configuration and corresponding failure, such as a time between the LTM configuration and the LTM failure (if LTM failure happens before CPA/CPC execution) or a time between CPA/CPC execution and CPA/CPC failure (if CPA/CPC execution failure happens before LTM). In some aspects, the timing information may include a time between the CPA/CPC configuration and the LTM configuration.

Figure 14:
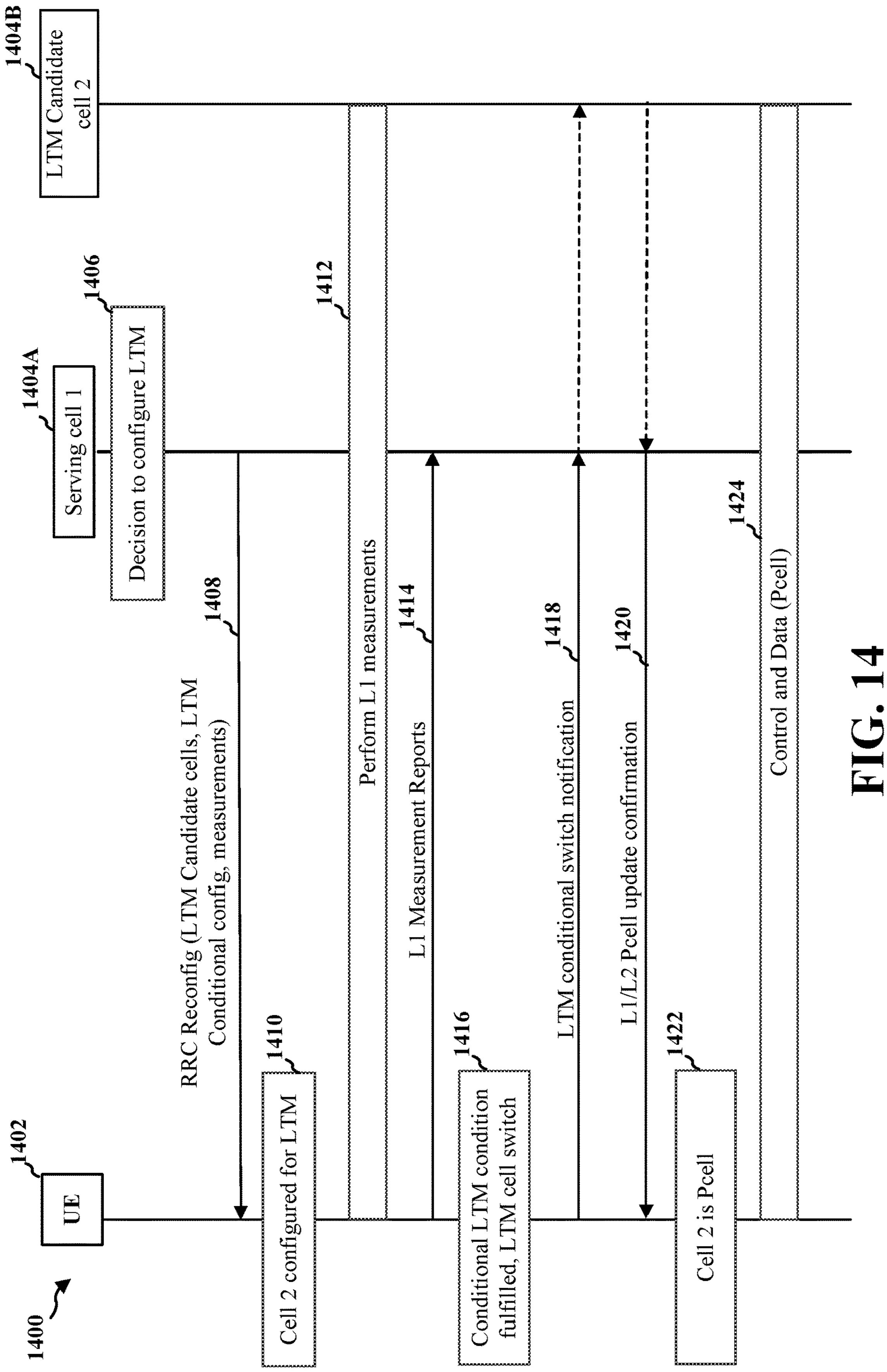
FIG. 14 is a diagram illustrating example communications between a network entity and a UE for conditional LTM.

In some aspects, the LTM may be autonomously performed by a UE based on evaluating configured conditions (e.g., related to quality of radio link, particular L1/L2 measurements falling below a threshold, or the like) and a determination that at least one condition of the configured conditions is met or has occurred. Based on the configured condition being met, the UE may trigger a conditional LTM, trigger a switch to a new SpCell or cell group, and transmit a request to the serving cell to switch to a new SpCell or cell group based on the conditional LTM candidates (e.g., which may be the same as or different from LTM candidates based on LTM cell switch command). The source cell may transmit a confirmation (e.g., a MAC-CE) to confirm the conditional LTM. FIG. 14 is a diagram 1400 illustrating example communications between a network entity that includes a serving cell 1404A and a conditional LTM candidate cell 1404B and a UE 1402 for conditional LTM. As illustrated in FIG. 14, the serving cell 1404A may decide to configure LTM at 1406 and may transmit a RRC configuration 1408 for LTM to the UE 602. The RRC configuration 1408 may include a conditional LTM candidate configuration (e.g., identifying conditional LTM candidate cells) and a configuration for the conditions and associated measurement configurations. Upon receiving the RRC configuration 1408, the UE 1402 may determine that the LTM candidate cell 1404B is configured for conditional LTM at 1410. In some aspects, the UE 1402 may perform L1 measurements at 1412 and may transmit an L1 measurement report 1414 to the serving cell 1404A. Based on the L1 measurements at 1412, the UE 1402 may determine that at least one LTM condition is fulfilled at 1416 and begin an LTM cell switch (e.g., without an LTM cell switch command). The UE 1402 may transmit an LTM conditional switch notification to the serving cell 1404A. In some aspects, the UE 1402 may also transmit the LTM conditional switch notification 1418 to the LTM candidate cell 1404B. In some aspects, the serving cell 1404A may transmit the LTM conditional switch notification 1418 to the LTM candidate cell 1404B. In some aspects, the LTM candidate cell 1404B may transmit a confirmation 1420 to the serving cell 1404A which may in turn transmit the confirmation 1420 to the UE 1402. In some aspects, upon receiving the confirmation 1420, the UE 1402 may switch the serving cell to the cell 1404B at 1422 and may exchange control or data at 1424.

In some aspects, the LTM condition may include configured L1 measurement events to request the LTM or to trigger the conditional LTM. By way of example, the LTM condition may include an SpCell measurement being worse than a threshold, a candidate SpCell being better than the current SpCell by an offset, a candidate SpCell becoming better by a threshold, the current SpCell being worse than a first threshold while the candidate SpCell becoming better by a second threshold, or the like. In some aspects, the LTM condition may be beam-based or cell-based L1 measurement events and may be configured per RRC configuration.

In some aspects, to improve conditional LTM, a UE may indicate to a network entity (e.g., in notification 1418): (1) the LTM condition(s) which were met, (2) the first satisfied LTM condition in case multiple LTM condition(s) are configured, and/or (3) time between the different LTM condition(s) which were satisfied.

In some aspects, if the target PCell/target SCell(s) is not a current serving cell, it may take time for a non-serving cell to become ready (due to synchronization and configuration). The delay may be measured by recording an interruption time during LTM. A UE or a network entity may record and report the interruption time during LTM, which may be the time between one of: (1) UE receiving the cell switch command or (2) UE transmitting the conditional switch notification, and one of a time of: (1) the UE performing the first DL/UL Rx/Tx on the indicated beam of the target cell, (2) the first DL/UL Rx/Tx after the cell update if the target cell was already active, (3) the RRC reconfiguration complete is transmitted, or (4) the UE receives the UE contention resolution identity MAC-CE in case UL grant is set beforehand (in case of RACH-less LTM).

In some aspects, a handover report may be a handover report type indicating that the LTM was too late, too early, or unnecessary. For example, a handover type may indicate a relationship between the handover and the LTM.

In some aspects, the UE may record SHR/SPR when there is a near LTM failure during PCell/PSCell change, e.g., when the LTM supervision timer for PCell/PSCell is greater than a threshold configured by the network entity. In some aspects, the threshold for the LTM supervision timer may be configured separately for each cell (i.e., different for PCell, PSCell and SCells). A UE may indicate in SHR/SPR: (1) an indication (e.g., flag) indicating flag that CHO/CPC/CPA was configured (but not executed) when LTM cell switch command was sent, (2) an indication that LTM was configured (but not executed) when CHO/CPA/CPC was executed, and/or (3) time information regarding time gap between CHO/CPC/CPA configuration and LTM cell switch command.

Figure 15:
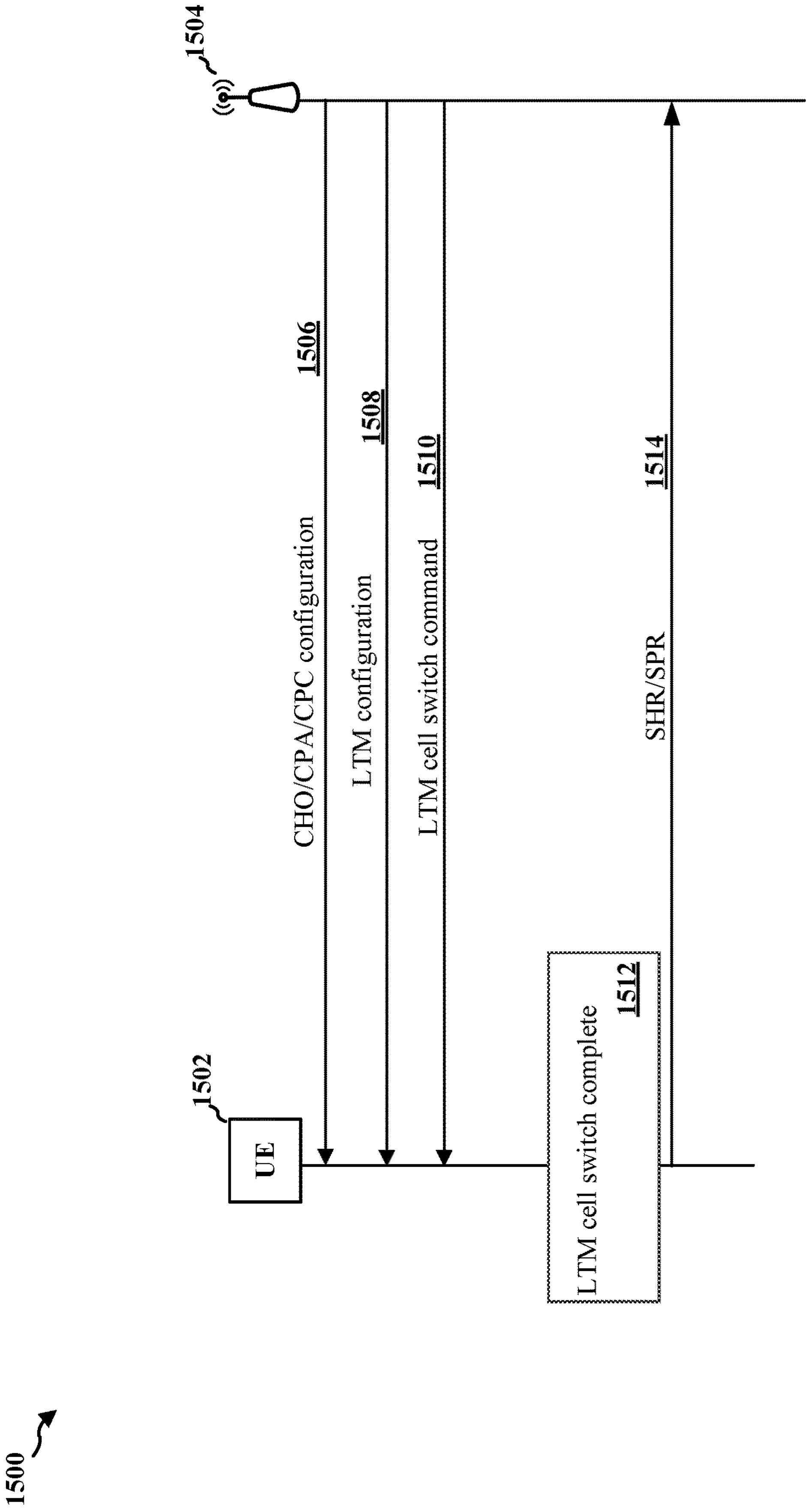
FIG. 15 is a diagram illustrating example communications between a network entity and a UE for conditional LTM.

FIG. 15 is a diagram 1500 illustrating example communications between a network entity 1504 and a UE 1502 for conditional LTM.

As illustrated in FIG. 15, the UE 1502 may receive a CHO/CPA/CPC configuration 1506 in a transmission from the network entity 1504. The CHO/CPA/CPC configuration 1506 may include multiple candidate target PSCells associated with each candidate target PCell. The CHO/CPA/CPC configuration 1506 may be included in a radio resource control message and may indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a master cell group and a SCG for each combination of a candidate target PCell and candidate target PSCell, or a combination thereof. The CHO/CPA/CPC configuration 1506 may further include a measurement configuration from a source node or a target node. In some aspects, the CHO/CPA/CPC configuration 1506 may include conditions for executing CHO/CPA/CPC (e.g., by transmitting a message to the network entity 1504) such as conditions based on radio link measurements or other conditions. As illustrated in FIG. 15, the UE 1502 may receive LTM configuration 1508 from the network entity 1504. The LTM configuration 1508 may be an RRC configuration that may include LTM candidate configuration (e.g., identifying LTM candidate cells and including information related to the LTM candidate cells) and measurement and reporting configuration (e.g., related to transmitting L1 measurement report for LTM such as the type of L1 metrics to include, statistics information to be include in the L1 measurement report (e.g., means, median, average over a period of time, or the like), or measurement related conditions such as different thresholds with respect to different metrics for triggering the transmission of the L1 measurement report). In some aspects, upon receiving a L1 measurement or a different condition occurring for triggering the LTM, the network entity 1504 may determine to trigger LTM for the UE 1502 and transmit an LTM cell switch command 1510 to the UE 1502. The LTM cell switch command 1510 may be a MAC-CE that may include trigger information for the LTM and may carry LTM related information for the UE 1502 to perform cell switch. In some aspects, the LTM configuration 1508 may configure a set of LTM candidate cell configurations and the LTM cell switch command 1510 may select one LTM candidate cell configuration among the configured set of LTM candidate cell configurations. After the LTM cell switch is complete at 1512, the UE 1502 may transmit SHR/SPR 1514 to indicate (1) an indication (e.g., flag) indicating flag that CHO/CPC/CPA was configured (but not executed) when LTM cell switch command was sent, (2) an indication that LTM was configured (but not executed) when CHO/CPA/CPC was executed, and/or (3) time information regarding time gap between CHO/CPC/CPA configuration 1506 and LTM cell switch command 1510.

In some aspects, the LTM may be RACH-based or RACH-less. In some aspects, a UE may indicate to the network entity whether the previous HO (or PSCell change or LTM) was a RACH-based or RACH-less based on a flag in self-organizing networks (SON) reports (e.g., RLF report or SCG failure information for SHR or SPR). In some aspects, a UE may implicitly indicate whether the previous HO (or PSCell change) was a RACH-based or RACH-less HO (or PSCell change) by omitting RACH related fields (e.g., IE RA-InformationCommon or IE perRA-InfoList) in different SON reports (i.e., RLF report or SCG failure information for SHR or SPR). In some aspects, the UE may indicate to the network entity that there may be a fallback from RACH-less HO/PSCell change/LTM to RACH-based HO/PSCell change/LTM in SON reports.

In some aspects, there may be a handover failure type provided for beam-based handover (when target beam is indicated in HO command) so that beam-based handover may be categorized and identified separately during MRO. The handover failure type may include a too early beam-based handover which may indicate a beam failure occurs shortly after a successful beam-based handover, or a beam failure occurs during the handover procedure where the UE attempts to re-establish the radio link connection in the source beam. The handover failure type may include a handover to wrong beam which may indicate a beam failure occurs shortly after a successful handover from a source cell to a target cell or a beam failure occurs during the handover procedure and where the UE attempts to re-establish the radio link connection in a beam other than the source beam and the target beam.

In some aspects, if there is a beam failure on the target beam (indicated by the source node) during a RACH-less HO/PSCell change/LTM, the UE may indicate to the network entity: (1) a target beam indicated in RACH-less HO command, a PSCell change command, or an LTM cell switch command, (2) a reconnected beam (e.g., the beam which UE selected after failure in the target beam), (3) a target beam strength (e.g., in a specific metric such as RSRP), or (4) a reconnected beam strength (e.g., in a specific metric such as RSRP).

Figure 16:
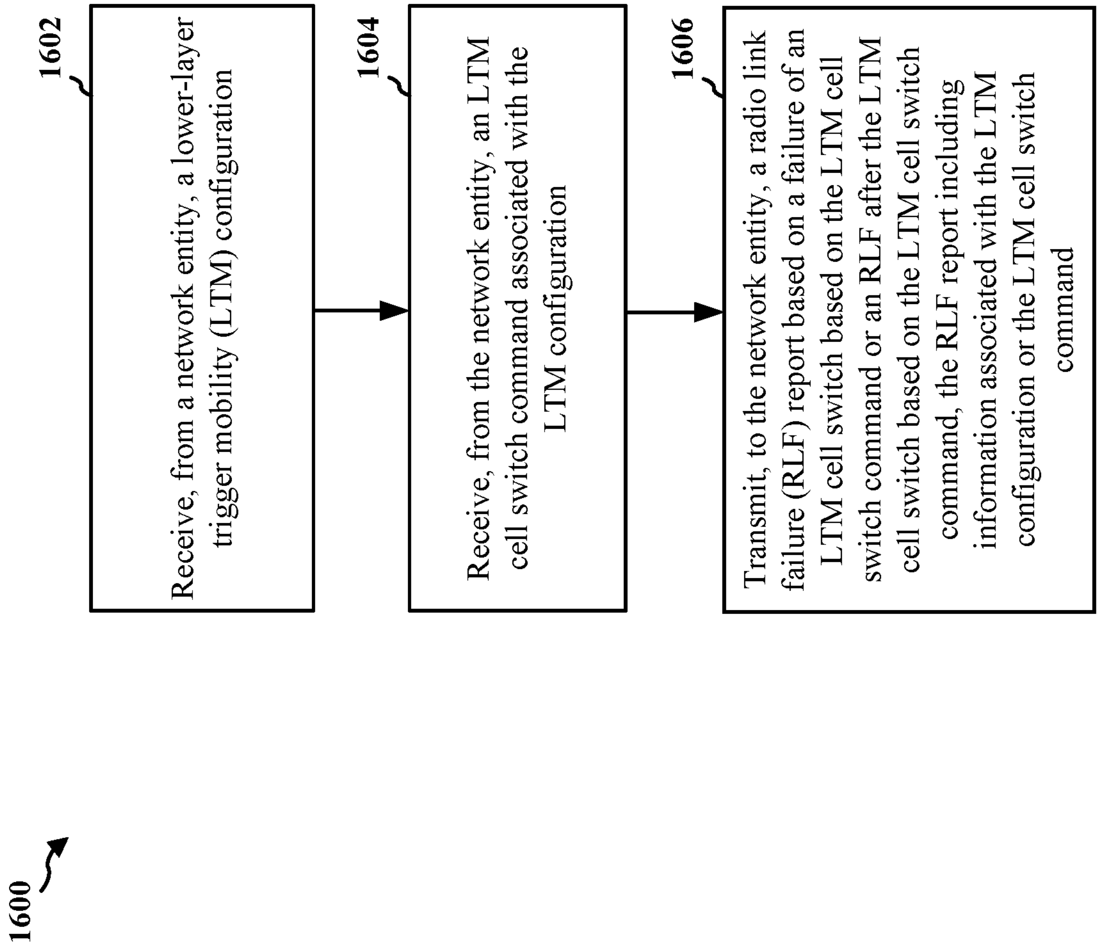
FIG. 16 is a flowchart of a method of wireless communication, in accordance with various aspects of the present disclosure.

FIG. 16 is a flowchart 1600 of a method of wireless communication. The method may be performed by a UE (e.g., the UE 104, the UE 602, the UE 802, the UE 852, the UE 902, the UE 952, the UE 1002, the UE 1102, the UE 1202, the UE 1302, the UE 1402, or the UE 1502; the apparatus 2404). The method may enable a UE to provide the network with a RLF report including details regarding the last LTM cell switch command or details regarding the last LTM configuration in case of LTM cell switch fail or RLF so that the network may use that information for MRO.

At 1602, the UE may receive, from a network entity, an LTM configuration. For example, the UE (e.g., 802, 852, 902, 952) may receive, from a network entity (e.g., 804, 854, 904, 954), an LTM configuration (e.g., 808, 858, 908, 958). In some aspects, 1602 may be performed by LTM component 198.

At 1604, the UE may receive, from the network entity, an LTM cell switch command associated with the LTM configuration. For example, the UE (e.g., 802, 852, 902, 952)

may receive, from the network entity (e.g., 804, 854, 904, 954), an LTM cell switch command (e.g., 810, 860, 910, 960) associated with the LTM configuration. In some aspects, 1604 may be performed by LTM component 198.

At 1606, the UE may transmit, to the network entity, a RLF report based on a failure of an LTM cell switch based on the LTM cell switch command or an RLF after the LTM cell switch based on the LTM cell switch command, the RLF report including information associated with the LTM configuration or the LTM cell switch command. For example, the UE (e.g., 802, 852, 902, 952) may transmit, to the network no entity de (e.g., 804, 854, 904, 954), a RLF report (e.g., 816, 866, 916, 966) based on a failure of an LTM cell switch based on the LTM cell switch command or an RLF after the LTM cell switch based on the LTM cell switch command, the RLF report including information associated with the LTM configuration or the LTM cell switch command. In some aspects, 1606 may be performed by LTM component 198.

Figure 17:
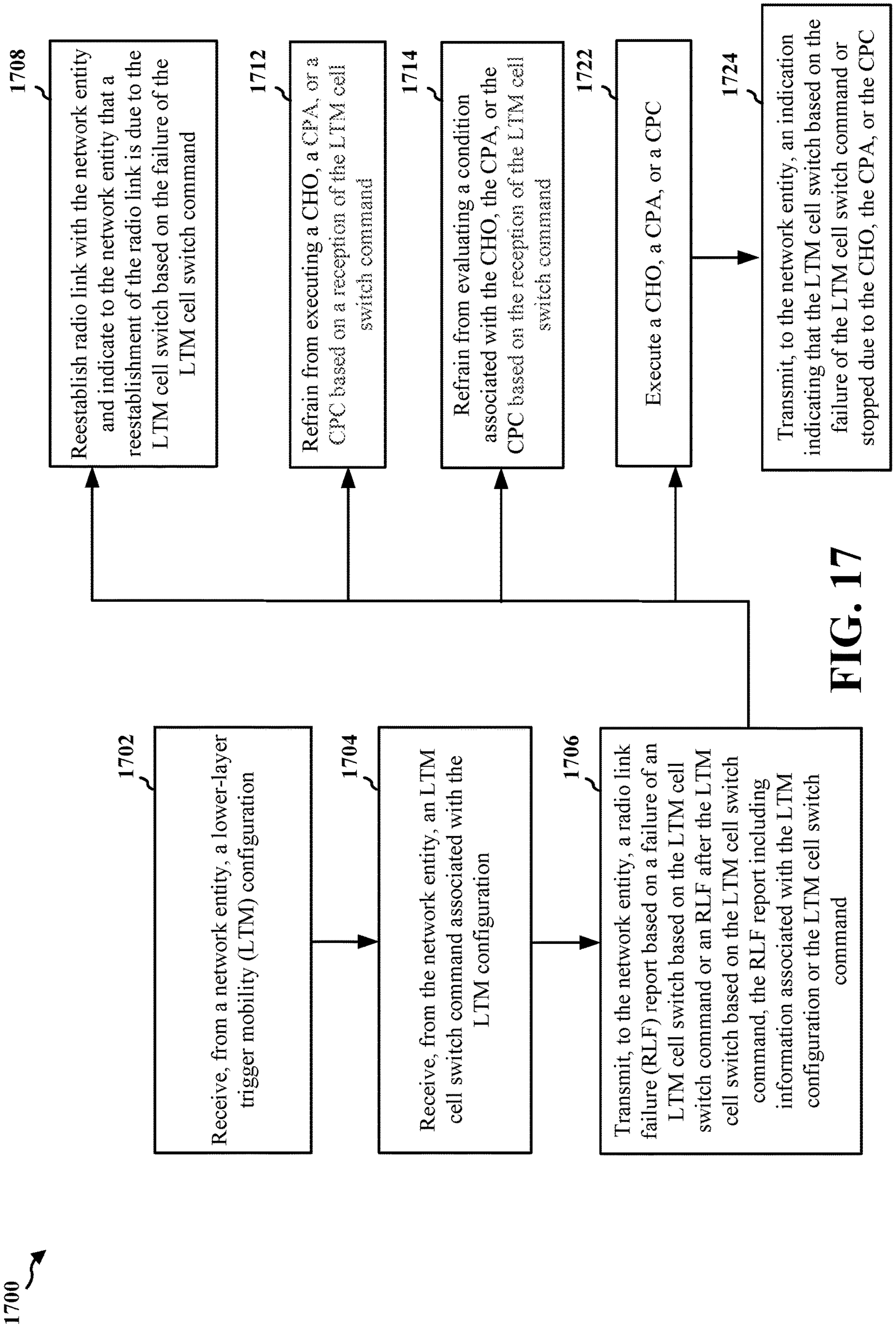
FIG. 17 is a flowchart of a method of wireless communication, in accordance with various aspects of the present disclosure.

FIG. 17 is a flowchart 1700 of a method of wireless communication. The method may be performed by a UE (e.g., the UE 104, the UE 602, the UE 802, the UE 852, the UE 902, the UE 952, the UE 1002, the UE 1102, the UE 1202, the UE 1302, the UE 1402, or the UE 1502; the apparatus 2404). The method may enable a UE to provide the network with a RLF report including details regarding the last LTM cell switch command or details regarding the last LTM configuration in case of LTM cell switch fail or RLF so that the network may use that information for MRO.

At 1702, the UE may receive, from a network entity, an LTM configuration. For example, the UE (e.g., 802, 852, 902, 952) may receive, from a network entity (e.g., 804, 854, 904, 954), an LTM configuration (e.g., 808, 858, 908, 958). In some aspects, 1702 may be performed by LTM component 198.

At 1704, the UE may receive, from the network entity, an LTM cell switch command associated with the LTM configuration. For example, the UE (e.g., 802, 852, 902, 952) may receive, from the network entity (e.g., 804, 854, 904, 954), an LTM cell switch command (e.g., 810, 860, 910, 960) associated with the LTM configuration. In some aspects, 1704 may be performed by LTM component 198.

At 1706, the UE may transmit, to the network entity, a RLF report based on a failure of an LTM cell switch based on the LTM cell switch command or an RLF after the LTM cell switch based on the LTM cell switch command, the RLF report including information associated with the LTM configuration or the LTM cell switch command. For example, the UE (e.g., 802, 852, 902, 952) may transmit, to the network entity (e.g., 804, 854, 904, 954), a RLF report (e.g., 816, 866, 916, 966) based on a failure of an LTM cell switch based on the LTM cell switch command or an RLF after the LTM cell switch based on the LTM cell switch command, the RLF report including information associated with the LTM configuration or the LTM cell switch command. In some aspects, 1706 may be performed by LTM component 198. In some aspects, the information associated with the LTM configuration or the LTM cell switch command includes at least one of: a configuration identifier (ID) associated with the LTM cell switch command, a beam ID associated with the LTM cell switch command, a transmission configuration indicator (TCI) ID associated with the LTM cell switch command, or a set of contention free random access (CFRA) resources associated with the LTM cell switch command. In some aspects, the information associated with the LTM configuration or the LTM cell switch command includes at least one of: a reference configuration associated with the LTM configuration, a candidate configuration associated with the LTM configuration, or a layer 1 (L1) measurement configuration identifier (ID) associated with the LTM configuration. In some aspects, the RLF report includes an indication indicating that the LTM cell switch based on the failure of the LTM cell switch command. In some aspects, to transmit the RLF report, the UE may transmit the RLF report based on the failure of the LTM cell switch based on the LTM cell switch command. In some aspects, to transmit the RLF report, the UE may transmit the RLF report based on the RLF occurring within a threshold period of time after the LTM cell switch based on the LTM cell switch command.

In some aspects, the UE is not configured with a recovery mechanism associated with LTM or CHO, and where based on the UE being not configured with the recovery mechanism associated with the LTM or the CHO, the RLF report further includes an additional indicator or additional timing information. In some aspects, the additional indicator includes an indicator indicating at least one of: the UE is configured with the CHO when an LTM failure occurs, the UE is not configured with the CHO when the LTM failure occurs, the UE is configured with the LTM when an CHO failure occurs, the UE is not configured with the LTM when the CHO failure occurs, the UE is configured with the LTM or the CHO when the RLF occurs, or the UE is configured with the LTM or the CHO when the RLF occurs. In some aspects, the additional timing information includes at least one of: a first time between the LTM cell switch command and the LTM configuration, a second time between the LTM cell switch command and the RLF, a third time between the LTM cell switch command and the failure, a fourth time between a CHO execution and a CHO failure, or a fifth time between a CHO configuration and the LTM configuration. In some aspects, the RLF report further includes at least one of: a cell global identity (CGI) associated with a cell associated with an attempted recovery associated with the failure or the RLF, a recovery type associated with the attempted recovery if the cell is a CHO candidate cell and an LTM candidate cell, or a time between the attempted recovery and the failure or the RLF.

At 1708, the UE may reestablish radio link with the network entity and indicate to the network entity that a reestablishment of the radio link is due to the LTM cell switch based on the failure of the LTM cell switch command. For example, the UE (e.g., 802, 852, 902, 952) may reestablish radio link (e.g., 816, 866, 916, 966) with the network entity and indicate to the network entity that a reestablishment of the radio link is due to the LTM cell switch based on the failure of the LTM cell switch command. In some aspects, 1708 may be performed by LTM component 198.

At 1712, the UE may refrain from executing a CHO, a CPA, or a CPC based on a reception of the LTM cell switch command. In some aspects, 1712 may be performed by LTM component 198. At 1714, the UE may refrain from evaluating a condition associated with the CHO, the CPA, or the CPC based on the reception of the LTM cell switch command. In some aspects, 1714 may be performed by LTM component 198.

At 1722, the UE may execute a CHO, a CPA, or a CPC. For example, the UE 1202 may execute a CHO, a CPA, or a CPC (e.g., 1212). In some aspects, 1722 may be performed by LTM component 198.

At 1724, the UE may transmit, to the network entity, an indication indicating that the LTM cell switch based on the failure of the LTM cell switch command or stopped due to the CHO, the CPA, or the CPC. For example, the UE 1202 may transmit, to the network entity 1204, an indication indicating that the LTM cell switch based on the failure of the LTM cell switch command or stopped due to the CHO, the CPA, or the CPC (e.g., 1214). In some aspects, 1724 may be performed by LTM component 198.

In some aspects, the LTM cell switch command is associated with a PSCell, where the LTM cell switch based on the failure of the LTM cell switch command or a secondary cell group (SCG) failure occurs for the PSCell. In some aspects, network entity may receive, from the UE, additional information indicating at least one of: the SCG failure is associated with the LTM cell switch command, a cause associated with the SCG failure being associated with the LTM cell switch command, or a time between the LTM cell switch command and the SCG failure. In some aspects, the information further includes: at least one indicator indicating at least one of: the UE is configured with a CPA, or a CPC when the SCG failure occurs for the PSCell, the UE is not configured with the CPA or the CPC when the SCG failure occurs for the PSCell, the UE is configured with LTM for the PSCell when there is a CPA failure or a CPC failure, the UE is not configured with the LTM for the PSCell when there is the CPA failure or the CPC failure, the UE is configured with the LTM or CHO for the PSCell when the SCG failure occurs for the PSCell, or the UE is not configured with the LTM or CHO for the PSCell when the SCG failure occurs for the PSCell; or timing information regarding at least one of: a first time between the LTM cell switch command and the SCG failure or the failure of the LTM cell switch, a second time between the LTM configuration and the LTM cell switch command, a third time between the LTM configuration and the failure of the LTM cell switch, or a fourth time between a configuration associated with the CPA or the CPC and the LTM configuration.

In some aspects, a target cell associated with the LTM cell switch is not a current serving cell. In some aspects, record and report an interruption time during the LTM cell switch, where the interruption time is a time between the LTM cell switch and one of: an initial transmission or an initial reception on an indicated beam of the target cell, the first transmission or the first reception after the LTM cell switch, a transmission of an indication of radio resource control (RRC) reconfiguration completion, or a contention resolution identity medium access control (MAC) control element (MAC-CE).

Figure 18:
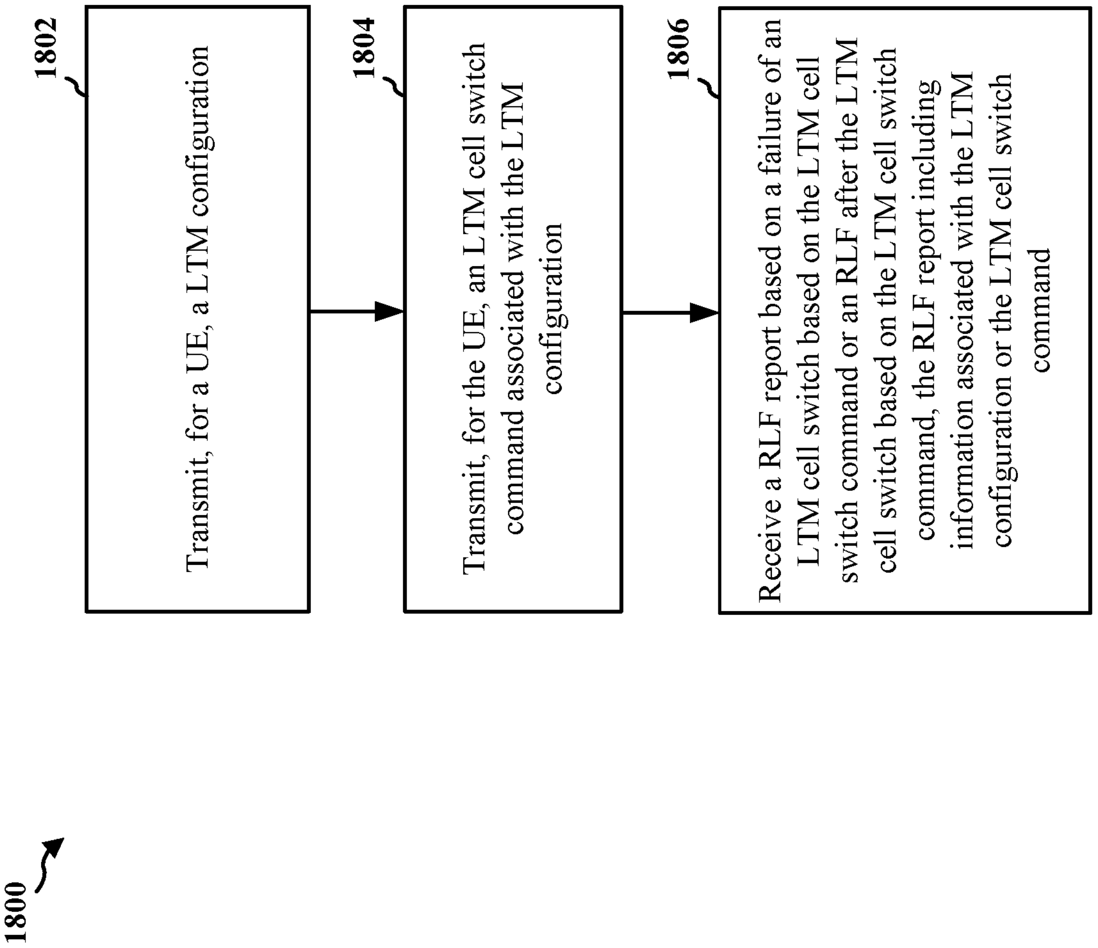
FIG. 18 is a flowchart of a method of wireless communication, in accordance with various aspects of the present disclosure.

FIG. 18 is a flowchart 1800 of a method of wireless communication. The method may be performed by a network entity (e.g., the base station 102, the network entity 604, the network entity 804, the network entity 854, the network entity 904, the network entity 954, the network entity 1004, the network entity 1104, the network entity 1204, the network entity 1304, the serving cell 1404A, the network entity 1504, the network entity 2402, the network entity 2502). The method may enable a UE to provide the network with a RLF report including details regarding the last LTM cell switch command or details regarding the last LTM configuration in case of LTM cell switch fail or RLF so that the network may use that information for MRO.

At 1802, the network entity may transmit, for a UE, an LTM configuration. For example, the network entity (e.g., 804, 854, 904, 954) may transmit, for a UE (e.g., 802, 852, 902, 952), an LTM configuration (e.g., 808, 858, 908, 958). In some aspects, 1802 may be performed by LTM component 199.

At 1804, the network entity may transmit, for the UE, an LTM cell switch command associated with the LTM configuration. For example, the network entity (e.g., 804, 854, 904, 954) may transmit, for the UE, an LTM cell switch command (e.g., 810, 860, 910, 960) associated with the LTM configuration. In some aspects, 1804 may be performed by LTM component 199.

At 1806, the network entity may receive a RLF report based on a failure of an LTM cell switch based on the LTM cell switch command or an RLF after the LTM cell switch based on the LTM cell switch command, the RLF report including information associated with the LTM configuration or the LTM cell switch command. For example, the network entity (e.g., 804, 854, 904, 954) may receive a RLF report (e.g., 816, 866, 916, 966) based on a failure of an LTM cell switch based on the LTM cell switch command or an RLF after the LTM cell switch based on the LTM cell switch command, the RLF report including information associated with the LTM configuration or the LTM cell switch command. In some aspects, 1806 may be performed by LTM component 199.

Figure 19:
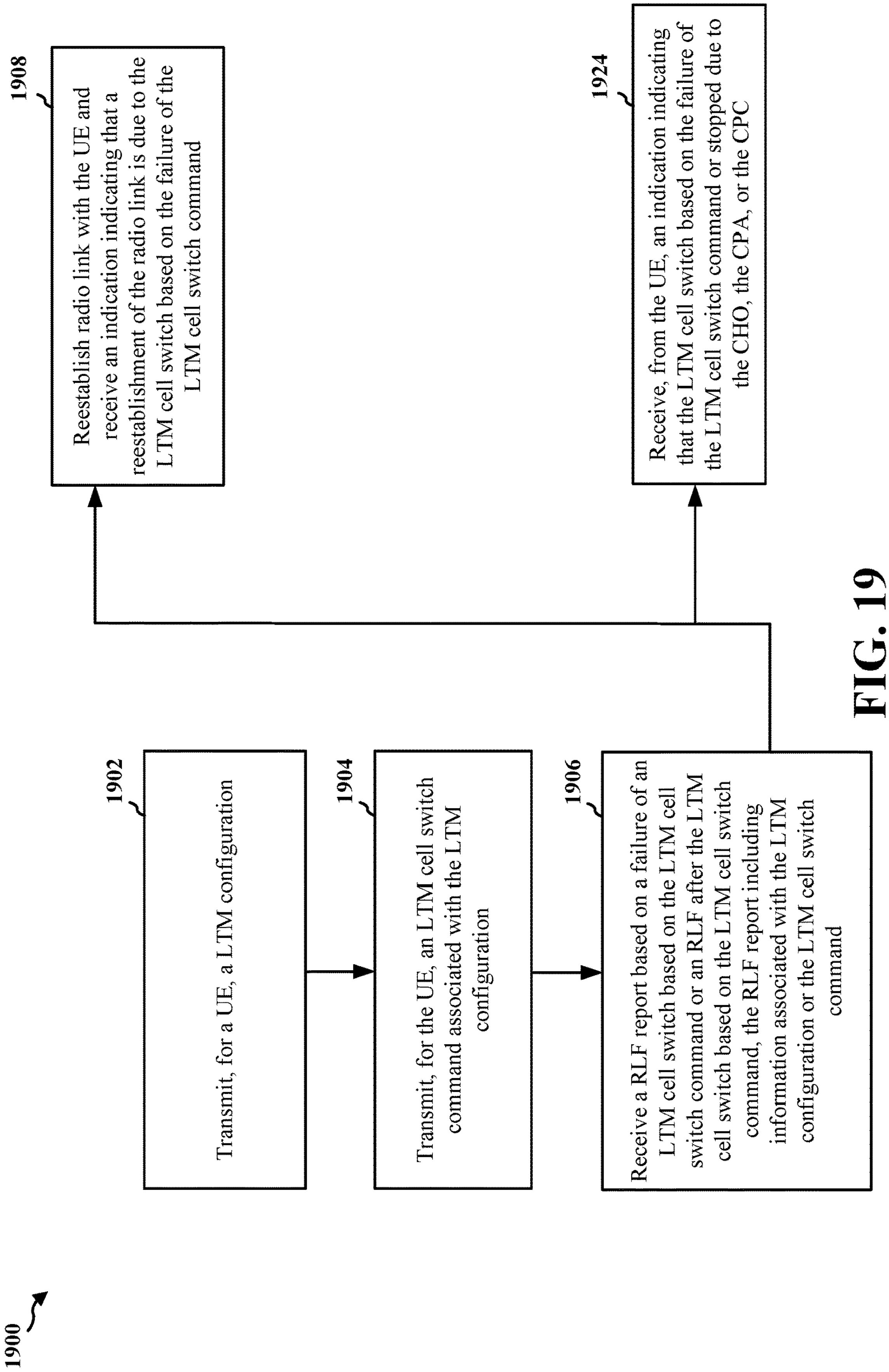
FIG. 19 is a flowchart of a method of wireless communication, in accordance with various aspects of the present disclosure.

FIG. 19 is a flowchart 1900 of a method of wireless communication. The method may be performed by a network entity (e.g., the base station 102, the network entity 604, the network entity 804, the network entity 854, the network entity 904, the network entity 954, the network entity 1004, the network entity 1104, the network entity 1204, the network entity 1304, the serving cell 1404A, the network entity 1504, the network entity 2402, the network entity 2502). The method may enable a UE to provide the network with a RLF report including details regarding the last LTM cell switch command or details regarding the last LTM configuration in case of LTM cell switch fail or RLF so that the network may use that information for MRO.

At 1902, the network entity may transmit, for a UE, an LTM configuration. For example, the network entity (e.g., 804, 854, 904, 954) may transmit, for a UE (e.g., 802, 852, 902, 952), an LTM configuration (e.g., 808, 858, 908, 958). In some aspects, 1902 may be performed by LTM component 199.

At 1904, the network entity may transmit, for the UE, an LTM cell switch command associated with the LTM configuration. For example, the network entity (e.g., 804, 854, 904, 954) may transmit, for the UE, an LTM cell switch command (e.g., 810, 860, 910, 960) associated with the LTM configuration. In some aspects, 1904 may be performed by LTM component 199.

At 1906, the network entity may receive a RLF report based on a failure of an LTM cell switch based on the LTM cell switch command or an RLF after the LTM cell switch based on the LTM cell switch command, the RLF report including information associated with the LTM configuration or the LTM cell switch command. For example, the network entity (e.g., 804, 854, 904, 954) may receive a RLF report (e.g., 816, 866, 916, 966) based on a failure of an LTM cell switch based on the LTM cell switch command or an RLF after the LTM cell switch based on the LTM cell switch command, the RLF report including information associated with the LTM configuration or the LTM cell switch command. In some aspects, 1906 may be performed by LTM component 199.

In some aspects, the information associated with the LTM configuration or the LTM cell switch command includes at least one of: a configuration identifier (ID) associated with the LTM cell switch command, a beam ID associated with the LTM cell switch command, a transmission configuration indicator (TCI) ID associated with the LTM cell switch command, or a set of contention free random access (CFRA) resources associated with the LTM cell switch command. In some aspects, the information associated with the LTM configuration or the LTM cell switch command includes at least one of: a reference configuration associated with the LTM configuration, a candidate configuration associated with the LTM configuration, or a layer 1 (L1) measurement configuration identifier (ID) associated with the LTM configuration. In some aspects, the RLF report includes an indication indicating that the LTM cell switch based on the failure of the LTM cell switch command. In some aspects, the RLF report includes an indication indicating that the LTM cell switch based on the failure of the LTM cell switch command. In some aspects, the RLF report based on the LTM cell switch is transmitted based on the failure of the LTM cell switch command. In some aspects, the RLF report is transmitted based on the RLF occurring within a threshold period of time after the LTM cell switch based on the LTM cell switch command. In some aspects, the UE is not configured with a recovery mechanism associated with LTM or CHO, and where based on the UE being not configured with the recovery mechanism associated with the LTM or the CHO, the RLF report further includes an additional indicator or additional timing information.

At 1908, the network entity may reestablish radio link with the UE and receive an indication indicating that a reestablishment of the radio link is due to the LTM cell switch based on the failure of the LTM cell switch command. For example, the network entity may reestablish radio link (e.g., 816, 866, 916, 966) with the UE and receive an indication indicating that a reestablishment of the radio link is due to the LTM cell switch based on the failure of the LTM cell switch command. In some aspects, 1908 may be performed by LTM component 199.

In some aspects, the RLF report includes an indication indicating that the LTM cell switch based on the failure of the LTM cell switch command. In some aspects, the RLF report based on the LTM cell switch is transmitted based on the failure of the LTM cell switch command. In some aspects, the RLF report is transmitted based on the RLF occurring within a threshold period of time after the LTM cell switch based on the LTM cell switch command.

In some aspects, the LTM cell switch command is associated with a PSCell, where the LTM cell switch based on the failure of the LTM cell switch command or a secondary cell group (SCG) failure occurs for the PSCell. In some aspects, the network entity may receive, from the UE, additional information indicating at least one of: the SCG failure is associated with the LTM cell switch command, a cause associated with the SCG failure being associated with the LTM cell switch command, a time between the LTM cell switch command and the SCG failure, a first identifier of a source PSCell during LTM, a second identifier of a target PSCell during the LTM, a third identifier of a failed PSCell during the LTM, random access (RACH) information of an SCG if the LTM is RACH-based or RACH-less indication, or at least one layer 1 (L1) measurement of one or more candidate or neighboring PSCells during the LTM. In some aspects, the information further includes: at least one indicator indicating at least one of: the UE is configured with a CPA, or a CPC when the SCG failure occurs for the PSCell, the UE is not configured with the CPA or the CPC when the SCG failure occurs for the PSCell, the UE is configured with LTM for the PSCell when there is a CPA failure or a CPC failure, the UE is not configured with the LTM for the PSCell when there is the CPA failure or the CPC failure, the UE is configured with the LTM or CHO for the PSCell when the SCG failure occurs for the PSCell, or the UE is not configured with the LTM or CHO for the PSCell when the SCG failure occurs for the PSCell; or timing information regarding at least one of: a first time between the LTM cell switch command and the SCG failure or the failure of the LTM cell switch, a second time between the LTM configuration and the LTM cell switch command, a third time between the LTM configuration and the failure of the LTM cell switch, or a fourth time between a configuration associated with the CPA or the CPC and the LTM configuration.

In some aspects, a target cell associated with the LTM cell switch is not a current serving cell. In some aspects, record and report an interruption time during the LTM cell switch, where the interruption time is a time between the LTM cell switch and one of: an initial transmission or an initial reception on an indicated beam of the target cell, the first transmission or the first reception after the LTM cell switch, a transmission of an indication of radio resource control (RRC) reconfiguration completion, or a contention resolution identity medium access control (MAC) control element (MAC-CE).

At 1924, the network entity may receive an indication indicating that the LTM cell switch based on the failure of the LTM cell switch command or stopped due to a CHO, a CPA, or a CPC. For example, the network entity 1204 may receive an indication indicating that the LTM cell switch based on the failure of the LTM cell switch command or stopped due to a CHO, a CPA, or a CPC (e.g., 1214). In some aspects, 1924 may be performed by LTM component 199. In some aspects, a secondary node's central unit (SN-CU), upon receiving indication from MN regarding an SCG LTM failure, may inform its distributed unit (DU) about the SCG LTM failure (e.g., so that SN-DU may adjust its SCG LTM trigger), regarding one or more of: SCGFailureInformation sent by the UE, an identifier of Source PSCell (e.g., CGI), an identifier of Failed PSCell (e.g., CGI), a UE identifier (e.g., F1AP ID) or UE context information, or L1 measurements of candidate/neighboring PSCells. These measurements may be instantaneous, averaged, filtered, or the like. These L1 measurements may be SSB or CSI-RS measurements, or the like.

Figure 20:
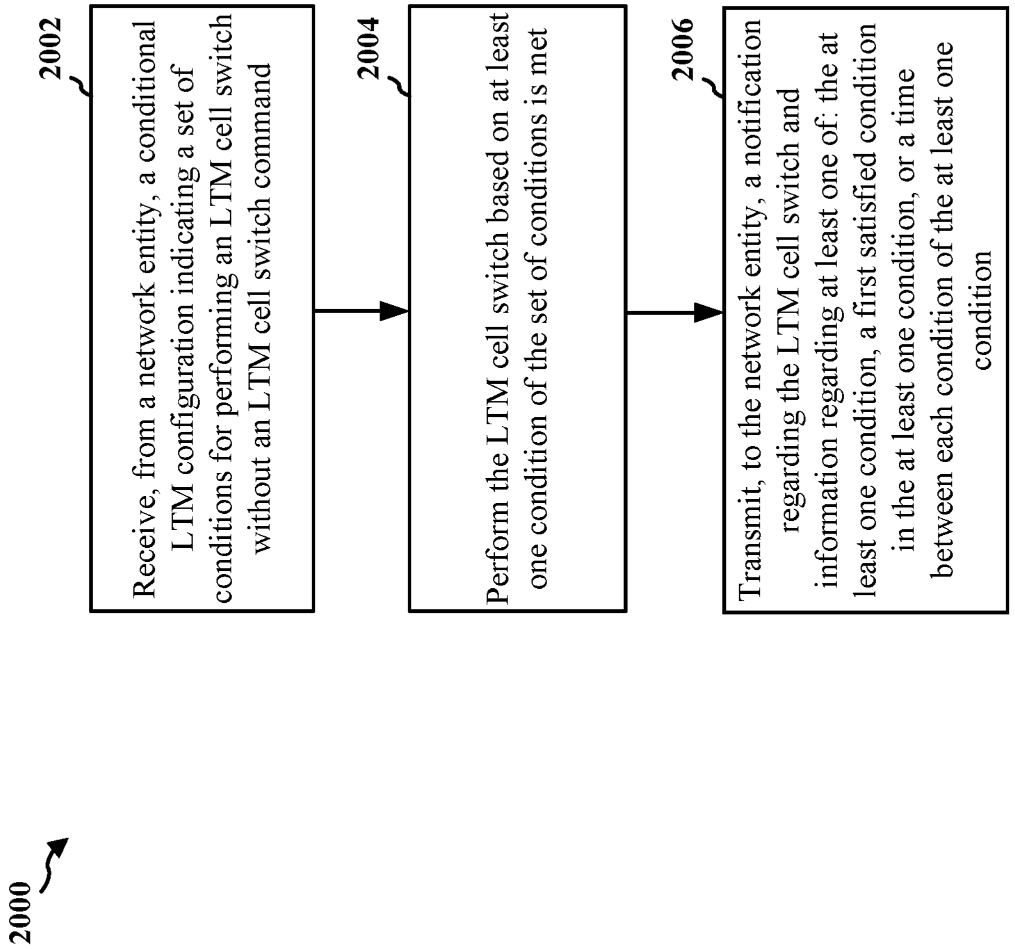
FIG. 20 is a flowchart of a method of wireless communication, in accordance with various aspects of the present disclosure.

FIG. 20 is a flowchart 2000 of a method of wireless communication. The method may be performed by a UE (e.g., the UE 104, the UE 602, the UE 802, the UE 852, the UE 902, the UE 952, the UE 1002, the UE 1102, the UE 1202, the UE 1302, the UE 1402, or the UE 1502; the apparatus 2404). The method may enable providing information to a network under different scenarios so that the network may be able to improve or optimize CHO, CPA, CPC, LTM, or other configurations.

At 2002, the UE may receive, from a network entity, a conditional LTM configuration indicating a set of conditions for performing an LTM cell switch without an LTM cell switch command. For example, the UE 1402 may receive, from a network entity (e.g., 1404A), a conditional LTM configuration (e.g., 1408) indicating a set of conditions for performing an LTM cell switch without an LTM cell switch command. In some aspects, 2002 may be performed by LTM component 198.

At 2004, the UE may perform the LTM cell switch based on at least one condition of the set of conditions is met. For example, the UE 1402 may perform (e.g., 1416) the LTM cell switch based on at least one condition of the set of conditions is met. In some aspects, 2004 may be performed by LTM component 198.

At 2006, the UE may transmit, to the network entity, a notification regarding the LTM cell switch and information regarding at least one of: the at least one condition, a first satisfied condition in the at least one condition, or a time between each condition of the at least one condition. For example, the UE 1402 may transmit, to the network entity (e.g., 1404A), a notification (e.g., 1418) regarding the LTM cell switch and information regarding at least one of: the at least one condition, a first satisfied condition in the at least one condition, or a time between each condition of the at least one condition. In some aspects, 2006 may be performed by LTM component 198. In some aspects, the at least one condition includes multiple conditions, and where the information indicates the first satisfied condition in the multiple conditions or the time between each condition of the multiple conditions.

Figure 21:
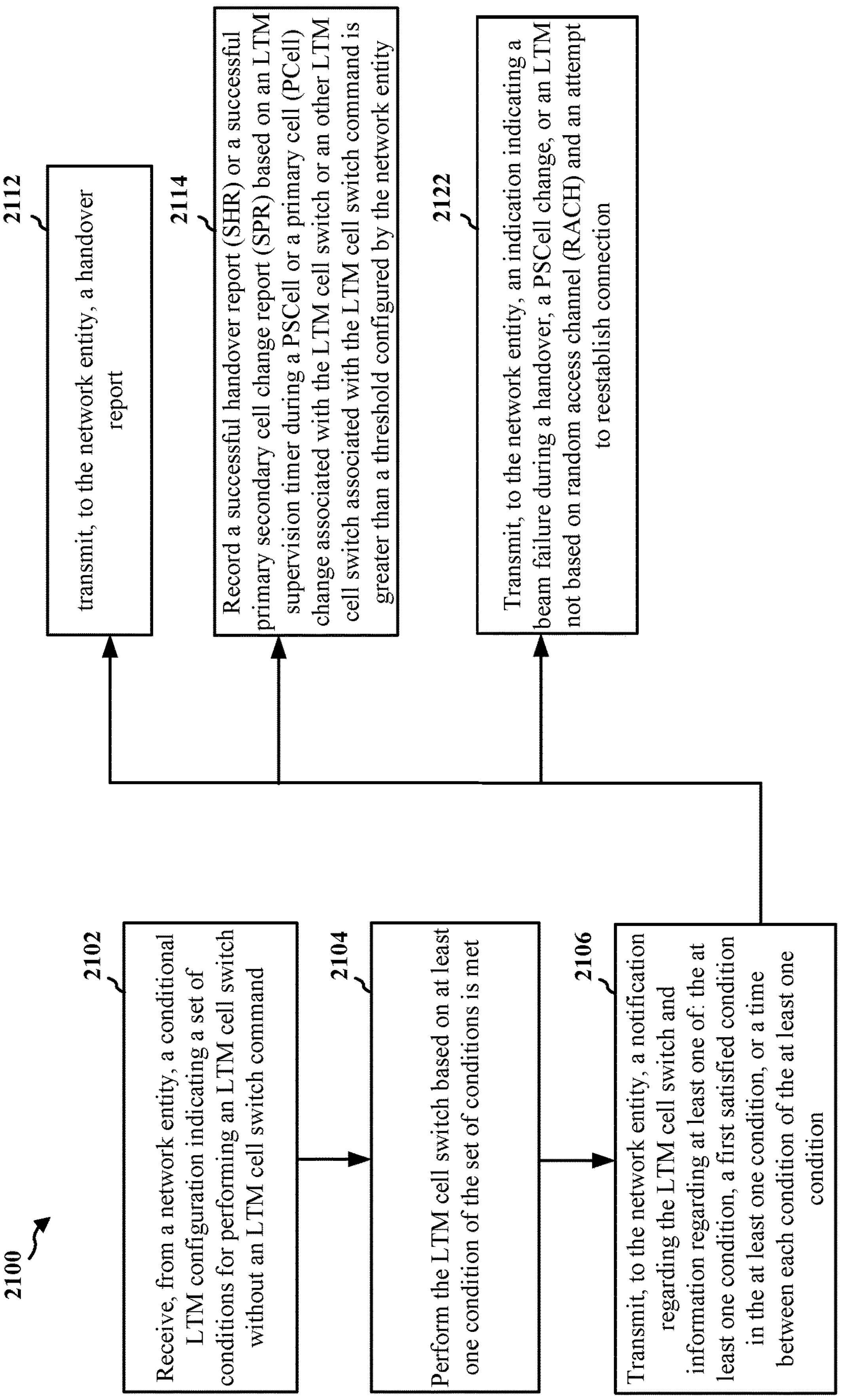
FIG. 21 is a flowchart of a method of wireless communication, in accordance with various aspects of the present disclosure.

FIG. 21 is a flowchart 2100 of a method of wireless communication. The method may be performed by a UE (e.g., the UE 104, the UE 602, the UE 802, the UE 852, the UE 902, the UE 952, the UE 1002, the UE 1102, the UE 1202, the UE 1302, the UE 1402, or the UE 1502; the apparatus 2404). The method may enable providing information to a network under different scenarios so that the network may be able to improve or optimize CHO, CPA, CPC, LTM, or other configurations.

At 2102, the UE may receive, from a network entity, a conditional LTM configuration indicating a set of conditions for performing an LTM cell switch without an LTM cell switch command. For example, the UE 1402 may receive, from a network entity (e.g., 1404A), a conditional LTM configuration (e.g., 1408) indicating a set of conditions for performing an LTM cell switch without an LTM cell switch command. In some aspects, 2102 may be performed by LTM component 198.

At 2104, the UE may perform the LTM cell switch based on at least one condition of the set of conditions is met. For example, the UE 1402 may perform (e.g., 1416) the LTM cell switch based on at least one condition of the set of conditions is met. In some aspects, 2104 may be performed by LTM component 198.

At 2106, the UE may transmit, to the network entity, a notification regarding the LTM cell switch and information regarding at least one of: the at least one condition, a first satisfied condition in the at least one condition, or a time between each condition of the at least one condition. For example, the UE 1402 may transmit, to the network entity (e.g., 1404A), a notification (e.g., 1418) regarding the LTM cell switch and information regarding at least one of: the at least one condition, a first satisfied condition in the at least one condition, or a time between each condition of the at least one condition. In some aspects, 2106 may be performed by LTM component 198. In some aspects, the at least one condition includes multiple conditions, and where the information indicates the first satisfied condition in the multiple conditions or the time between each condition of the multiple conditions.

In some aspects, the LTM cell switch is an inter-central unit (inter-CU) LTM, and the UE may at 2112, transmit, to the network entity, a handover report with a handover report type of one of early LTM, late LTM, or unnecessary LTM to an unnecessary cell. In some aspects, 2112 may be performed by LTM component 198.

At 2114, the UE may record a successful handover report (SHR) or a successful primary secondary cell change report (SPR) based on an LTM supervision timer during a PSCell or a primary cell (PCell) change associated with the LTM cell switch or an other LTM cell switch associated with the LTM cell switch command is greater than a threshold configured by the network entity. For example, the UE 1502 may record (e.g., 1522) a successful handover report (SHR) or a successful primary secondary cell change report (SPR) based on an LTM supervision timer during a PSCell or a primary cell (PCell) change associated with the LTM cell switch or an other LTM cell switch associated with the LTM cell switch command is greater than a threshold configured by the network entity. In some aspects, 2114 may be performed by LTM component 198. In some aspects, the threshold is configured for a specific cell type. In some aspects, the SHR or the SPR includes an indication indicating that a CHO, a CPA, or a CPC is configured and not executed when the LTM cell switch or the other LTM cell switch occurs. In some aspects, the SHR or the SPR includes an indication indicating that LTM is configured and not executed when a CHO, a CPA, or a CPC occurs. In some aspects, the SHR or the SPR includes an indication indicating that a time period between the LTM cell switch command and a configuration of a CHO, a CPA, or a CPC.

In some aspects, the UE may transmit, to the network entity, one of a first indication that a handover, a PSCell change, or an LTM is based on random access channel (RACH) in a RLF report, a successful handover report (SHR) or a successful primary secondary cell change report (SPR), or a second indication that the handover, the PSCell change, or the LTM is not based on the RACH in the RLF report, the SHR, or the SPR.

In some aspects, the UE may transmit, to the network entity, one of: a first indication that a handover, a PSCell change, or an LTM has a fallback based on random access channel (RACH) in a RLF report, a successful handover report (SHR) or a successful primary secondary cell change report (SPR), or a second indication that the handover, the PSCell change, or the LTM does not have the fallback based on the RACH in the RLF report, the SHR, or the SPR.

At 2122, the UE may transmit, to the network entity, an indication indicating a beam failure during a handover, a PSCell change, or an LTM not based on random access channel (RACH) and an attempt to reestablish connection on a source beam or transmit, to the network entity, an indication indicating a beam failure during a handover, a PSCell change, or an LTM not based on random access channel (RACH) and an attempt to reestablish connection on a beam different from a source beam or a target beam. In some aspects, 2122 may be performed by LTM component 198. In some aspects, a beam failure occurred during a handover, a PSCell change, or an LTM not based on random access channel (RACH), and the UE may transmit, to the network entity, additional information regarding at least one of: a target beam indicated in a command associated with the handover, the PSCell change, or the LTM, a reconnected beam, a target beam strength, or a reconnected beam strength.

Figure 22:
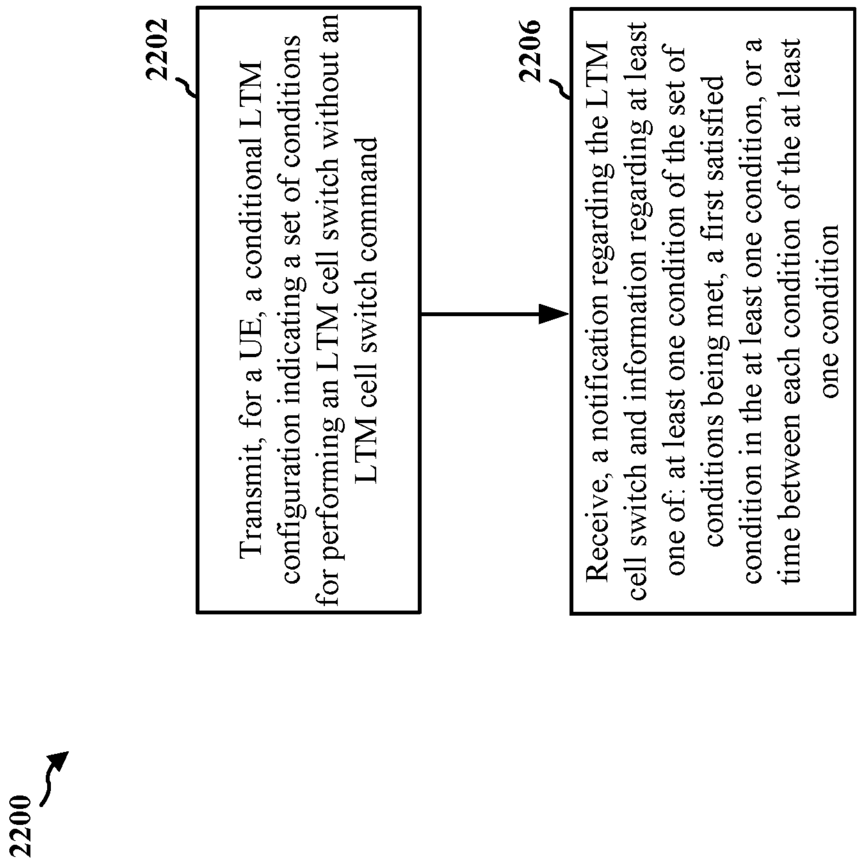
FIG. 22 is a flowchart of a method of wireless communication, in accordance with various aspects of the present disclosure.

FIG. 22 is a flowchart 2200 of a method of wireless communication. The method may be performed by a network entity (e.g., the base station 102, the network entity 604, the network entity 804, the network entity 854, the network entity 904, the network entity 954, the network entity 1004, the network entity 1104, the network entity 1204, the network entity 1304, the serving cell 1404A, the network entity 1504, the network entity 2402, the network entity 2502). The method may enable providing information to a network under different scenarios so that the network may be able to improve or optimize CHO, CPA, CPC, LTM, or other configurations.

At 2202, the network entity may transmit, for a UE, a conditional LTM configuration indicating a set of conditions for performing an LTM cell switch without an LTM cell switch command. For example, the network entity (e.g., 1404A) may transmit, for a UE 1402, a conditional LTM configuration (e.g., 1408) indicating a set of conditions for performing an LTM cell switch without an LTM cell switch command. In some aspects, 2202 may be performed by LTM component 199.

At 2206, the network entity may receive, a notification regarding the LTM cell switch and information regarding at least one of: at least one condition of the set of conditions being met, a first satisfied condition in the at least one condition, or a time between each condition of the at least one condition. For example, the network entity (e.g., 1404A) may receive, a notification (e.g., 1418) regarding the LTM cell switch and information regarding at least one of: at least one condition of the set of conditions being met, a first satisfied condition in the at least one condition, or a time between each condition of the at least one condition. In some aspects, 2206 may be performed by LTM component 199.

Figure 23:
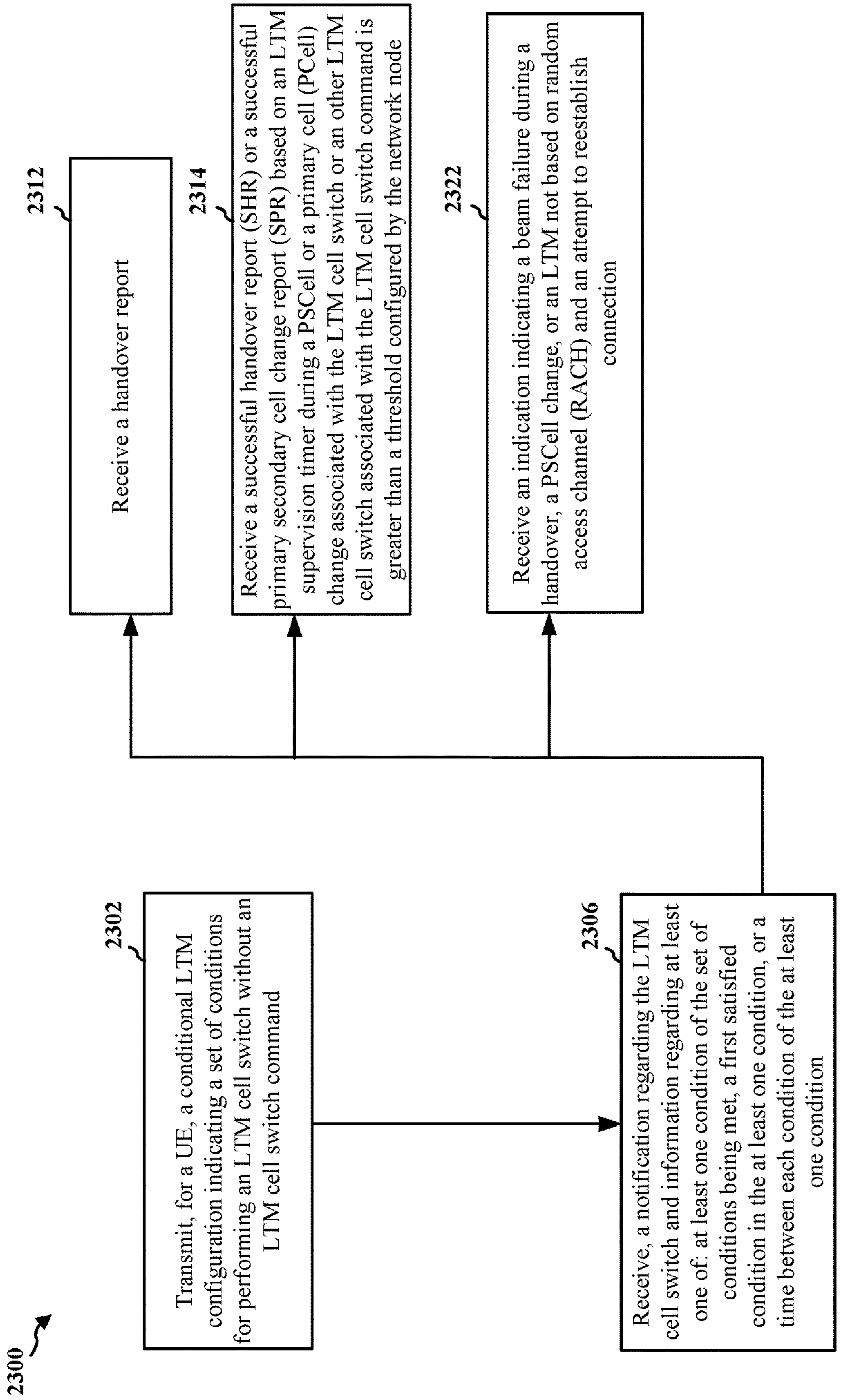
FIG. 23 is a flowchart of a method of wireless communication, in accordance with various aspects of the present disclosure.

FIG. 23 is a flowchart 2300 of a method of wireless communication. The method may be performed by a network entity (e.g., the base station 102, the network entity 604, the network entity 804, the network entity 854, the network entity 904, the network entity 954, the network entity 1004, the network entity 1104, the network entity 1204, the network entity 1304, the serving cell 1404A, the network entity 1504, the network entity 2402, the network entity 2502). The method may enable providing information to a network under different scenarios so that the network may be able to improve or optimize CHO, CPA, CPC, LTM, or other configurations.

At 2302, the network entity may transmit, for a UE, a conditional LTM configuration indicating a set of conditions for performing an LTM cell switch without an LTM cell switch command. For example, the network entity (e.g., 1404A) may transmit, for a UE 1402, a conditional LTM configuration (e.g., 1408) indicating a set of conditions for performing an LTM cell switch without an LTM cell switch command. In some aspects, 2302 may be performed by LTM component 199.

At 2306, the network entity may receive, a notification regarding the LTM cell switch and information regarding at least one of: at least one condition of the set of conditions being met, a first satisfied condition in the at least one condition, or a time between each condition of the at least one condition. For example, the network entity (e.g., 1404A) may receive, a notification (e.g., 1418) regarding the LTM cell switch and information regarding at least one of: at least one condition of the set of conditions being met, a first satisfied condition in the at least one condition, or a time between each condition of the at least one condition. In some aspects, 2306 may be performed by LTM component 199.

In some aspects, the at least one condition includes multiple conditions, and where the information indicates the first satisfied condition in the multiple conditions or the time between each condition of the multiple conditions. In some aspects, the LTM cell switch is an inter-central unit (inter-CU) LTM.

At 2312, the network entity may receive, a handover report with a handover report type of one of early LTM, late LTM, or unnecessary LTM to an unnecessary cell. In some aspects, 2312 may be performed by LTM component 199.

At 2314, the network entity may receive a successful handover report (SHR) or a successful primary secondary cell change report (SPR) based on an LTM supervision timer during a PSCell or a primary cell (PCell) change associated with the LTM cell switch or an other LTM cell switch associated with the LTM cell switch command is greater than a threshold configured by the network entity. For example, the network entity 1504 may receive a successful handover report (SHR) or a successful primary secondary cell change report (SPR) (e.g., 1514) based on an LTM supervision timer during a PSCell or a primary cell (PCell) change associated with the LTM cell switch or an other LTM cell switch associated with the LTM cell switch command is greater than a threshold configured by the network entity. In some aspects, 2314 may be performed by LTM component 199. In some aspects, the threshold is configured for a specific cell type. In some aspects, the SHR or the SPR includes an indication indicating that a CHO, a CPA, or a CPC is configured and not executed when the LTM cell switch or the other LTM cell switch occurs. In some aspects, the SHR or the SPR includes an indication indicating that LTM is configured and not executed when a CHO, a CPA, or a CPC occurs. In some aspects, the SHR or the SPR includes an indication indicating that a time between the LTM cell switch command and a configuration of a CHO, a CPA, or a CPC.

In some aspects, the network entity may receive a first indication indicating that a handover, a PSCell change, or an LTM is based on random access channel (RACH) in a RLF report, a successful handover report (SHR) or a successful primary secondary cell change report (SPR) or second indication indicating that the handover, the PSCell change, or the LTM is not based on the RACH in the RLF report, the SHR, or the SPR. In some aspects, the network entity may receive a first indication indicating whether a handover, a PSCell change, or an LTM has a fallback based on random access channel (RACH) in a RLF report, a successful handover report (SHR) or a successful primary secondary cell change report (SPR) or a second indication that the handover, the PSCell change, or the LTM does not have the fallback based on the RACH in the RLF report, the SHR, or the SPR.

At 2322, the network entity may receive an indication indicating a beam failure during a handover, a PSCell change, or an LTM not based on random access channel (RACH) and an attempt to reestablish connection on a source beam or receive an indication indicating a beam failure during a handover, a PSCell change, or an LTM not based on random access channel (RACH) and an attempt to reestablish connection on a beam different from a source beam or a target beam. In some aspects, 2322 may be performed by LTM component 199. In some aspects, a beam failure occurred during a handover, a PSCell change, or an LTM not based on random access channel (RACH), and the network entity may receive additional information regarding at least one of: a target beam indicated in a command associated with the handover, the PSCell change, or the LTM, a reconnected beam, a target beam strength, or a reconnected beam strength.

Figure 24:
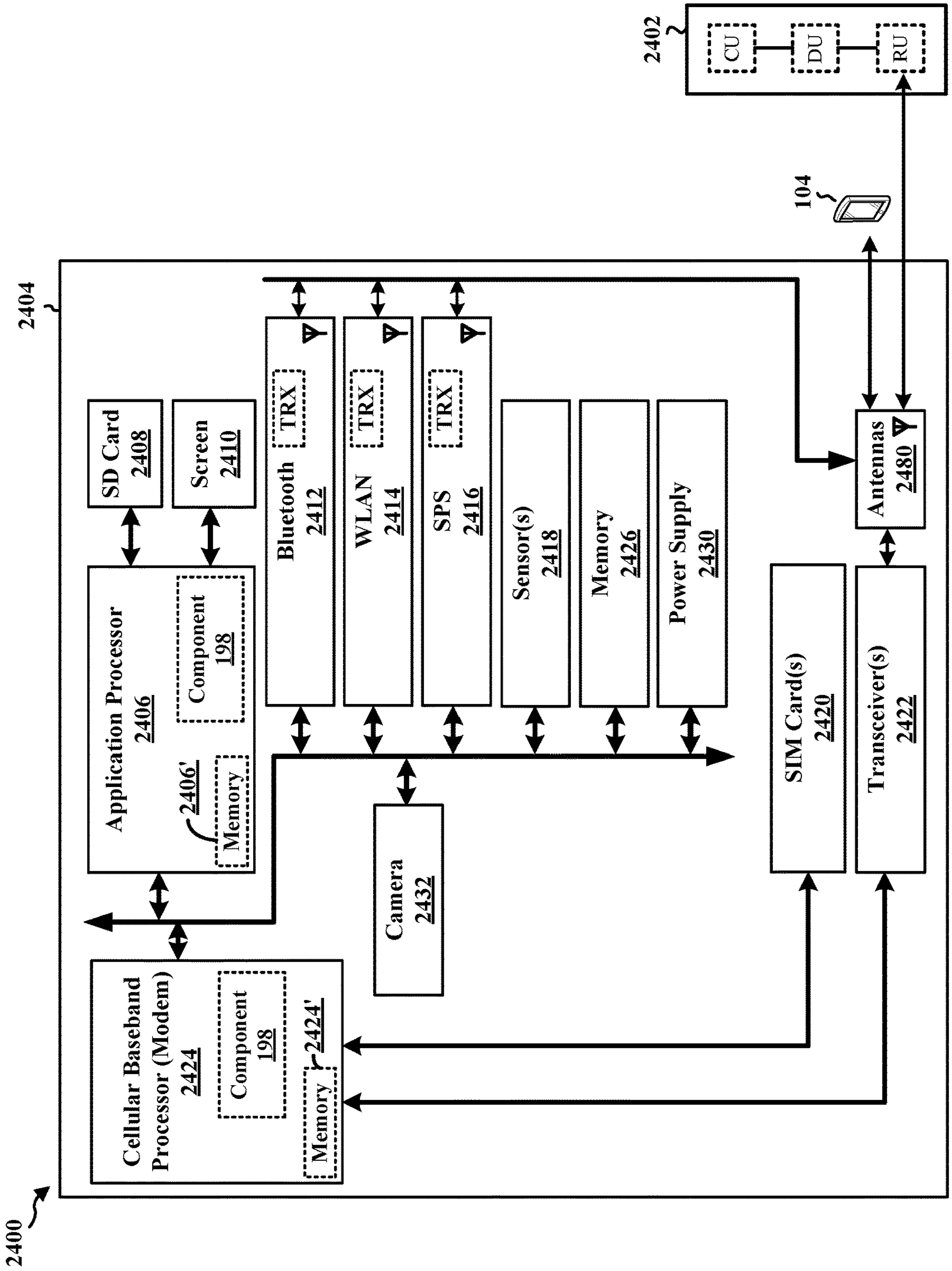
FIG. 24 is a diagram illustrating an example of a hardware implementation for an example apparatus and/or network entity, in accordance with various aspects of the present disclosure.

FIG. 24 is a diagram 2400 illustrating an example of a hardware implementation for an apparatus 2404. The apparatus 2404 may be a UE, a component of a UE, or may implement UE functionality. In some aspects, the apparatus 2404 may include at least one cellular baseband processor 2424 (also referred to as a modem) coupled to one or more transceivers 2422 (e.g., cellular RF transceiver). The cellular baseband processor(s) 2424 may include at least one on-chip memory 2424'. In some aspects, the apparatus 2404 may further include one or more subscriber identity modules (SIM) cards 2420 and at least one application processor 2406 coupled to a secure digital (SD) card 2408 and a screen 2410. The application processor(s) 2406 may include on-chip memory 2406'. In some aspects, the apparatus 2404 may further include a Bluetooth module 2412, a WLAN module 2414, an SPS module 2416 (e.g., GNSS module), one or more sensor modules 2418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2426, a power supply 2430, and/or a camera 2432. The Bluetooth module 2412, the WLAN module 2414, and the SPS module 2416 may include an on-chip transceiver (TRX) (or in some cases, just a receiver (RX)). The Bluetooth module 2412, the WLAN module 2414, and the SPS module 2416 may include their own dedicated antennas and/or utilize the antennas 2480 for communication. The cellular baseband processor(s) 2424 communicates through the transceiver(s) 2422 via one or more antennas 2480 with the UE 104 and/or with an RU associated with a network entity 2402. The cellular baseband processor(s) 2424 and the application processor(s) 2406 may each include a computer-readable medium/memory 2424', 2406', respectively. The additional memory modules 2426 may also be considered a computer-readable medium/memory. Each computer-readable medium/memory 2424', 2406', 2426 may be non-transitory. The cellular baseband processor(s) 2424 and the application processor(s) 2406 are each responsible for general processing, including the execution of software stored on the computer-readable medium/memory. The software, when executed by the cellular baseband processor(s) 2424/application processor(s) 2406, causes the cellular baseband processor(s) 2424/application processor(s) 2406 to perform the various functions described supra. The computer-readable medium/memory may also be used for storing data that is manipulated by the cellular baseband processor(s) 2424/application processor(s) 2406 when executing software. The cellular baseband processor(s) 2424/application processor(s) 2406 may be a component of the UE 350 and may include the at least one memory 360 and/or at least one of the TX processor 368, the RX processor 356, and the controller/processor 359. In one configuration, the apparatus 2404 may be at least one processor chip (modem and/or application) and include just the cellular baseband processor (s) 2424 and/or the application processor(s) 2406, and in another configuration, the apparatus 2404 may be the entire UE (e.g., see UE 350 of FIG. 3) and include the additional modules of the apparatus 2404.

As discussed supra, the LTM component 198 may be configured to receive, from a network entity, an LTM configuration. In some aspects, the LTM component 198 may be configured to receive, from the network entity, an LTM cell switch command associated with the LTM configuration. In some aspects, the LTM component 198 may be configured to transmit, to the network entity, a RLF report based on a failure of an LTM cell switch based on the LTM cell switch command or an RLF after the LTM cell switch based on the LTM cell switch command, the RLF report including information associated with the LTM configuration or the LTM cell switch command. In some aspects, the LTM component 198 may be configured to receive, from a network entity, a conditional LTM configuration indicating a set of conditions for performing an LTM cell switch without an LTM cell switch command. In some aspects, the LTM component 198 may be configured to perform the LTM cell switch based on at least one condition of the set of conditions is met. In some aspects, the LTM component 198 may be configured to transmit, to the network entity, a notification regarding the LTM cell switch and information regarding at least one of: the at least one condition, a first satisfied condition in the at least one condition, or a time between each condition of the at least one condition. The LTM component 198 may be further configured to perform any of the aspects described in connection with the flowcharts in FIGS. 16, 17, 20, and/or 21, performed by the UE in any of FIGS. 6, 4-15. The LTM component 198 may be within the cellular baseband processor(s) 2424, the application processor(s) 2406, or both the cellular baseband processor(s) 2424 and the application processor(s) 2406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2404 may include a variety of components configured for various functions. In one configuration, the apparatus 2404, and in particular the cellular baseband processor(s) 2424 and/or the application processor(s) 2406, may include means for receiving, from a network entity, an LTM configuration. In some aspects, the apparatus 2404 may include means for receiving, from the network entity, an LTM cell switch command associated with the LTM configuration. In some aspects, the apparatus 2404 may include means for transmitting, to the network entity, a RLF report based on a failure of an LTM cell switch based on the LTM cell switch command or an RLF after the LTM cell switch based on the LTM cell switch command, the RLF report including information associated with the LTM configuration or the LTM cell switch command. In some aspects, the apparatus 2404 may include means for reestablishing radio link with the network entity and indicate to the network entity that a reestablishment of the radio link is due to the LTM cell switch based on the failure of the LTM cell switch command. In some aspects, the apparatus 2404 may include means for transmitting the RLF report based on the failure of the LTM cell switch based on the LTM cell switch command. In some aspects, the apparatus 2404 may include means for transmitting the RLF report based on the RLF occurring within a threshold period of time after the LTM cell switch based on the LTM cell switch command. In some aspects, the apparatus 2404 may include means for refraining from executing a CHO, a CPA, or a CPC based on a reception of the LTM cell switch command. In some aspects, the apparatus 2404 may include means for refraining from evaluating a condition associated with the CHO, the CPA, or the CPC based on the reception of the LTM cell switch command. In some aspects, the apparatus 2404 may include means for executing a CHO, a CPA, or a CPC. In some aspects, the apparatus 2404 may include means for transmitting, to the network entity, an indication indicating that the LTM cell switch is based on the failure of the LTM cell switch command or stopped due to the CHO, the CPA, or the CPC. In some aspects, the apparatus 2404 may include means for transmitting, to the network entity, additional information indicating at least one of: the SCG failure is associated with the LTM cell switch command, a cause associated with the SCG failure being associated with the LTM cell switch command, or a time between the LTM cell switch command and the SCG failure. In some aspects, the apparatus 2404 may include means for recording and reporting an interruption time during the LTM cell switch. In some aspects, the apparatus 2404 may include means for receiving, from a network entity, a conditional LTM configuration indicating a set of conditions for performing an LTM cell switch without an LTM cell switch command. In some aspects, the apparatus 2404 may include means for performing the LTM cell switch based on at least one condition of the set of conditions is met. In some aspects, the apparatus 2404 may include means for transmitting, to the network entity, a notification regarding the LTM cell switch and information regarding at least one of: the at least one condition, a first satisfied condition in the at least one condition, or a time between each condition of the at least one condition. In some aspects, the apparatus 2404 may include means for recording a successful handover report (SHR) or a successful primary secondary cell change report (SPR) based on an LTM supervision timer during a PSCell or a primary cell (PCell) change associated with the LTM cell switch or an other LTM cell switch associated with the LTM cell switch command is greater than a threshold configured by the network entity. In some aspects, the apparatus 2404 may include means for transmitting, to the network entity, one of: a first indication that a handover, a PSCell change, or an LTM is based on random access channel (RACH) in a RLF report, a successful handover report (SHR) or a successful primary secondary cell change report (SPR), a second indication that the handover, the PSCell change, or the LTM is not based on the RACH in the RLF report, the SHR, or the SPR. In some aspects, the apparatus 2404 may include means for transmit, to the network entity, one of: a first indication that a handover, a PSCell change, or an LTM has a fallback based on random access channel (RACH) in a RLF report, a successful handover report (SHR) or a successful primary secondary cell change report (SPR), a second indication that the handover, the PSCell change, or the LTM does not have the fallback based on the RACH in the RLF report, the SHR, or the SPR. In some aspects, the apparatus 2404 may include means for transmitting, to the network entity, an indication indicating a beam failure during a handover, a PSCell change, or an LTM not based on random access channel (RACH) and an attempt to reestablish connection on a source beam. In some aspects, the apparatus 2404 may include means for transmitting, to the network entity, an indication indicating a beam failure during a handover, a PSCell change, or an LTM not based on random access channel (RACH) and an attempt to reestablish connection on a beam different from a source beam or a target beam. In some aspects, the apparatus 2404 may include means for transmitting, to the network entity, additional information regarding at least one of: a target beam indicated in a command associated with the handover, the PSCell change, or the LTM, a reconnected beam, a target beam strength, or a reconnected beam strength. The apparatus may further include means for performing any of the aspects described in connection with the flowcharts in FIGS. 16, 17, 20, and/or 21, performed by the UE in any of FIGS. 6, 4-15. The means may be the component 198 of the apparatus 2404 configured to perform the functions recited by the means. As described supra, the apparatus 2404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 25:
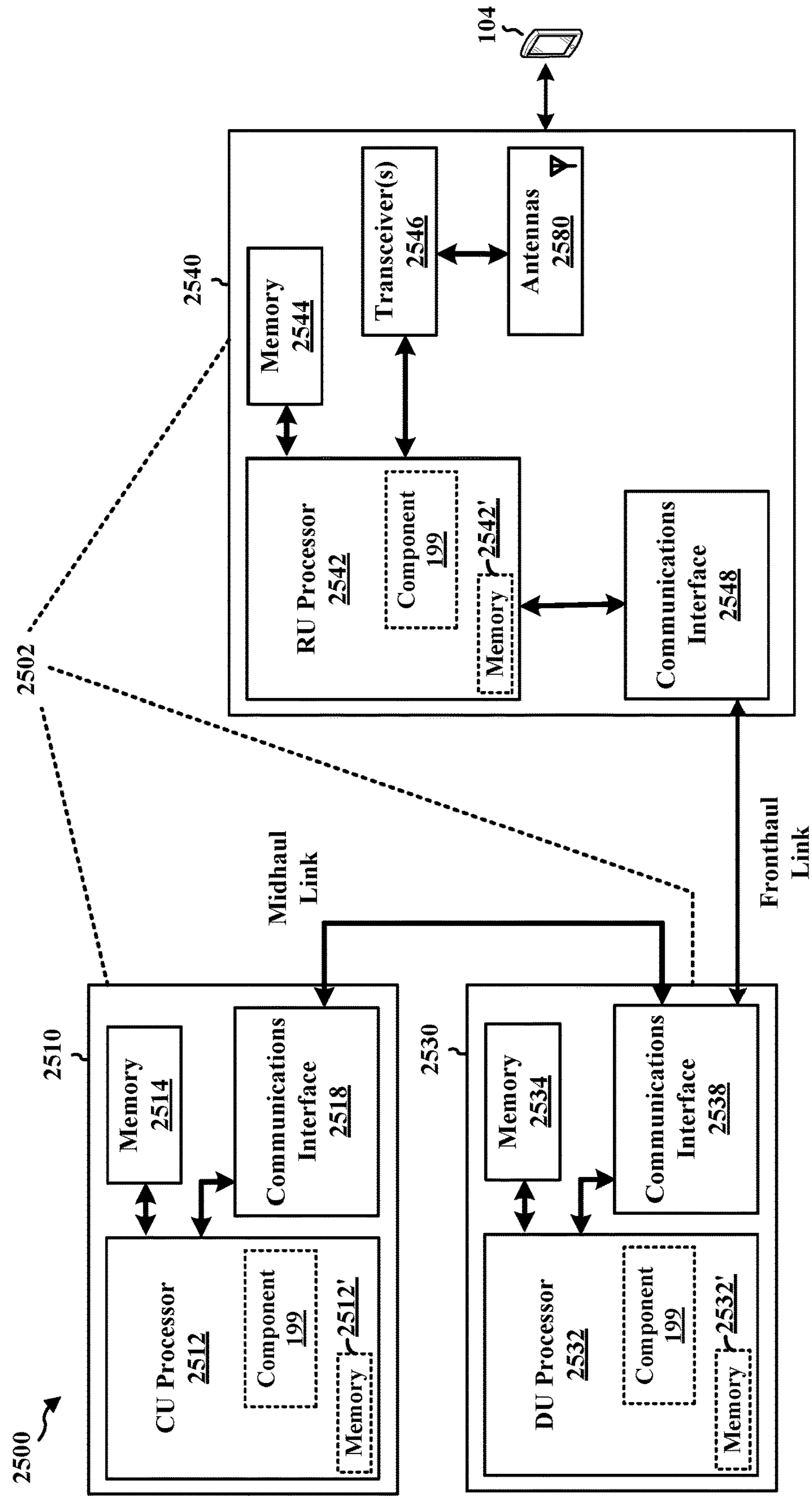
FIG. 25 is a diagram illustrating an example of a hardware implementation for an example network entity, in accordance with various aspects of the present disclosure.

FIG. 25 is a diagram 2500 illustrating an example of a hardware implementation for a network entity 2502. The network entity 2502 may be a BS, a component of a BS, or may implement BS functionality. The network entity 2502 may include at least one of a CU 2510, a DU 2530, or an RU 2540. For example, depending on the layer functionality handled by the component 199, the network entity 2502 may include the CU 2510; both the CU 2510 and the DU 2530; each of the CU 2510, the DU 2530, and the RU 2540; the DU 2530; both the DU 2530 and the RU 2540; or the RU 2540. The CU 2510 may include at least one CU processor 2512. The CU processor(s) 2512 may include on-chip memory 2512'. In some aspects, the CU 2510 may further include additional memory modules 2514 and a communications interface 2518. The CU 2510 communicates with the DU 2530 through a midhaul link, such as an F1 interface. The DU 2530 may include at least one DU processor 2532. The DU processor(s) 2532 may include on-chip memory 2532'. In some aspects, the DU 2530 may further include additional memory modules 2534 and a communications interface 2538. The DU 2530 communicates with the RU 2540 through a fronthaul link. The RU 2540 may include at least one RU processor 2542. The RU processor(s) 2542 may include on-chip memory 2542'. In some aspects, the RU 2540 may further include additional memory modules 2544, one or more transceivers 2546, antennas 2580, and a communications interface 2548. The RU 2540 communicates with the UE 104. The on-chip memory 2512', 2532', 2542' and the additional memory modules 2514, 2534, 2544 may each be considered a computer-readable medium/memory. Each computer-readable medium/memory may be non-transitory. Each of the processors 2512, 2532, 2542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the LTM component 199 may be configured to transmit, for a UE, an LTM configuration. In some aspects, the LTM component 199 may be configured to transmit, for the UE, an LTM cell switch command associated with the LTM configuration. In some aspects, the LTM component 199 may be configured to receive a RLF report based on a failure of an LTM cell switch based on the LTM cell switch command or an RLF after the LTM cell switch based on the LTM cell switch command, the RLF report including information associated with the LTM configuration or the LTM cell switch command. In some aspects, the LTM component 199 may be configured to transmit, for a UE, a conditional LTM configuration indicating a set of conditions for performing an LTM cell switch without an LTM cell switch command. In some aspects, the LTM component 199 may be configured to receive, a notification regarding the LTM cell switch and information regarding at least one of: at least one condition of the set of conditions being met, a first satisfied condition in the at least one condition, or a time between each condition of the at least one condition. The LTM component 199 may be configured to perform any of the aspects described in connection with the flowcharts in FIGS. 18, 19, 22, and/or 23, performed by the network entity in any of FIGS. 6, 4-15. The LTM component 199 may be within one or more processors of one or more of the CU 2510, DU 2530, and the RU 2540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2502 may include a variety of components configured for various functions. In one configuration, the network entity 2502 may include means for transmitting, for a UE, an LTM configuration. In some aspects, the network entity 2502 may include means for transmitting, for the UE, an LTM cell switch command associated with the LTM configuration. In some aspects, the network entity 2502 may include means for receiving a RLF report based on a failure of an LTM cell switch based on the LTM cell switch command or an RLF after the LTM cell switch based on the LTM cell switch command, the RLF report including information associated with the LTM configuration or the LTM cell switch command. In some aspects, the network entity 2502 may include means for reestablishing radio link with the UE and receiving an indication indicating that a reestablishment of the radio link is due to the LTM cell switch based on the failure of the LTM cell switch command. In some aspects, the network entity 2502 may include means for receiving an indication indicating that the LTM cell switch based on the failure of the LTM cell switch command or stopped due to a CHO, a CPA, or a CPC. In some aspects, the network entity 2502 may include means for receiving additional information indicating at least one of: the SCG failure is associated with the LTM cell switch command, the SCG failure is not associated with the LTM cell switch command, a cause associated with the SCG failure being associated with the LTM cell switch command, a time between the LTM cell switch command and the SCG failure. In some aspects, the network entity 2502 may include means for transmitting, for a UE, a conditional LTM configuration indicating a set of conditions for performing an LTM cell switch without an LTM cell switch command. In some aspects, the network entity 2502 may include means for receiving, a notification regarding the LTM cell switch and information regarding at least one of: at least one condition of the set of conditions being met, a first satisfied condition in the at least one condition, or a time between each condition of the at least one condition. In some aspects, the network entity 2502 may include means for receiving, a handover report with a handover report type of one of: early LTM, late LTM, or unnecessary LTM to an unnecessary cell. In some aspects, the network entity 2502 may include means for receiving a successful handover report (SHR) or a successful primary secondary cell change report (SPR) based on an LTM supervision timer during a PSCell or a primary cell (PCell) change associated with the LTM cell switch or an other LTM cell switch associated with the LTM cell switch command is greater than a threshold configured by the network entity. In some aspects, the network entity 2502 may include means for receiving a first indication indicating that a handover, a PSCell change, or an LTM is based on random access channel (RACH) in a RLF report, a successful handover report (SHR) or a successful primary secondary cell change report (SPR) or a second indication indicating that the handover, the PSCell change, or the LTM is not based on the RACH in the RLF report, the SHR, or the SPR. In some aspects, the network entity 2502 may include means for receiving an indication indicating a beam failure during a handover, a PSCell change, or an LTM not based on random access channel (RACH) and an attempt to reestablish connection on a source beam. In some aspects, the network entity 2502 may include means for receive a first indication indicating whether a handover, a PSCell change, or an LTM has a fallback based on random access channel (RACH) in a RLF report, a successful handover report (SHR) or a successful primary secondary cell change report (SPR) or a second indication that the handover, the PSCell change, or the LTM does not have the fallback based on the RACH in the RLF report, the SHR, or the SPR. In some aspects, the network entity 2502 may include means for receiving an indication indicating a beam failure during a handover, a PSCell change, or an LTM not based on random access channel (RACH) and an attempt to reestablish connection on a beam different from a source beam or a target beam. In some aspects, the network entity 2502 may include means for receiving additional information regarding at least one of: a target beam indicated in a command associated with the handover, the PSCell change, or the LTM, a reconnected beam, a target beam strength, or a reconnected beam strength. The network entity may further include means for performing any of the aspects described in connection with the flowcharts in FIGS. 18, 19, 22, and/or 23, performed by the network entity in any of FIGS. 6, 4-15. The means may be the component 199 of the network entity 2502 configured to perform the functions recited by the means. As described supra, the network entity 2502 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a user equipment (UE), including: receiving, from a network entity, a lower-layer triggered mobility (LTM) configuration; receiving, from the network entity, an LTM cell switch command associated with the LTM configuration; and transmitting, to the network entity, a radio link failure (RLF) report based on a failure of an LTM cell switch based on the LTM cell switch command or an RLF after the LTM cell switch based on the LTM cell switch command, the RLF report including information associated with the LTM configuration or the LTM cell switch command.

Aspect 2 is the method of aspect 1, where the information associated with the LTM configuration or the LTM cell switch command includes at least one of: a configuration identifier (ID) associated with the LTM cell switch command, a beam ID associated with the LTM cell switch command, a transmission configuration indicator (TCI) ID associated with the LTM cell switch command, or a set of contention free random access (CFRA) resources associated with the LTM cell switch command.

Aspect 3 is the method of any of aspects 1-2, where the information associated with the LTM configuration or the LTM cell switch command includes at least one of: a reference configuration associated with the LTM configuration, a candidate configuration associated with the LTM configuration, or a layer 1 (L1) measurement configuration identifier (ID) associated with the LTM configuration.

Aspect 4 is the method of any of aspects 1-3, further including: reestablishing radio link with the network entity and indicate to the network entity that a reestablishment of the radio link is due to the LTM cell switch based on the failure of the LTM cell switch command.

Aspect 5 is the method of any of aspects 1-4, where the RLF report includes an indication indicating that the LTM cell switch based on the failure of the LTM cell switch command.

Aspect 6 is the method of any of aspects 1-5, where transmitting the RLF report includes: transmitting the RLF report based on the failure of the LTM cell switch based on the LTM cell switch command.

Aspect 7 is the method of any of aspects 1-5, where transmitting the RLF report includes: transmitting the RLF report based on the RLF occurring within a threshold period of time after the LTM cell switch based on the LTM cell switch command.

Aspect 8 is the method of any of aspects 1-7, where the UE is not configured with a recovery mechanism associated with LTM or conditional handover (CHO), and where based on the UE being not configured with the recovery mechanism associated with the LTM or the CHO, the RLF report further includes an additional indicator or additional timing information.

Aspect 9 is the method of aspect 8, where the additional indicator includes an indicator indicating at least one of: the UE is configured with the CHO when an LTM failure occurs, the UE is not configured with the CHO when the LTM failure occurs, the UE is configured with the LTM when an CHO failure occurs, the UE is not configured with the LTM when the CHO failure occurs, the UE is configured with the LTM or the CHO when the RLF occurs, or the UE is configured with the LTM or the CHO when the RLF occurs.

Aspect 10 is the method of any of aspects 8-9, where the additional timing information includes at least one of: a first time between the LTM cell switch command and the LTM configuration, a second time between the LTM cell switch command and the RLF, a third time between the LTM cell switch command and the failure, a fourth time between a CHO execution and a CHO failure, or a fifth time between a CHO configuration and the LTM configuration.

Aspect 11 is the method of any of aspects 1-10, where the RLF report further includes at least one of: a cell global identity (CGI) associated with a cell associated with an attempted recovery associated with the failure or the RLF, a recovery type associated with the attempted recovery if the cell is a CHO candidate cell and an LTM candidate cell, or a time between the attempted recovery and the failure or the RLF.

Aspect 12 is the method of any of aspects 1-11, further including: refraining from executing a conditional handover (CHO), a conditional primary secondary cell (PSCell) addition (CPA), or a conditional PSCell Change (CPC) based on a reception of the LTM cell switch command; or refraining from evaluating a condition associated with the CHO, the CPA, or the CPC based on the reception of the LTM cell switch command.

Aspect 13 is the method of any of aspects 1-12, further including: executing a conditional handover (CHO), a conditional primary secondary cell (PSCell) addition (CPA), or a conditional PSCell Change (CPC); and transmitting, to the network entity, an indication indicating that the LTM cell switch is based on the failure of the LTM cell switch command or stopped due to the CHO, the CPA, or the CPC.

Aspect 14 is the method of any of aspects 1-13, where the LTM cell switch command is associated with a primary secondary cell (PSCell), where the LTM cell switch based on the failure of the LTM cell switch command or a secondary cell group (SCG) failure occurs for the PSCell, and further including: transmitting, to the network entity, additional information indicating at least one of: the SCG failure is associated with the LTM cell switch command, a cause associated with the SCG failure being associated with the LTM cell switch command, a time between the LTM cell switch command and the SCG failure, a first identifier of a source PSCell during LTM, a second identifier of a target PSCell during the LTM, a third identifier of a failed PSCell during the LTM, random access (RACH) information of an SCG if the LTM is RACH-based or RACH-less indication, or at least one layer 1 (L1) measurement of one or more candidate or neighboring PSCells during the LTM.

Aspect 15 is the method of aspect 14, where the information further includes: at least one indicator indicating at least one of: the UE is configured with a conditional primary secondary cell (PSCell) addition (CPA), or a conditional PSCell Change (CPC) when the SCG failure occurs for the PSCell, the UE is not configured with the CPA or the CPC when the SCG failure occurs for the PSCell, the UE is configured with LTM for the PSCell when there is a CPA failure or a CPC failure, the UE is not configured with the LTM for the PSCell when there is the CPA failure or the CPC failure, the UE is configured with the LTM or CHO for the PSCell when the SCG failure occurs for the PSCell, or the UE is not configured with the LTM or CHO for the PSCell when the SCG failure occurs for the PSCell; or timing information regarding at least one of: a first time between the LTM cell switch command and the SCG failure or the failure of the LTM cell switch, a second time between the LTM configuration and the LTM cell switch command, a third time between the LTM configuration and the failure of the LTM cell switch, or a fourth time between a configuration associated with the CPA or the CPC and the LTM configuration.

Aspect 16 is the method of any of aspects 1-15, where a target cell associated with the LTM cell switch is not a current serving cell, and further including: recording and reporting an interruption time during the LTM cell switch, where the interruption time is a time between the LTM cell switch and one of: an initial transmission or an initial reception on an indicated beam of the target cell, a first transmission or a first reception after the LTM cell switch, a transmission of an indication of radio resource control (RRC) reconfiguration completion, or a contention resolution identity medium access control (MAC) control element (MAC-CE).

Aspect 17 is a method for wireless communication performed by a network entity, including: transmitting, for a UE, a lower-layer triggered mobility (LTM) configuration; transmitting, for the UE, an LTM cell switch command associated with the LTM configuration; and receiving a radio link failure (RLF) report based on a failure of an LTM cell switch based on the LTM cell switch command or an RLF after the LTM cell switch based on the LTM cell switch command, the RLF report including information associated with the LTM configuration or the LTM cell switch command.

Aspect 18 is the method of aspect 17, where the information associated with the LTM configuration or the LTM cell switch command includes at least one of: a configuration identifier (ID) associated with the LTM cell switch command, a beam ID associated with the LTM cell switch command, a transmission configuration indicator (TCI) ID associated with the LTM cell switch command, or a set of contention free random access (CFRA) resources associated with the LTM cell switch command.

Aspect 19 is the method of any of aspects 17-18, where the information associated with the LTM configuration or the LTM cell switch command includes at least one of: a reference configuration associated with the LTM configuration, a candidate configuration associated with the LTM configuration, or a layer 1 (L1) measurement configuration identifier (ID) associated with the LTM configuration.

Aspect 20 is the method of any of aspects 17-19, further including: reestablishing radio link with the UE and receiving an indication indicating that a reestablishment of the radio link is due to the LTM cell switch based on the failure of the LTM cell switch command.

Aspect 21 is the method of any of aspects 17-20, where the RLF report includes an indication indicating that the LTM cell switch based on the failure of the LTM cell switch command.

Aspect 22 is the method of any of aspects 17-21, where the RLF report based on the LTM cell switch is based on the failure of the LTM cell switch command.

Aspect 23 is the method of any of aspects 17-21, where the RLF report is based on the RLF occurring within a threshold period of time after the LTM cell switch based on the LTM cell switch command.

Aspect 24 is the method of any of aspects 17-23, where the UE is not configured with a recovery mechanism associated with LTM or conditional handover (CHO), and where based on the UE being not configured with the recovery mechanism associated with the LTM or the CHO, the RLF report further includes an additional indicator or additional timing information.

Aspect 25 is the method of any of aspects 24, where the additional indicator includes an indicator indicating at least one of: the UE is configured with the CHO when an LTM failure occurs, the UE is not configured with the CHO when the LTM failure occurs, the UE is configured with the LTM when an CHO failure occurs, the UE is not configured with the LTM when the CHO failure occurs, the UE is configured with the LTM or the CHO when the RLF occurs, or the UE is configured with the LTM or the CHO when the RLF occurs.

Aspect 26 is the method of any of aspects 24-25, where the additional timing information includes at least one of: a first time between the LTM cell switch command and the LTM configuration, a second time between the LTM cell switch command and the RLF, a third time between the LTM cell switch command and the failure, a fourth time between a CHO execution and a CHO failure, or a fifth time between a CHO configuration and the LTM configuration.

Aspect 27 is the method of any of aspects 17-26, where the RLF report further includes at least one of: a cell global identity (CGI) associated with a cell associated with an attempted recovery associated with the failure or the RLF, a recovery type associated with the attempted recovery if the cell is a CHO candidate cell and an LTM candidate cell, or a time between the attempted recovery and the failure or the RLF.

Aspect 28 is the method of any of aspects 17-27, further including: receiving an indication indicating that the LTM cell switch based on the failure of the LTM cell switch command or stopped due to a conditional handover (CHO), a conditional primary secondary cell (PSCell) addition (CPA), or a conditional PSCell Change (CPC).

Aspect 29 is the method of any of aspects 17-28, where the LTM cell switch command is associated with a primary secondary cell (PSCell), where the LTM cell switch based on the failure of the LTM cell switch command or a secondary cell group (SCG) failure occurs for the PSCell, and further including: receiving additional information indicating at least one of: the SCG failure is associated with the LTM cell switch command, the SCG failure is not associated with the LTM cell switch command, a cause associated with the SCG failure being associated with the LTM cell switch command, or a time between the LTM cell switch command and the SCG failure.

Aspect 30 is the method of aspect 29, where the information further includes: at least one indicator indicating at least one of: the UE is configured with a conditional primary secondary cell (PSCell) addition (CPA) or a conditional PSCell Change (CPC) when the SCG failure occurs for the PSCell, the UE is not configured with the CPA or the CPC when the SCG failure occurs for the PSCell, the UE is configured with LTM for the PSCell when there is a CPA failure or a CPC failure, the UE is not configured with the LTM for the PSCell when there is the CPA failure or the CPC failure, the UE is configured with the LTM or CHO for the PSCell when the SCG failure occurs for the PSCell, or the UE is not configured with the LTM or CHO for the PSCell when the SCG failure occurs for the PSCell; or timing information regarding at least one of: a first time between the LTM cell switch command and the SCG failure or the failure of the LTM cell switch, a second time between the LTM configuration and the LTM cell switch command, a third time between the LTM configuration and the failure of the LTM cell switch, or a fourth time between a configuration associated with the CPA or the CPC and the LTM configuration.

Aspect 31 is a method for wireless communication performed by a user equipment (UE), including: receiving, from a network entity, a conditional lower-layer triggered mobility (LTM) configuration indicating a set of conditions for performing an LTM cell switch without an LTM cell switch command; performing the LTM cell switch based on at least one condition of the set of conditions is met; and transmitting, to the network entity, a notification regarding the LTM cell switch and information regarding at least one of: the at least one condition, a first satisfied condition in the at least one condition, or a time between each condition of the at least one condition.

Aspect 32 is the method of aspect 31, where the at least one condition includes multiple conditions, and where the information indicates the first satisfied condition in the multiple conditions or the time between each condition of the multiple conditions.

Aspect 33 is the method of any of aspects 31-32, where the LTM cell switch is an inter-central unit (inter-CU) LTM, and further including: transmitting, to the network entity, a handover report with a handover report type of one of: early LTM, late LTM, or unnecessary LTM to an unnecessary cell.

Aspect 34 is the method of any of aspects 1-16 and 31, further including: recording a successful handover report (SHR) or a successful primary secondary cell change report (SPR) based on an LTM supervision timer during a primary secondary cell (PSCell) or a primary cell (PCell) change associated with the LTM cell switch or an other LTM cell switch associated with the LTM cell switch command is greater than a threshold configured by the network entity.

Aspect 35 is the method of aspect 34, where the threshold is configured for a specific cell type.

Aspect 36 is the method of any of aspects 34-35, where the SHR or the SPR includes an indication indicating that a conditional handover (CHO), a conditional PSCell addition (CPA), or a conditional PSCell Change (CPC) is configured and not executed when the LTM cell switch or the other LTM cell switch occurs.

Aspect 37 is the method of any of aspects 34-35, where the SHR or the SPR includes an indication indicating that LTM is configured and not executed when a conditional handover (CHO), a conditional PSCell addition (CPA), or a conditional PSCell Change (CPC) occurs.

Aspect 38 is the method of any of aspects 34-35, where the SHR or the SPR includes an indication indicating that a time period between the LTM cell switch command and a configuration of a conditional handover (CHO), a conditional PSCell addition (CPA), or a conditional PSCell Change (CPC).

Aspect 39 is the method of any of aspects 1-16 and 31-38, further including: transmitting, to the network entity, one of: a first indication that a handover, a primary secondary cell (PSCell) change, or an LTM is based on random access channel (RACH) in a radio link failure (RLF) report, a successful handover report (SHR) or a successful primary secondary cell change report (SPR), or a second indication that the handover, the PSCell change, or the LTM is not based on the RACH in the RLF report, the SHR, or the SPR.

Aspect 40 is the method of any of aspects 1-16 and 31-39, further including: transmitting, to the network entity, one of: a first indication that a handover, a primary secondary cell (PSCell) change, or an LTM has a fallback based on random access channel (RACH) in a radio link failure (RLF) report, a successful handover report (SHR) or a successful primary secondary cell change report (SPR), or a second indication that the handover, the PSCell change, or the LTM does not have the fallback based on the RACH in the RLF report, the SHR, or the SPR.

Aspect 41 is the method of any of aspects 1-16 and 31-40, further including: transmitting, to the network entity, an indication indicating a beam failure during a handover, a primary secondary cell (PSCell) change, or an LTM not based on random access channel (RACH) and an attempt to reestablish connection on a source beam.

Aspect 42 is the method of any of aspects 1-16 and 31-42, further including: transmitting, to the network entity, an indication indicating a beam failure during a handover, a primary secondary cell (PSCell) change, or an LTM not based on random access channel (RACH) and an attempt to reestablish connection on a beam different from a source beam or a target beam.

Aspect 43 is the method of any of aspects 1-16 and 31-42, where a beam failure occurred during a handover, a primary secondary cell (PSCell) change, or an LTM not based on random access channel (RACH), and further including: transmitting, to the network entity, additional information regarding at least one of: a target beam indicated in a command associated with the handover, the PSCell change, or the LTM, a reconnected beam, a target beam strength, or a reconnected beam strength.

Aspect 44 is a method for wireless communication performed by a network entity, including: transmitting, for a user equipment (UE), a conditional lower-layer triggered mobility (LTM) configuration indicating a set of conditions for performing an LTM cell switch without an LTM cell switch command; and receiving, a notification regarding the LTM cell switch and information regarding at least one of:

at least one condition of the set of conditions being met, a first satisfied condition in the at least one condition, or a time between each condition of the at least one condition.

Aspect 45 is the method of aspect 44, where the at least one condition includes multiple conditions, and where the information indicates the first satisfied condition in the multiple conditions or the time between each condition of the multiple conditions.

Aspect 46 is the method of any of aspects 17-30 and 44-45, where the LTM cell switch is an inter-central unit (inter-CU) LTM, and further including: receiving, a handover report with a handover report type of one of: early LTM, late LTM, or unnecessary LTM to an unnecessary cell.

Aspect 47 is the method of any of aspects 17-30 and 44-46, further including: receiving a successful handover report (SHR) or a successful primary secondary cell change report (SPR) based on an LTM supervision timer during a primary secondary cell (PSCell) or a primary cell (PCell) change associated with the LTM cell switch or an other LTM cell switch associated with the LTM cell switch command is greater than a threshold configured by the network entity.

Aspect 48 is the method of aspects 46, where the threshold is configured for a specific cell type.

Aspect 49 is the method of any of aspects 47-48, where the SHR or the SPR includes an indication indicating that a conditional handover (CHO), a conditional PSCell addition (CPA), or a conditional PSCell Change (CPC) is configured and not executed when the LTM cell switch or the other LTM cell switch occurs.

Aspect 50 is the method of any of aspects 47-48, where the SHR or the SPR includes an indication indicating that LTM is configured and not executed when a conditional handover (CHO), a conditional PSCell addition (CPA), or a conditional PSCell Change (CPC) occurs.

Aspect 51 is the method of any of aspects 47-48, where the SHR or the SPR includes an indication indicating that a time between the LTM cell switch command and a configuration of a conditional handover (CHO), a conditional PSCell addition (CPA), or a conditional PSCell Change (CPC).

Aspect 52 is the method of any of aspects 17-30 and 44-51, further including: receiving a first indication indicating that a handover, a primary secondary cell (PSCell) change, or an LTM is based on random access channel (RACH) in a radio link failure (RLF) report, a successful handover report (SHR) or a successful primary secondary cell change report (SPR), or a second indication indicating that the handover, the PSCell change, or the LTM is not based on the RACH in the RLF report, the SHR, or the SPR.

Aspect 53 is the method of any of aspects 17-30 and 44-52, further including: receiving a first indication indicating whether a handover, a primary secondary cell (PSCell) change, or an LTM has a fallback based on random access channel (RACH) in a radio link failure (RLF) report, a successful handover report (SHR) or a successful primary secondary cell change report (SPR), or a second indication that the handover, the PSCell change, or the LTM does not have the fallback based on the RACH in the RLF report, the SHR, or the SPR.

Aspect 54 is the method of any of aspects 17-30 and 44-53, further including: receiving an indication indicating a beam failure during a handover, a primary secondary cell (PSCell) change, or an LTM not based on random access channel (RACH) and an attempt to reestablish connection on a source beam.

Aspect 55 is the method of any of aspects 17-30 and 44-54, further including: receiving an indication indicating a beam failure during a handover, a primary secondary cell (PSCell) change, or an LTM not based on random access channel (RACH) and an attempt to reestablish connection on a beam different from a source beam or a target beam.

Aspect 56 is the method of any of aspects 17-30 and 44-55, where a beam failure occurred during a handover, a primary secondary cell (PSCell) change, or an LTM not based on random access channel (RACH), and further including: receiving additional information regarding at least one of: a target beam indicated in a command associated with the handover, the PSCell change, or the LTM, a reconnected beam, a target beam strength, or a reconnected beam strength.

Aspect 57 is a method of any of aspects 17-30 and 44-55, further including receiving additional information for adjusting a trigger associated with an LTM or an SCG based, the information including at least one of: SCG failure information originated from the UE, a first identifier of a source primary secondary cell (PSCell), a second identifier of a failed PSCell, a UE identifier or UE context information associated with the UE, or layer 1 (L1) measurements of one or more candidate/neighboring PSCells.

Aspect 58 is an apparatus for wireless communication at a device including at least one memory and at least one processor coupled to the at least one memory and, the at least one processor, individually or in any combination, based at least in part on information stored in the at least one memory, the at least one processor is configured to implement any of aspects 1 to 16 and 31-43.

Aspect 59 is the apparatus of aspect 58, further including one or more transceivers or one or more antennas coupled to the at least one processor.

Aspect 60 is an apparatus for wireless communication at a device including means for implementing any of aspects 1 to 16 and 31-43.

Aspect 61 is a computer-readable medium (e.g., a non-transitory computer-readable medium) storing computer executable code, where the code when executed by at least one processor causes the at least one processor to implement any of aspects 1 to 16 and 31-43.

Aspect 62 is an apparatus for wireless communication at a device including at least one memory and at least one processor coupled to the at least one memory and, the at least one processor, individually or in any combination, based at least in part on information stored in the at least one memory, the at least one processor is configured to implement any of aspects 17 to 30 and 44-57.

Aspect 63 is the apparatus of aspect 61, further including one or more transceivers or one or more antennas coupled to the at least one processor.

Aspect 64 is an apparatus for wireless communication at a device including means for implementing any of aspects 17 to 30 and 44-57.

Aspect 65 is a computer-readable medium (e.g., a non-transitory computer-readable medium) storing computer executable code, where the code when executed by at least one processor causes the at least one processor to implement any of aspects 17 to 30 and 44-57.

What is claimed is:

1. An apparatus for wireless communication at a user equipment (UE), comprising:

at least one memory; and at least one processor coupled to the at least one memory and, based at least in part on stored information that is stored in the at least one memory, the at least one processor is configured to cause the UE to:

receive, from a network entity, a conditional lower-layer triggered mobility (LTM) configuration indicating a set of conditions for performing an LTM cell switch without an LTM cell switch command;

perform the LTM cell switch based on at least one condition of the set of conditions is met;

transmit, to the network entity, a notification regarding the LTM cell switch and information regarding at least one of: the at least one condition, a first satisfied condition in the at least one condition, or a time between each condition of the at least one condition; and transmit, to the network entity, a flag that indicates whether (1) a handover, a primary secondary cell (PSCell) change, or an LTM is based on random access channel (RACH) in a radio link failure (RLF) report, a successful handover report (SHR) or a successful primary secondary cell change report (SPR), or (2) the handover, the PSCell change, or the LTM is not based on the RACH in the RLF report, the SHR, or the SPR.

2. The apparatus of claim 1, wherein the at least one condition comprises multiple conditions, and wherein the information indicates the first satisfied condition in the multiple conditions or the time between each condition of the multiple conditions.

3. The apparatus of claim 1, wherein the LTM cell switch is an inter-central unit (inter-CU) LTM, and wherein the at least one processor is further configured to cause the UE to:

transmit, to the network entity, a handover report with a handover report type of one of:

early LTM, late LTM, or unnecessary LTM to an unnecessary cell.

4. The apparatus of claim 1, wherein the at least one processor is further configured to cause the UE to:

record the SHR or the SPR based on an LTM supervision timer during a primary secondary cell (PSCell) or a primary cell (PCell) change associated with the LTM cell switch or an other LTM cell switch associated with the LTM cell switch command is greater than a threshold configured by the network entity.

5. The apparatus of claim 4, wherein the threshold is configured for a specific cell type.

6. The apparatus of claim 4, wherein the SHR or the SPR comprises an indication indicating that a conditional handover (CHO), a conditional PSCell addition (CPA), or a conditional PSCell Change (CPC) is configured and not executed when the LTM cell switch or the other LTM cell switch occurs.

7. The apparatus of claim 4, wherein the SHR or the SPR comprises an indication indicating that LTM is configured and not executed when a conditional handover (CHO), a conditional PSCell addition (CPA), or a conditional PSCell Change (CPC) occurs.

8. The apparatus of claim 4, wherein the SHR or the SPR comprises an indication indicating that a time period between the LTM cell switch command and a configuration of a conditional handover (CHO), a conditional PSCell addition (CPA), or a conditional PSCell Change (CPC).

9. The apparatus of claim 1, wherein the at least one processor is further configured to cause the UE to:

transmit, to the network entity, one of:

a first indication that the handover, the PSCell (PSCell) change, or the LTM has a fallback based on the RACH in the RLF report, the SHR or the SPR, or a second indication that the handover, the PSCell change, or the LTM does not have the fallback based on the RACH in the RLF report, the SHR, or the SPR.

10. The apparatus of claim 1, wherein the at least one processor is further configured to cause the UE to:

transmit, to the network entity, an indication indicating a beam failure during the handover, the PSCell change, or the LTM not based on the RACH and an attempt to reestablish connection on a source beam.

11. The apparatus of claim 1, wherein the at least one processor is further configured to cause the UE to:

transmit, to the network entity, an indication indicating a beam failure during the handover, the PSCell change, or the LTM not based on the RACH and an attempt to reestablish connection on a beam different from a source beam or a target beam.

12. The apparatus of claim 1, wherein a beam failure occurred during the handover, the PSCell change, or the LTM not based on the RACH, and wherein the at least one processor is further configured to cause the UE to:

transmit, to the network entity, additional information regarding at least one of: a target beam indicated in a command associated with the handover, the PSCell change, or the LTM, a reconnected beam, a target beam strength, or a reconnected beam strength.

13. An apparatus for wireless communication at a network entity, comprising:

at least one memory; and at least one processor coupled to the at least one memory and, based at least in part on stored information that is stored in the at least one memory, the at least one processor is configured to cause the network entity to:

transmit, for a user equipment (UE), a conditional lower-layer triggered mobility (LTM) configuration indicating a set of conditions for performing an LTM cell switch without an LTM cell switch command;

receive, a notification regarding the LTM cell switch and information regarding at least one of: at least one condition of the set of conditions being met, a first satisfied condition in the at least one condition, or a time between each condition of the at least one condition; and receive, from the UE, a flag that indicates whether (1) a handover, a primary secondary cell (PSCell) change, or an LTM is based on random access channel (RACH) in a radio link failure (RLF) report, a successful handover report (SHR) or a successful primary secondary cell change report (SPR), or (2) the handover, the PSCell change, or the LTM is not based on the RACH in the RLF report, the SHR, or the SPR.

14. The apparatus of claim 13, wherein the at least one condition comprises multiple conditions, and wherein the information indicates the first satisfied condition in the multiple conditions or the time between each condition of the multiple conditions.

15. The apparatus of claim 13, wherein the LTM cell switch is an inter-central unit (inter-CU) LTM, and wherein the at least one processor is further configured to cause the network entity to:

receive, a handover report with a handover report type of one of:

early LTM, late LTM, or unnecessary LTM to an unnecessary cell.

16. The apparatus of claim 13, wherein the at least one processor is further configured to cause the network entity to:

receive the SHR or the SPR based on an LTM supervision timer during a primary secondary cell (PSCell) or a primary cell (PCell) change associated with the LTM cell switch or another LTM cell switch associated with the LTM cell switch command is greater than a threshold configured by the network entity.

17. The apparatus of claim 16, wherein the threshold is configured for a specific cell type.

18. The apparatus of claim 16, wherein the SHR or the SPR comprises an indication indicating that a conditional handover (CHO), a conditional PSCell addition (CPA), or a conditional PSCell Change (CPC) is configured and not executed when the LTM cell switch or the other LTM cell switch occurs.

19. The apparatus of claim 16, wherein the SHR or the SPR comprises an indication indicating that LTM is configured and not executed when a conditional handover (CHO), a conditional PSCell addition (CPA), or a conditional PSCell Change (CPC) occurs.

20. The apparatus of claim 16, wherein the SHR or the SPR comprises an indication indicating that a time between the LTM cell switch command and a configuration of a conditional handover (CHO), a conditional PSCell addition (CPA), or a conditional PSCell Change (CPC).

21. The apparatus of claim 13, wherein the at least one processor is further configured to cause the network entity to:

receive a first indication indicating whether the handover, the PSCell change, or the LTM has a fallback based on the RACH in the RLF report, the SHR or the SPR, or a second indication that the handover, the PSCell change, or the LTM does not have the fallback based on the RACH in the RLF report, the SHR, or the SPR.

22. The apparatus of claim 13, wherein the at least one processor is further configured to cause the network entity to:

receive an indication indicating a beam failure during the handover, the PSCell change, or the LTM not based on the RACH and an attempt to reestablish connection on a source beam.

23. The apparatus of claim 13, wherein the at least one processor is further configured to cause the network entity to:

receive an indication indicating a beam failure during the handover, the PSCell change, or the LTM not based on the RACH and an attempt to reestablish connection on a beam different from a source beam or a target beam.

24. The apparatus of claim 13, wherein a beam failure occurred during the handover, the PSCell change, or the LTM not based on the RACH, and wherein the at least one processor is further configured to cause the network entity to:

receive additional information regarding at least one of: a target beam indicated in a command associated with the handover, the PSCell change, or the LTM, a reconnected beam, a target beam strength, or a reconnected beam strength.

25. The apparatus of claim 13, wherein the at least one processor is further configured to cause the network entity to:

receive additional information for adjusting a trigger associated with the LTM or an SCG based, the information including at least one of: SCG failure information originated from the UE, a first identifier of a source primary secondary cell (PSCell), a second identifier of a failed PSCell, a UE identifier or UE context information associated with the UE, or layer 1 (L1) measurements of one or more candidate/neighboring PSCells.

26. A method for wireless communication performed by a user equipment (UE), comprising:

receiving, from a network entity, a conditional lower-layer triggered mobility (LTM) configuration indicating a set of conditions for performing an LTM cell switch without an LTM cell switch command;

performing the LTM cell switch based on at least one condition of the set of conditions is met;

transmitting, to the network entity, a notification regarding the LTM cell switch and information regarding at least one of: the at least one condition, a first satisfied condition in the at least one condition, or a time between each condition of the at least one condition; and transmitting, to the network entity, a flag that indicates whether (1) a handover, a primary secondary cell (PSCell) change, or an LTM is based on random access channel (RACH) in a radio link failure (RLF) report, a successful handover report (SHR) or a successful primary secondary cell change report (SPR), or (2) the handover, the PSCell change, or the LTM is not based on the RACH in the RLF report, the SHR, or the SPR.

27. A method for wireless communication performed by a network entity, comprising:

transmitting, for a user equipment (UE), a conditional lower-layer triggered mobility (LTM) configuration indicating a set of conditions for performing an LTM cell switch without an LTM cell switch command;

receiving, a notification regarding the LTM cell switch and information regarding at least one of: at least one condition of the set of conditions being met, a first satisfied condition in the at least one condition, or a time between each condition of the at least one condition; and receiving, from the UE, a flag that indicates whether (1) a handover, a primary secondary cell (PSCell) change, or an LTM is based on random access channel (RACH) in a radio link failure (RLF) report, a successful handover report (SHR) or a successful primary secondary cell change report (SPR), or (2) the handover, the PSCell change, or the LTM is not based on the RACH in the RLF report, the SHR, or the SPR.

28. The method of claim 27, wherein the at least one condition comprises multiple conditions, and wherein the information indicates the first satisfied condition in the multiple conditions or the time between each condition of the multiple conditions.

* * * * *